US011449831B2

United States Patent
(12) United States Patent
Olson

(10) Patent No.: US 11,449,831 B2
(45) Date of Patent: Sep. 20, 2022

(54) SYSTEMS AND METHODS FOR SELECTIVE AND REAL-TIME USER INTERFACE DISPLAY

(71) Applicant: Starlight AG, LLC, Minneapolis, MN (US)

(72) Inventor: Virginia C. Olson, Minneapolis, MN (US)

(73) Assignee: STARLIGHT AG, LLC, Minneapolis, MN (US)

(*) Notice: Subject to any disclaimer, the term of this patent is extended or adjusted under 35 U.S.C. 154(b) by 152 days.

(21) Appl. No.: 16/682,316

(22) Filed: Nov. 13, 2019

(65) Prior Publication Data

US 2020/0175475 A1 Jun. 4, 2020

Related U.S. Application Data

(60) Provisional application No. 62/767,258, filed on Nov. 14, 2018.

(51) Int. Cl.

| | |
|---|---|
| ***G06Q 10/06*** | (2012.01) |
| ***G06Q 10/10*** | (2012.01) |
| ***G06Q 50/02*** | (2012.01) |
| ***G06Q 50/26*** | (2012.01) |
| ***G06F 16/25*** | (2019.01) |
| ***G06F 3/0482*** | (2013.01) |
| ***G06F 3/04817*** | (2022.01) |
| ***G06Q 40/08*** | (2012.01) |
| *G06F 9/451* | (2018.01) |

(52) U.S. Cl.

CPC ........... *G06Q 10/10* (2013.01); *G06F 3/0482* (2013.01); *G06F 3/04817* (2013.01); *G06F 16/252* (2019.01); *G06Q 10/06316* (2013.01); *G06Q 40/08* (2013.01); *G06Q 50/02* (2013.01); *G06Q 50/26* (2013.01); *G06F 9/453* (2018.02)

(58) Field of Classification Search

CPC combination set(s) only.
See application file for complete search history.

(56) References Cited

U.S. PATENT DOCUMENTS

| | | | | |
|---|---|---|---|---|
| 5,897,619 | A | 4/1999 | Hargrove et al. | |
| 6,990,459 | B2 | 1/2006 | Schneider | |
| 9,202,252 | B1 * | 12/2015 | Smith | G06Q 50/02 |
| 9,569,803 | B1 * | 2/2017 | France | G06Q 10/06315 |
| 2005/0027572 | A1 * | 2/2005 | Goshert | G06Q 40/08 705/4 |

(Continued)

OTHER PUBLICATIONS

NAU Country Company. A QBE Insurance Company. EASY Quote User Guide. Installing, Configuring and Using EASYquote3. Jan. 22, 2018. https://www.naucountry.com/docs/default-source/agent/easyquote/easyquote-user-guide.pdf?sfvrsn.

(Continued)

*Primary Examiner* — Hien L Duong
(74) *Attorney, Agent, or Firm* — Patterson Thuente Pedersen, P.A.

(57) ABSTRACT

Systems and methods for selective and real-time data display generally include a graphical user interface configured to display in real-time, data to a user based on a dynamically-guided subsystem having a task engine, a timing engine, a location engine, a data integration engine, and a display engine. An analysis sub-engine can analyze the received data and package it for delivery to target databases.

20 Claims, 88 Drawing Sheets

(56) References Cited

U.S. PATENT DOCUMENTS

| | | | | |
|---|---|---|---|---|
| 2013/0185104 | A1 | 7/2013 | Klavins | |
| 2014/0012732 | A1* | 1/2014 | Lindores | A01B 79/005 705/37 |
| 2014/0035752 | A1 | 2/2014 | Johnson | |
| 2014/0350997 | A1* | 11/2014 | Holm | G06Q 50/01 705/7.26 |
| 2016/0078570 | A1 | 3/2016 | Ethington et al. | |
| 2016/0247082 | A1 | 8/2016 | Stehling et al. | |
| 2016/0253595 | A1 | 9/2016 | Mathur et al. | |
| 2017/0091478 | A1 | 3/2017 | Tiller et al. | |
| 2017/0161627 | A1* | 6/2017 | Xu | G06Q 50/02 |
| 2017/0213141 | A1* | 7/2017 | Xu | G06Q 50/02 |
| 2017/0257426 | A1 | 9/2017 | Wilbur et al. | |
| 2017/0287082 | A1* | 10/2017 | Karube | G06Q 50/02 |
| 2018/0322426 | A1* | 11/2018 | Schmaltz | G06F 16/954 |
| 2019/0090432 | A1* | 3/2019 | Duquette | G06Q 10/06375 |
| 2019/0347745 | A1* | 11/2019 | Bones | G06Q 40/12 |
| 2019/0347836 | A1* | 11/2019 | Sangireddy | A01C 21/00 |
| 2020/0128721 | A1* | 4/2020 | Lewis | G01N 1/02 |
| 2020/0175475 | A1* | 6/2020 | Olson | G06F 16/252 |

OTHER PUBLICATIONS

NAU Country Company. A QBE Insurance Company. Mobile Policy Management. © 2019, As accessed on Nov. 13, 2019. https://www.naucountry.com/farmers/farmer-tools/mobile-policy-management.

NAU Country Company. A QBE Insurance Company. Production and Acreage Reporting. © 2019, As accessed on Nov. 13, 2019. https://www.naucountry.com/farmers/farmer-tools/precision-farming-and-acrsi.

NAU Country Company. A QBE Insurance Company. Weather Metrics. © 2019, As accessed on Nov. 13, 2019. https://www.naucountry.com/farmers/farmer-tools/weather-metrics.

YouTube. EASYquote: Creating a basic quote. Published Jan. 18, 2018. Transcript of the video is provided. https://www.youtube.com/watch?v=Qdn9iv3XMss.

United States Department of Agriculture Farm Service Agency. The Acreage Crop Reporting Streamlining Initiative (ACRSI). As accessed on Nov. 13, 2019. https://www.fsa.usda.gov/programs-and-services/initiatives/acrsi/index.

United States Department of Agriculture. 2018 Approved Appendix III/M—13 Handbook. Risk Management Agency; (2018). As accessed on Nov. 13, 2019. https://www.rma.usda.gov/en/Policy-and-Procedure/Appendix-III-M13-Handbook-Index/2018-Approved.

International Search Report and Written Opinion, International Application No. PCT/US2019/061203, dated Feb. 10, 2020, 18 pages.

European Search Report, European Application No. 19884071.2, dated Jul. 11, 2022, 9 pages.

* cited by examiner (PRIOR ART)

(PRIOR ART)

(PRIOR ART)

(PRIOR ART)

(PRIOR ART)

(PRIOR ART)

(PRIOR ART)

(PRIOR ART)

(PRIOR ART)

300

UI Page 1

UI Page 2

UI Page 4

UI Page 5

UI Page 7

UI Page 8

UI Page 10

FIG. 14
ACRES
COVERAGE
CURRENT PRICE
YIELD TRIGGER
NEW PRICE
NEW YIELD TRIGGER
CORN
SOYBEANS
144
425
$471
$10.16

UI Page 11

REVENUE CALCULATOR - October 1 through October 31 - bill HAS been paid and yields reported UI Page 13

REPORT YIELDS - November 1 – December 14 - Bill HAS been paid

UI Page 15

UI Page 17

UI Page 18

UI Page 19

UI Page 20

October 1 to October 31

SYSTEMS AND METHODS FOR SELECTIVE AND REAL-TIME USER INTERFACE DISPLAY

CROSS-REFERENCE TO RELATED APPLICATION

This Application claims the benefit of U.S. Application No. 62/767,258, filed Nov. 14, 2018, entitled "Systems and Methods for Selective and Real-Time User Interface Display," which is fully incorporated by reference herein.

TECHNICAL FIELD

Embodiments relate generally to user interface displays. More particularly, embodiments relate to systems and methods having improved interfaces and computer functionality for Internet-based real-time agriculture data processing.

BACKGROUND

Certain industries, such as crop insurance, have traditionally implemented complex software interfaces. For example, insurance-focused software systems were traditionally designed as an underwriting tool for Approved Insurance Providers (AIPs). As such, existing software is still provider-focused and generally includes clumsy and outdated display and functionality.

Each crop insurance company uses cumbersome drop downs or file tab interfaces such that the user is the one driving what needs to be done. Anyone using such systems needs to be trained and/or refer to a manual to understand where to enter acres, sales renewal, production reports and claims. For example, FIG. 1A illustrates one example of traditional tab-based quoting software that an agent might use. In order to see the quotes for one crop, a user must select the crop to see all the quotes available.

Similarly, FIG. 1B illustrates another example of tab and drop-down interfaces. An insurance agent user has limited ability to navigate mold, cancels, or transfer policy information. For example, if an agent user makes changes and places it on hold, the system will not prompt the agent user to revisit it, resulting in the agent user thinking the updated coverage is in place when it is not.

In another example, referring to FIG. 1C, a user selecting coverage is required to click on "endorse policy" before he can make any changes to the policy (coverage change, acreage reporting, production reporting, etc.). If the user is making changes to coverages, he must click on the edit button in order to enter changes for a sales season, then select each crop and select drop downs.

In another example, complex spreadsheet-type interfaces are provided. Referring to FIG. 1D, when a user is done entering acres or production, he then is required to "commit" the policy which brings him to several screens to finalize the process. Referring to FIG. 1E, an agent user must complete complex spreadsheet-based input form. Referring to FIG. 1F, for production reporting, an agent user is required to use a number of drop-down menus to navigate.

In another example, referring to FIG. 1G, each insurance company displays quotes differently, and more particularly, the quotes for hail, MPCI, and endorsements are not on one screen a user must navigate to three individual screens.

As shown by the above examples, very limited software system options exist for the farmer on the insured side. Existing provider-focused software presents an overwhelming number of insurance and crop-related information, very little of which is actually applicable to the particular farmer at a particular time of year. For example, the 2018 Approved Appendix III/M-13 Handbook provided by the U.S. Department of Agriculture, herein incorporated by reference, details this type of information. Existing systems rely on provider tribal knowledge of applicable menus, data, and selection options. Moreover, the complex displays and selection options presented by the existing provider-focused software are undesirable to insured farmers. An insured user would be required to search through complex menu systems to find the appropriate data. This is burdensome and hinders the user's ability to operate such systems.

There presently are no keying options for a farmer user. The only users that can key changes in the AIP programs are insurance agent users. Farmer access is limited to an online farmer portal simply to view their policy—a farmer user can't make any changes.

Further, industry software is not intuitive to the user, season, or location; existing industry software presents the same format regardless of whether citrus is insured on the West Coast or tobacco is insured on the East Coast and certainly includes no measure of location or time of year. This challenge is exacerbated as the industry has become Internet-based and distributed.

Farmers report their acres to two different agencies: the Farm Service Agency (FSA), which is part of the USDA, and the farmer's crop insurance agency, which is an independent insurance broker. Since there is no electronic platform for the farmer to use, reporting acres to both agencies is a manual, time-intensive process; the farmer manually writes acreage information onto field maps and then must provide hard copies of the field maps to the FSA office and an insurance agent working for the farmer's insurance agency. Upon receiving the field maps, the FSA office and the insurance agent independently enter the acreage report into their respective software. Eventually the acreage information is synchronized between the FSA and AIP, but the synchronization process takes a minimum of three weeks.

AIP's software often has a farmer portal. The farmer portal allows the farmer to view crop insurance information but does not allow the farmer to enter data or electronically upload information—which is instead done by the crop insurance agent—causing a delay in data synchronization between the farmer, the crop insurance agent, the crop insurance company, and FSA.

AIPs verify that the acres reported at the FSA are within 3% of the acres that are reported to the crop insurance agent. To accomplish this verification, the AIP submits a records request to the Risk Management Agency (RMA) on each policy. The AIP can only ask for a limited amount of records at one time, and the records request for a single policy can be very large, potentially exceeding 200 records. If the AIP must request more records than the record request limit, the AIP must get back in line behind other AIPs to request more. There are 15 AIPs, which means they are constantly in queue. Because the records take a long time to retrieve, the FSA data is not in real time for the farmer or AIP. Additionally, each crop has an acreage reporting deadline. If the AIP has not pulled the farmer's data into the AIP's software by the deadline, the farmer must manually report his acres to the insurance agent. Should this happen, the agent will ask the farmer to submit his FSA papers with the acreage report and will cross check the FSA papers when entering the acreage report. In practice, the farmer must manually report his acres to the insurance agent in most instances due to the delay caused in part by the records request limit and queue. If the FSA data does not match what the farmer wrote on his crop insurance acreage report, the agent contacts the farmer to figure out what numbers are correct. This discrepancy occurs roughly half of the time, and if the data is incorrect at the FSA office, the farmer must return to the FSA to correct the data.

Another problem of traditional systems is that a farmer cannot work his claim until the insurance company has received the acreage report from the insurance agent and has verified the FSA papers for the claim. Waiting for the FSA data to be synchronized with the AIP's system delays the claim at least three weeks, as previously mentioned. This delay prevents the farmer from working his claim and can be especially costly if the farmer has a claim in the spring.

Currently, if a farmer needs to submit a claim, it must be done manually by calling an insurance agent. The insurance agent must then cross check the yields to see if there is a possible claim. If the agent doesn't review the yields in time, the farmer may have a declined claim as it was submitted too late.

The RMA has introduced ACRSI (acreage crop reporting streamlining initiative). ACRSI gives the farmer the option to manually report their acres in person to either the FSA or the insurance agent, and then the receiving party of the report will enter the farmer's acres and electronically submit the data. If the farmer reports to the FSA, then the FSA needs to synchronize the farmer's acres with the RMA. The RMA then further synchronizes the farmer's acres with the AIP when the AIP requests the report. If the farmer reports their acres to the insurance agent, the insurance agent enters the acres into the AIP's software and then the AIP sends the farmer's acres to the RMA, who then additionally sends the farmer's acres to the FSA. Even if there was not a delay in retrieving the FSA records, the farmer still needs to sign a crop insurance acreage report which involves mailing or dropping off a hard copy to the insurance agent. This cumbersome process is summarized in FIG. 1H, with the corresponding time requirements illustrated in FIG. 1I.

Therefore, there is a need for systems and methods that can guide insured users through the complex process of crop insurance in real time over a distributed Internet-based architecture.

SUMMARY

Embodiments solve the technological problem of how to meaningfully display large and unique data sets on a user device to geographically and communicatively-distributed users. In particular, systems and methods described herein provide a specific solution to existing technological problems in computers and display technologies. This improvement allows computers, for the first time, to provide rapid access to and process information for which they had not been previously available, specifically, insured user-focused data.

This technological improvement is necessarily rooted in computer technology in order to overcome a problem specifically arising in the realm of computer networks. Specifically, large sets of geographically-specific and user-specific data across computer networks are displayed and hidden as appropriate. Likewise, end-user functionality is similarly enabled or disabled as appropriate.

More particularly, embodiments are directed to a particular manner of summarizing and presenting information in electronic devices. As described herein, specific features disclose a specific manner of displaying a limited set of information to the user, rather than using conventional user interface methods to display all provider-accessible data. The disclosed invention improves the efficiency of using an electronic device by bringing together a limited list of common functions and commonly accessed stored data. Specifically, the majority of farmers insure a limited number of types of crops with a limited number of coverage options, but in order to access such data, traditional systems require an agent with tribal knowledge of the data to navigate large data sets. Embodiments described herein solve that problem.

In an embodiment, a system for selective and real-time data display comprises a computing platform including computing hardware of at least one processor, a memory operably coupled to the at least one processor, and configured to store instructions invoked by the at least one processor; instructions that, when executed on the computing platform, cause the computing platform to implement: a graphical user interface configured to display, in real-time, data to a user; and a dynamically-guided subsystem including: a task engine configured to manage task data related to the user, the task data comprising a plurality of tasks, a timing engine configured to determine timing data related to each of the plurality of tasks, the timing data being specific to the user, a location engine configured to determine location data related to each task, the location data being specific to the user, a data integration engine configured to integrate selected task data, from at least one database, and based on a set of decision criteria based on at least the timing data and the location data, and a display engine configured to populate the selected task data to the graphical user interface, and receive user-inputted crop data based on the selected task data from the graphical user interface.

In an embodiment, a method for selective and real-time data display comprises providing a computing platform including computing hardware of at least one processor, a memory operably coupled to the at least one processor, and configured to store instructions invoked by the at least one processor, the computing platform having a graphical user interface configured to display, in real-time, crop data to a user; managing task data related to the user, the task data comprising a plurality of tasks; determining timing data related to each of the plurality of tasks, the timing data being specific to the user; determining location data related to each task, the location data being specific to the user; integrating selected task data, from at least one database, and based on a set of decision criteria based on at least the timing data and the location data; populating the selected task data to the graphical user interface; and receiving user-inputted crop data based on the selected task data from the graphical user interface.

In an embodiment, a system for selective and real-time data display comprises means for presenting a graphical user interface configured to display, in real-time, crop data to a user; means for managing task data related to the user, the task data comprising a plurality of tasks; means for determining timing data related to each of the plurality of tasks, the timing data being specific to the user; means for determining location data related to each task, the location data being specific to the user; means for integrating selected task data, from at least one database, and based on a set of decision criteria based on at least the timing data and the location data; means for populating the selected task data to the graphical user interface; and means for receiving user-inputted crop data based on the selected task data from the graphical user interface.

In a feature and advantage of embodiments, a dynamically-guided presentation subsystem presents data to users in real time. For example, agriculture insurance data can be selectively displayed based on the timing of the season and/or the location of the farmer. Embodiments therefore only include applicable data and/or actions. Icons and the associated computer functionality can be removed from selection. In embodiments, icons are not grayed-out, but removed when an action has been completed. Accordingly, the system eliminates the need for cumbersome tabs and drop-downs.

In another feature and advantage of embodiments, the system guides an insured user through the process with selectively chosen data. In an embodiment, once an action has been completed related to a particular policy for a season, completed components are flagged or segmented so that they are no longer accessed and a subsequent season's components are instead operated on, including display and data retrieval. From the user side, for example, if a farmer has renewed his policy and the timing is after the sales closing date, the farmer can still view quotes but only if selected from a higher level access menu at the top of page. In another example, if farmer has reported acres, the system no longer prompts to enter the acres and instead displays total acres insured and liability. If the timing is before the acreage report due date, the farmer can still revise acres by selecting the icon displayed on the screen. To enable this functionality, interfaces, data, and icons can be semaphored, mutexed, or otherwise locked from access based on timing, location, and task data.

In another feature and advantage of embodiments, a transparency page display generates a sub-display screen into a current display screen instead of loading an entirely new display page. This ensures a consistent, efficient user experience so that the user does not need to leave one screen to get to data on another.

In another feature and advantage of embodiments, quick entry screens allow for efficient entry of commonly used data. For example, a "quick plant" sub-display allows the option to import planting intentions year-over-year as well as add or revise crop hail on the same display page.

In another feature and advantage of embodiments, an intuitive sales renewal user interface immediately shows current coverage, updated coverage, and premium costs, as well as multiple options to select in a compact user interface. In contrast, existing displays require multiple pages of printed quotes. Moreover, after sales season, display interfaces automatically and in real-time depict the coverage elected and liability but no longer encourages a user to renew coverages. As a result, the display screens are more intuitive, less busy, as all of the quoting options for the crop no longer need to be displayed. The back-end algorithms disclosed herein allow for this efficient display.

In another feature and advantage of embodiments, various interfaces allow for acreage reporting. For example, user interfaces allow a farmer user to determine prevent plant, rotate acres functionality, and to report prevent plant and replant claims on the same page.

In another feature and advantage of embodiments, various interfaces allow for intuitive billing interfaces. For example, once a user has paid a bill, the bill pay feature is no longer displayed. In certain embodiments, billing info and documentation can still be accessed by certain menus. In an embodiment, timing data is used to send SMS text and/or email alerts to the user.

In another feature and advantage of embodiments, various interfaces allow for efficient and intuitive production reporting. For example, once a user has entered yields, display screens automatically and in real-time no longer offer the option to enter production but will change to display the next year's coverage options. In an embodiment, the ability to revise yields is available if the user has indicated that crop is stored on the farm and has not been sold. Revise yield interfaces can be available until the production report deadline and then are no longer an option. In embodiments, user interfaces allow for the submission of claims on the same screen as production reporting. Embodiments further allow for unrelated but user-based data to be entered, such as adding or revising hail coverage.

In another feature and advantage of embodiments, if a user has fields that are certified organic, a quote for all organic crops that are insurable for their county is provided by embodiments. The quote can rank the highest revenue crop down to the lowest. This provides the organic farmer an opportunity to determine which crops would be the most profitable to grow in his area.

In another feature and advantage of embodiments, for users who have precision AG, harvest numbers can be automatically linked to a production report. This can determine if there is a payable indemnity as well as complete the requirement to report production. This is beneficial compared to current solutions, which are a manual process in which the farmer has to upload his data, send to agent, who sends it to the AIP. The AIP thus has to manually manipulate the data to get it to import correctly.

In another feature and advantage of embodiments, a dynamically-guided presentation subsystem can comprise a sensor or input engine. For example, a rain sensor or sun sensor can help determine if there is replant or prevent plant prominent in the area which will prompt an adjuster to contact the farmer. Replant acres are extremely time sensitive as a farmer needs to talk to an adjuster prior to replanting. Embodiments can further incorporate weather data from, for example, National Weather Service inputs.

In another feature and advantage of embodiments, planting or harvesting status or data can trigger notifications to the farmer. For example, if 80% of the planting is completed within a county, the users can be asynchronously notified within that county that acreage reports are due. If 80% of the production is completed in the county, the users can be asynchronously notified that production reports are due.

In an embodiment, data analysis algorithms determine a breakdown of a revenue portion compared to a production portion if there is a paid claim.

In another feature and advantage of embodiments, a farmer user can electronically update and enter crop data specific to each FSA common land unit (CLU) without the assistant of a FSA employee or crop insurance agent. The crop-specific data is then uploaded in real time to the RMA (USDA office), the FSA (USDA office), and the ALP (crop insurance company), thereby bypassing direct users of those separate databases (i.e. crop insurance agent and FSA office users).

In another feature and advantage of embodiments, a farmer user can electronically indicate who should receive his crop insurance data electronically as opposed to calling his insurance agent and requesting that the info be sent. Specified recipients can include lenders, agronomists, farm managers, and accountants. The indication can include an electronic location related to the receiver.

In another feature and advantage of embodiments, acres can be directly reported from the farmer user to the AIP and the FSA offices. Acres can be reported by importing planting intentions, precision farming, and manual entry.

In another feature and advantage of embodiments, a farmer user does not need to use a crop insurance agent to procure coverage, change coverage, or purchase hail coverage for private products.

In another feature and advantage of embodiments, a farmer user can execute an FSA re-con electronically, without having to physically go to FSA.

In another feature and advantage of embodiments, a farmer user has direct access to direct quoting based on his specific crop data without an insurance agent user.

In another feature and advantage of embodiments, policies and endorsements can be electronically combined based on an individual farming operation, including running a MPCI quote, hail quote and named peril quote all on the same screen, without a farmer user having to request running the quotes. If too much information is displayed, or if the farmer isn't interested in a product, he can easily deselect the product and the product is automatically removed from the screen.

In another feature and advantage of embodiments, past loss data can be incorporated to provide insurance rate of return and predict claim occurrence specific to the farm location using, for example, location engines.

In another feature and advantage of embodiments, artificial intelligence (AI) data can inform the user of the probability of a claim depending upon the type of insurance purchased. For example, if a farmer wants to purchase hail insurance, the embodiments can calculate and display the hail probability based on actuarial data for the specific fields the farmer user farms.

In another feature and advantage of embodiments, display interfaces can display best buys for a farmer based on actuarial data, as well as a coverage amount for the premium spent. Additionally, when the farmer's policy renews, embodiments can display all products the farmer has purchased on the same screen.

In another feature and advantage of embodiments, a farmer can indicate how much to spend, and a best fit can be calculated. For example, if a farmer wants $800 per acre coverage, embodiments can pull in the products that provide the best coverage totaling $800 of coverage. In another example, a farmer can indicate how much coverage he wants for each crop and a best fit can be calculated. For example, if a farmer wants to spend $18 per acre, embodiments can evaluate and display the best products to keep him under $18 in premium. Competitor's rates can further be displayed for various private products.

In another feature and advantage of embodiments, farmers can enter a plan as to what crops they intend to plant and in which fields the crops can be planted. This plan is referred to as planting intentions. Farmer users can input and upload planting intentions as well as indicate who should receive a copy of the intentions, such as an agronomist user or farm manager user. Any updates on planting intentions can also be sent to those users receiving a copy of the original intentions. Further, planting intentions can be linked to the acreage report, thereby eliminating repetitive work. As part of this linking process, farmers can adjust acres, if needed.

In another feature and advantage of embodiments, a "rotate acres" option, alternatively labeled a "flip acres" option, allows a farmer user to switch between at least two types of crops each year. For example, the majority of farmers in the Midwest plant a corn and soybean rotation, which means the fields that have corn this year can have soybeans on next year, and the rotate acres module can let the farmer switch last year's corn fields to soybean this year and vice versa next year. The rotate acres module can be used for acreage reporting, sales renewal (quoting), and planting intentions.

In another feature and advantage of embodiments, a prevent plant calculator can help the farmer determine if he is eligible for prevent plant, the amount of coverage per acre, the amount of acres eligible, the final plant date for the crop, and whether it is advantageous to plant a different crop.

In another feature and advantage of embodiments, a replant calculator can help the farmer determine if he is eligible for replant coverage, and the amount of replant payment. The replant calculator can automatically and electronically submit a claim to notify an adjuster user.

In another feature and advantage of embodiments, a production reporting module allows a farmer user to directly upload his precision data. When the farmer enters yields, the production reporting module can automatically determine if there is a possible claim. If it appears there can be a claim, the production reporting module can automatically submit a loss by asking the farmer a series of questions, thereby removing the need for the farmer to call an insurance agent. If the yields are not submitted by the deadline to report a claim, the production reporting module can notify the farmer via text, call, or email that the claim deadline is approaching.

In another feature and advantage of embodiments, during claims season, a farmer has the option to upload his scale tickets instead of having to give hard a copy to an adjuster. Additionally, the farmer can have access to claim records to see which adjuster has been assigned to his claim.

In another feature and advantage of embodiments, a farmer can have the option to enter price scenarios to see if he has a payable revenue loss, aiding with revenue price discovery.

In another feature and advantage of embodiments, each Spring (calculated by a timing engine, for example) the farmer can be presented specific questions to determine if there is added land, if new actual production history units need to be set up, if the farmer qualifies as a new farmer, if there is prevent plant, if there is replant, and if other crops need to be added to the policy.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
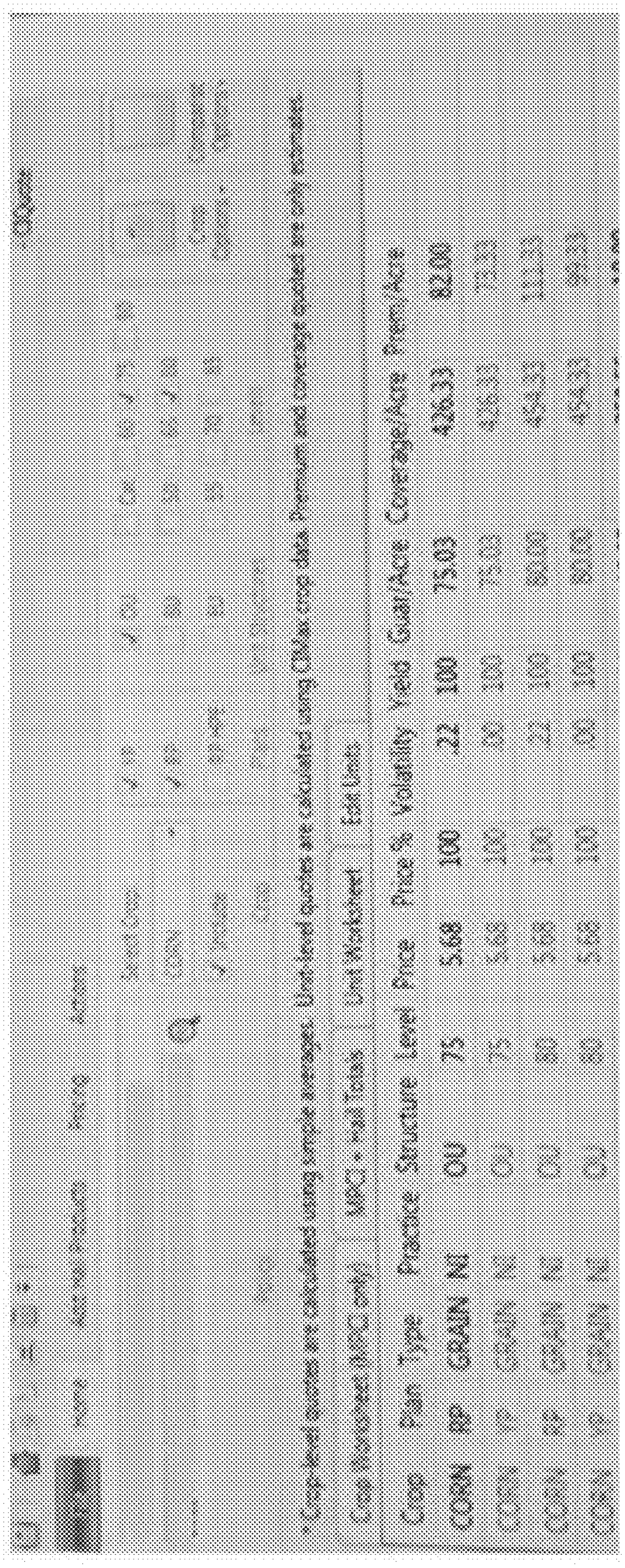
FIGS. 1A-1G are screenshots of traditional software interfaces.
Figure 1B:
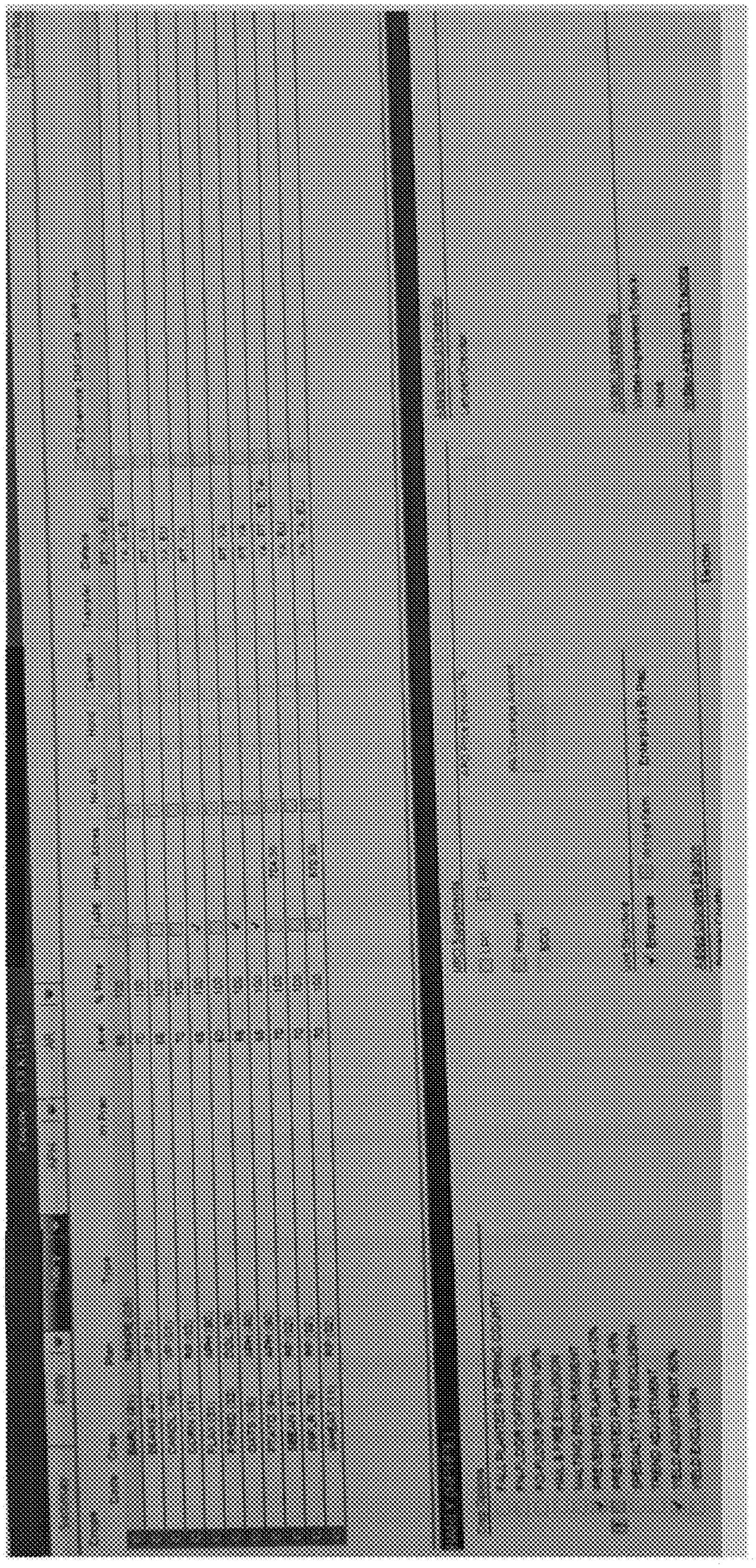
Figure 1C:
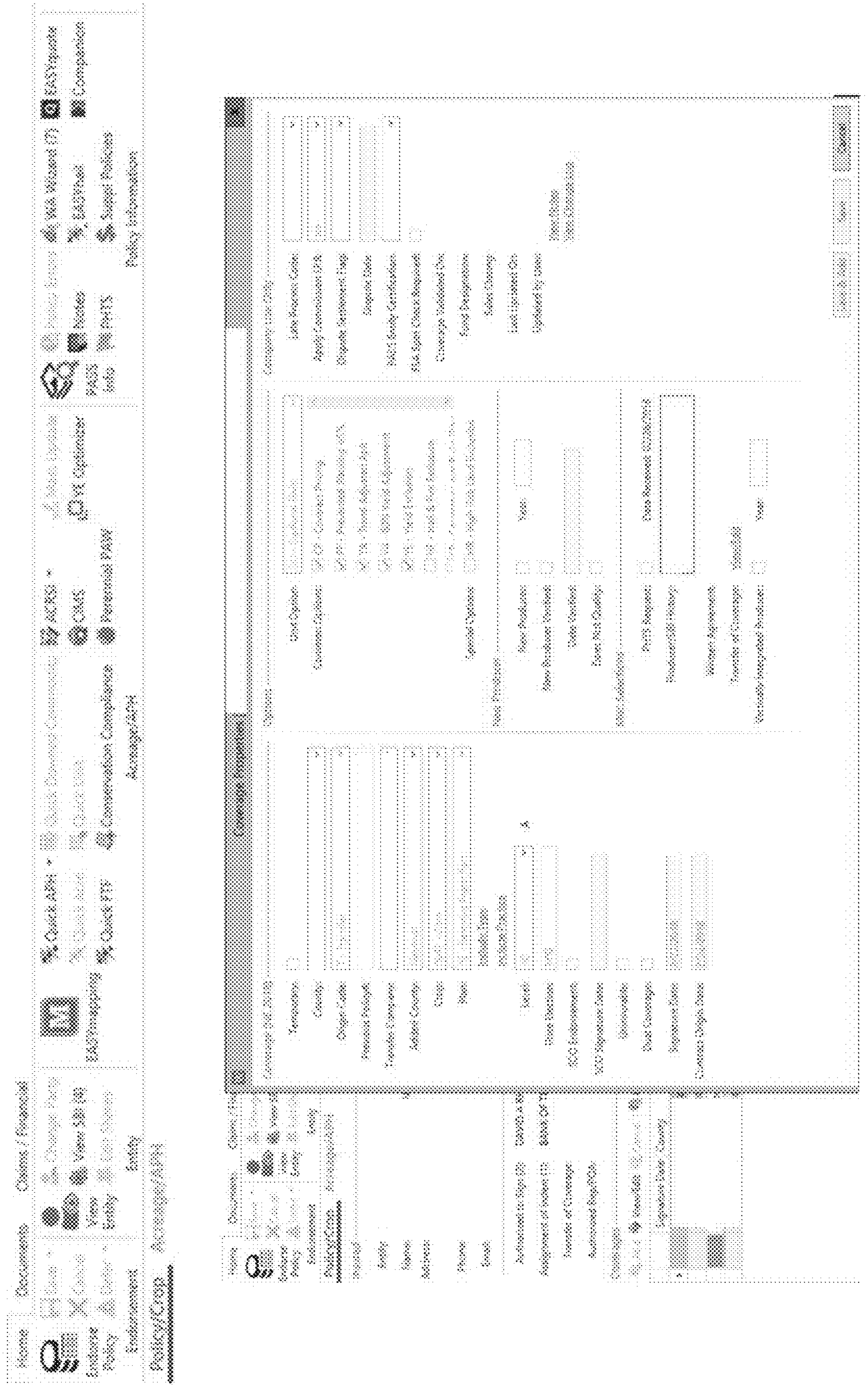
Figure 1D:
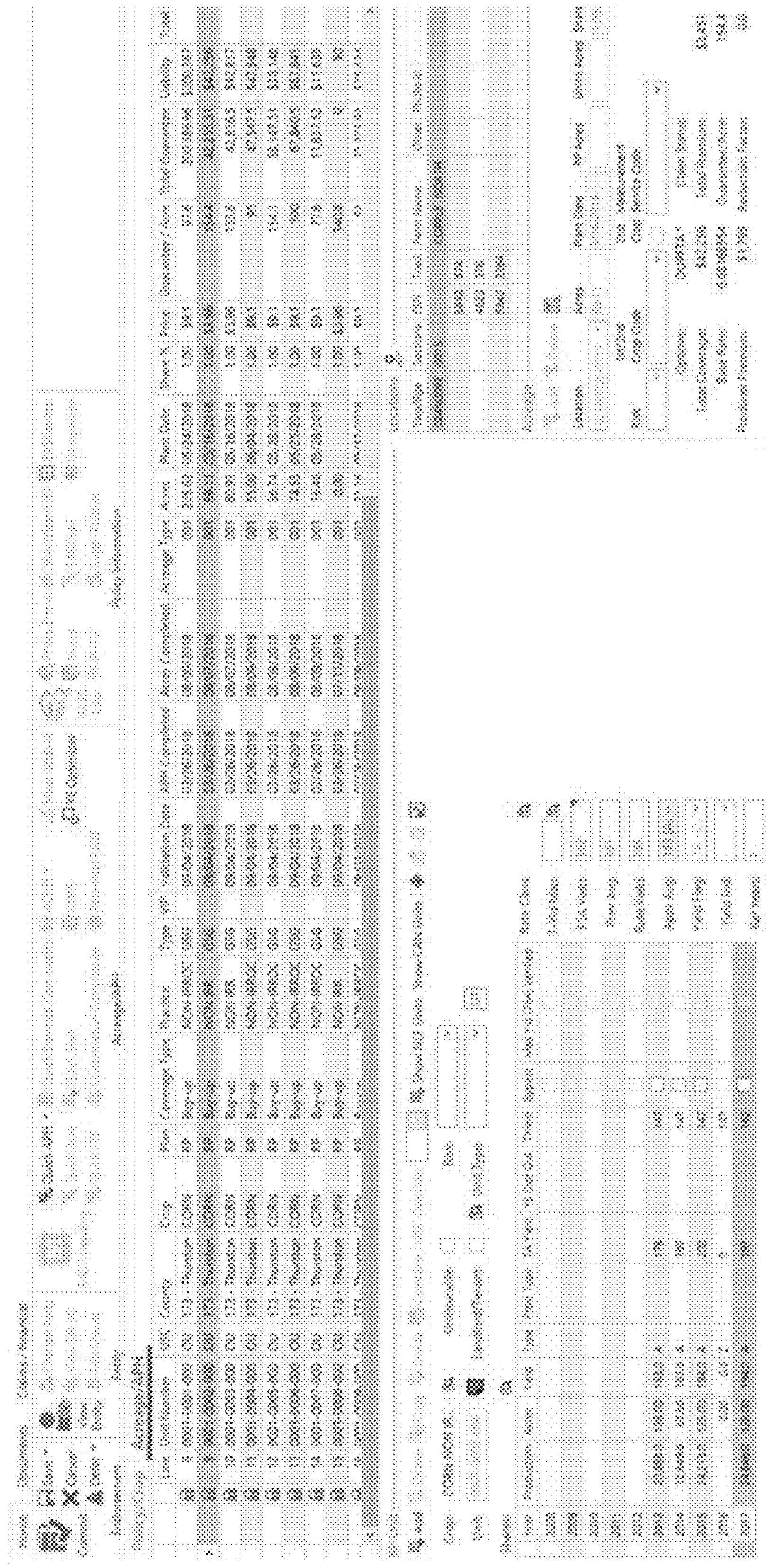
Figure 1E:
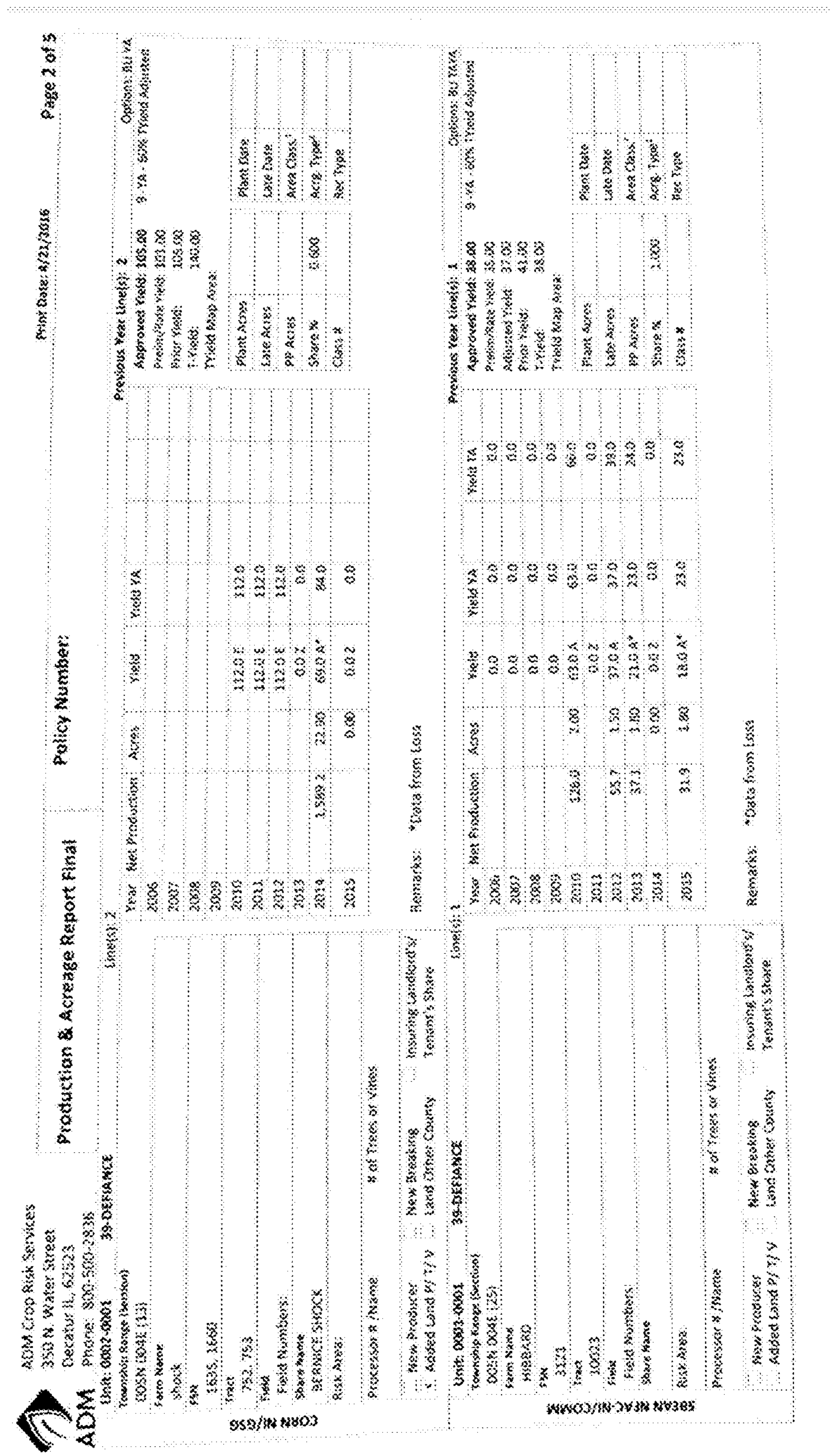
Figure 1F:
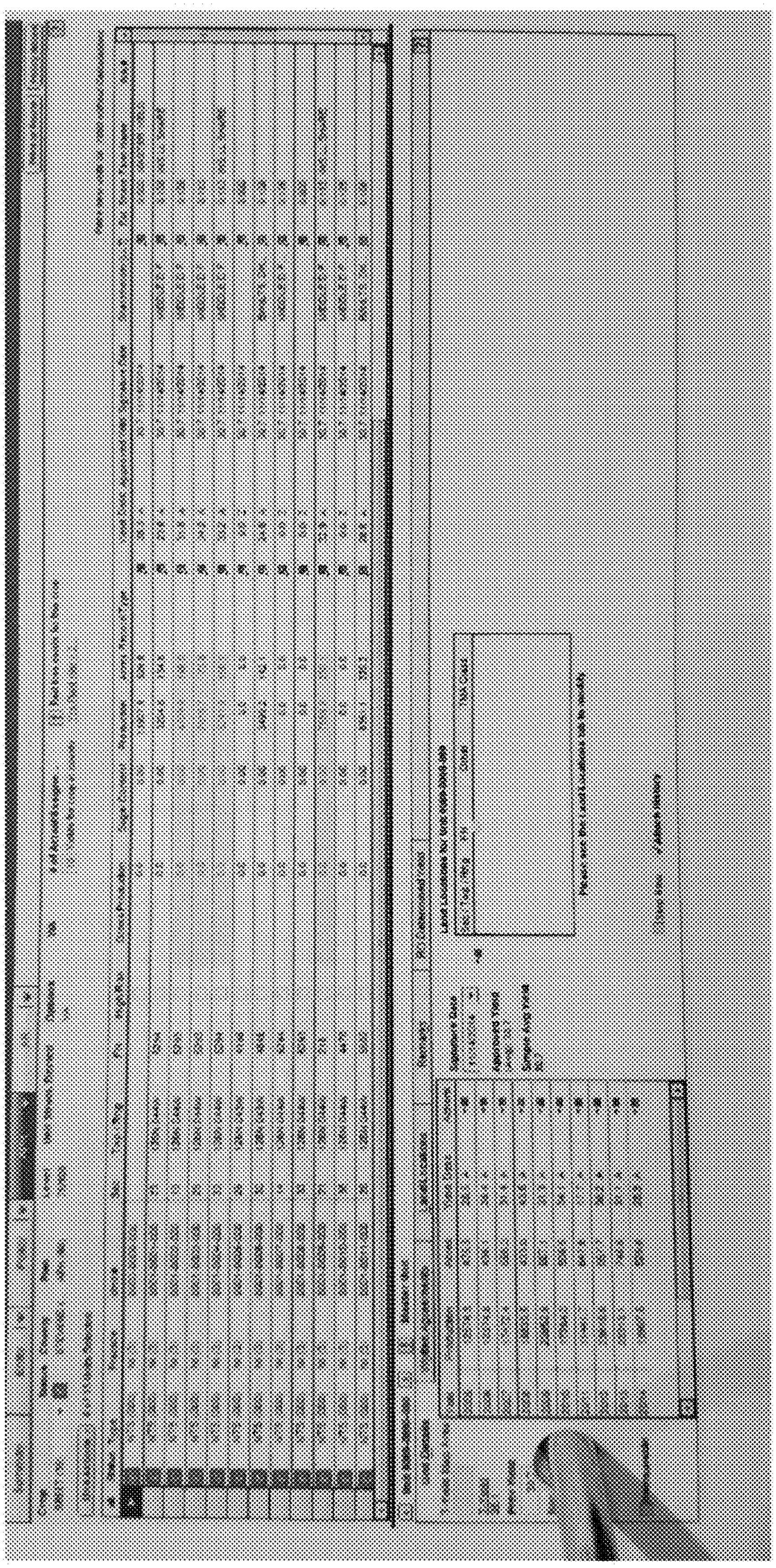
Figure 1G:
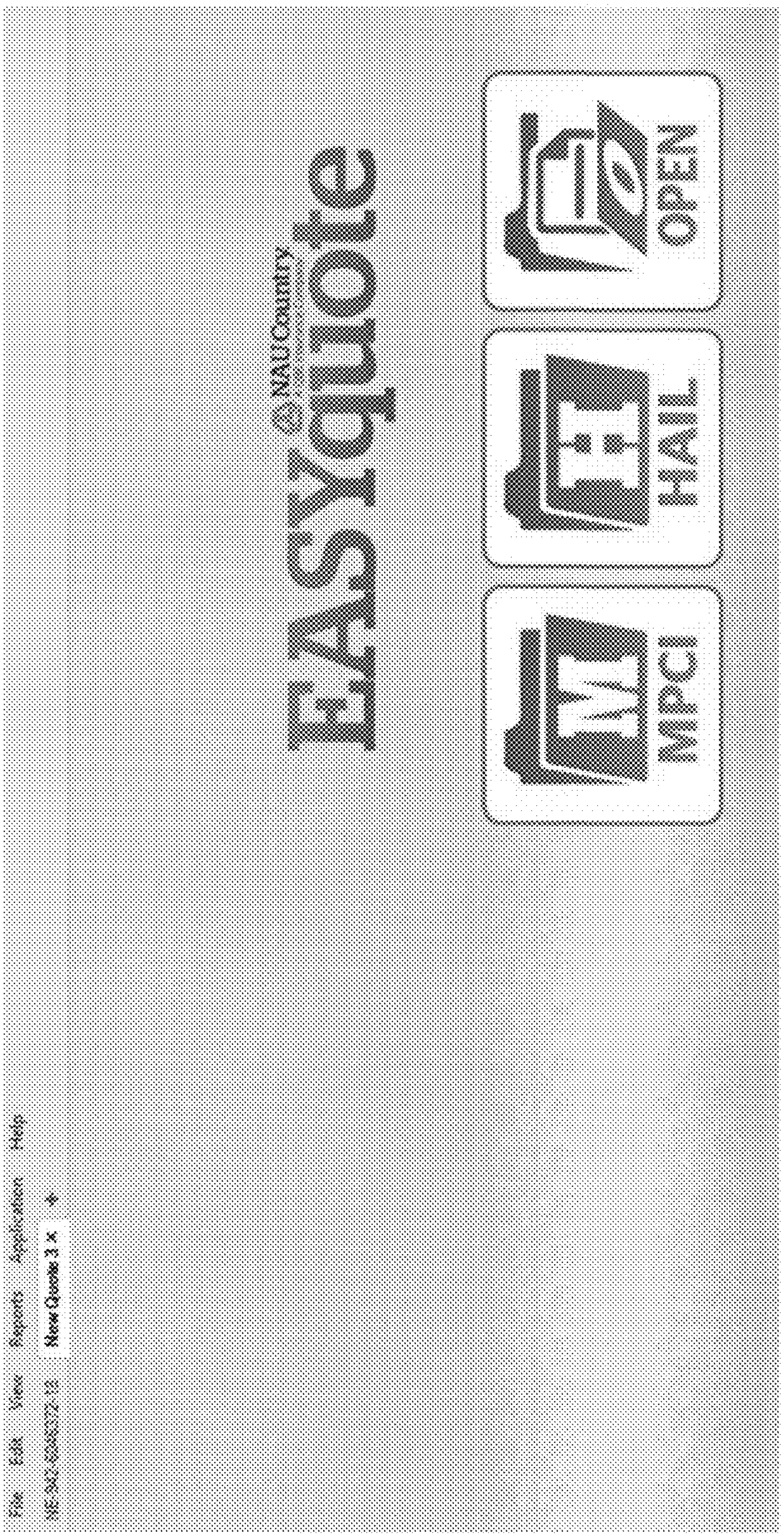
Figure 1H:
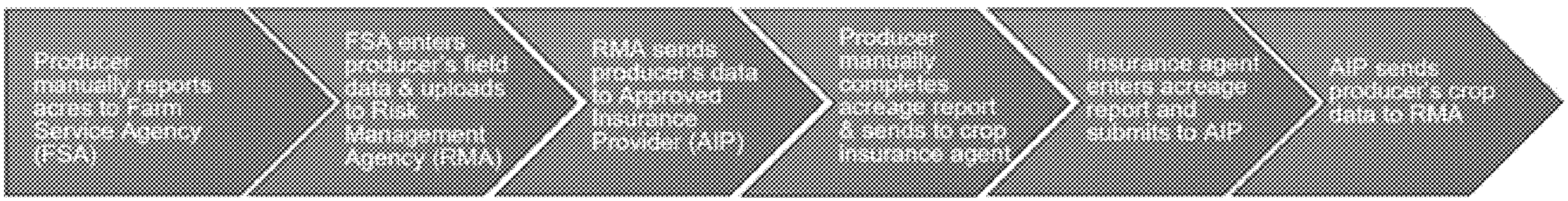
FIG. 1H is a flowchart of a traditional process for reporting crop data.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2A:
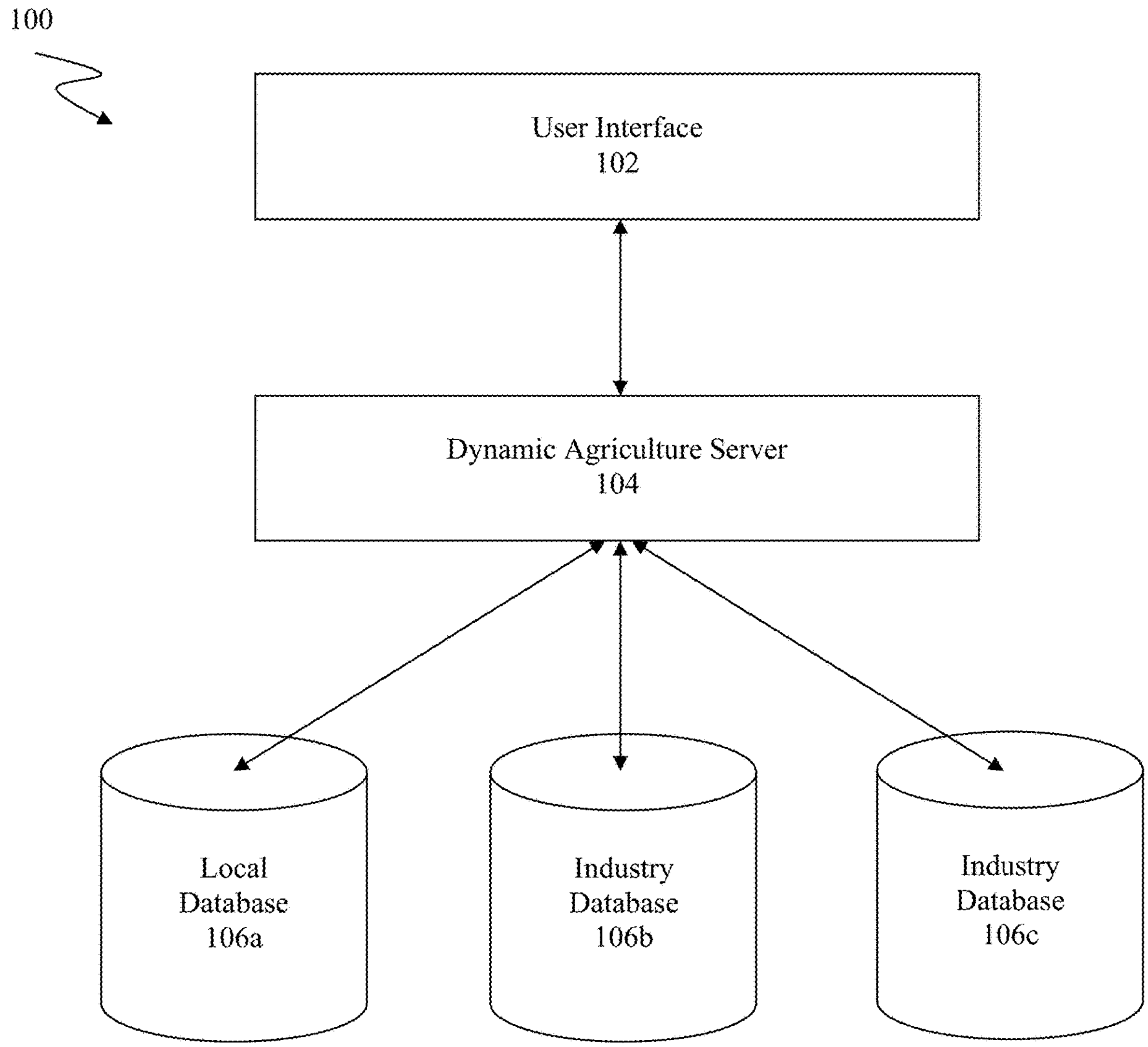
FIG. 2A is a block diagram of a system for dynamic agriculture data processing, according to an embodiment.

Referring to FIG. 2A, a block diagram of a system for dynamic agriculture data processing is depicted, according to an embodiment. System 100 generally comprises a user interface 102, a dynamic agriculture server 104, and one or more databases 106. As depicted, dynamic agriculture server 104 and databases 106 can be provided as a service in, for example, a cloud network or cloud-enabled network. As will be described, dynamic agriculture server 104 can include a dynamically-guided presentation subsystem and an analysis subsystem (e.g. FIGS. 3A and 3B). In embodiments, the dynamically-guided presentation subsystem and analysis subsystem can be combined to be implemented on dynamic agriculture server 104, or implemented discretely, as will be readily understood by one of ordinary skill in the art.

Embodiments of the system 100, and the corresponding methods of configuring and operating the system 100, can be performed in cloud computing, client-server, or other networked environment, or any combination thereof. The components of the system can be located in a singular "cloud" or network, or spread among many clouds or networks. End-user knowledge of the physical location and configuration of components of the system is not required.

As will be described, the system and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As will be described, a dynamically-guided presentation subsystem can be configured to manage workflow and presentation processes for user interface 102. The dynamically-guided presentation subsystem is operably coupled to user interface 102 and one or more databases 106 via dynamic agriculture server 104. Further, an analysis subsystem is operably coupled to the dynamically-guided presentation subsystem and configured to receive and analyze data received via the dynamically guided presentation subsystem. The analysis subsystem can further be operably coupled to the user interface 102 and one or more databases 106 via dynamic agriculture server 104.

Figure 2B:
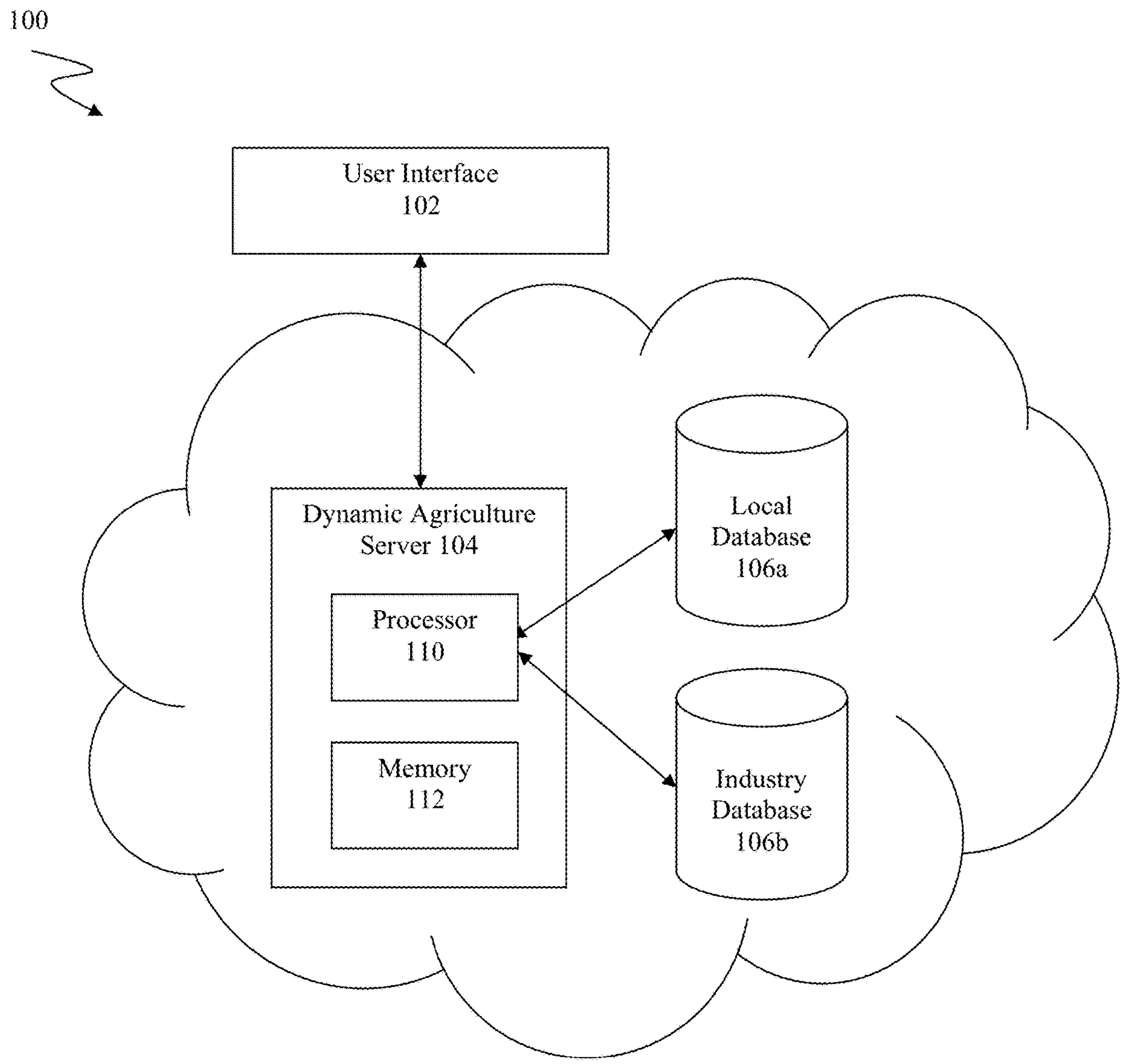
FIG. 2B is a further block diagram of the system of FIG. 3A, according to an embodiment.

As depicted in FIG. 2A, system 100 further comprises a local database 106*a*, an industry database 106, and a second industry database 106*c*. Referring also to FIG. 2B, system 100 is further depicted as a dynamic agriculture server 104, a local database 106*a*, and an industry database 106*b*.

Dynamic agriculture server 104 can comprise a computer other similarly capable computing or digital device. One skilled in the art will readily appreciate that dynamic agriculture server 104 can be implemented in a singular "cloud" or network, or spread among many clouds or networks. Likewise, dynamic agriculture server 104 can be implemented as a web server accessed using a browser with a remote device, such as a smart phone, tablet, or laptop. For ease of explanation, dynamic agriculture server 104 is described as a single computing device.

Dynamic agriculture server 104 generally comprises a processor 110 and memory 112 operably coupled to processor 110. Processor 110 is configured to carry out the instructions of the various engines for dictation management stored on memory 112. In embodiments, memory 112 can further comprise cache for recent or short term storage of queries and functions of the various engines. Processor 110 can be operably coupled to local database 106*a* and industry database 106*b*.

Local database 106*a* is configured to store local presentation data, including task, timing, presentation interfaces, and icon data. Local database 106*b* can be a general purpose database management storage system (DBMS) or relational DBMS as implemented by, for example, Oracle, IBM DB2, Microsoft SQL Server, PostgreSQL, MySQL, SQLite, Linux, or Unix solutions, in embodiments. Local database 106*a* can be integrated into dynamically-guided system 100, or dynamic agriculture server 104, as needed. In embodiments, local database 106*a* can also store industry-specific data as needed.

Industry database 106*b* is configured to store industry-specific data such as sales, acreage, billing, and claims data. Likewise, general medical database 114 can be a general purpose database management storage system (DBMS) or relational DBMS as implemented by, for example, Oracle, IBM DB2, Microsoft SQL Server, PostgreSQL, MySQL, SQLite, Linux, or Unix solutions, in embodiments. In general, industry database 106*b* is remote from dynamic agriculture server 104, but can also be integrated into dynamic agriculture server 104 as needed.

Figure 1I:
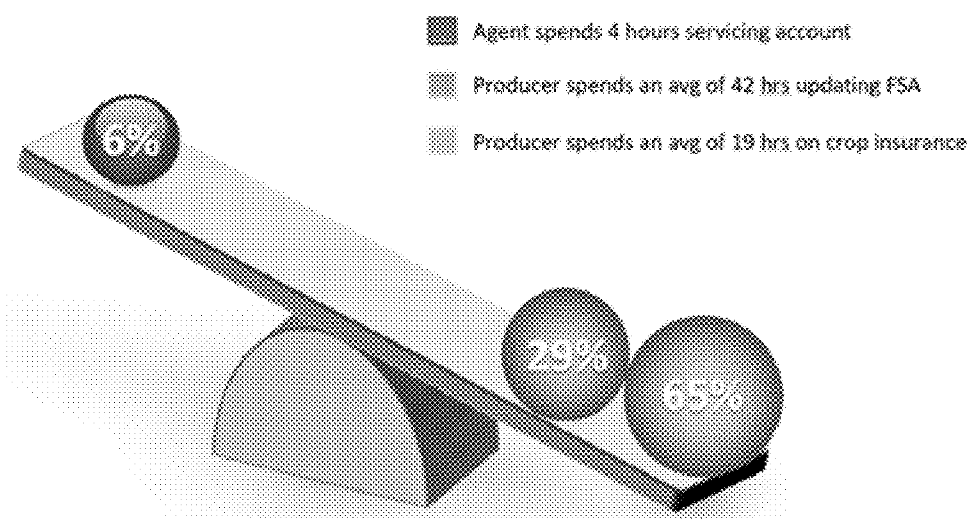
FIG. 1I is an illustration of resources required for the traditional crop data reporting process.
Figure 2C:
FIG. 2C is a flowchart of process for reporting crop data utilizing the system of FIGS. 2A-2B, according to an embodiment.
Figure 2D:
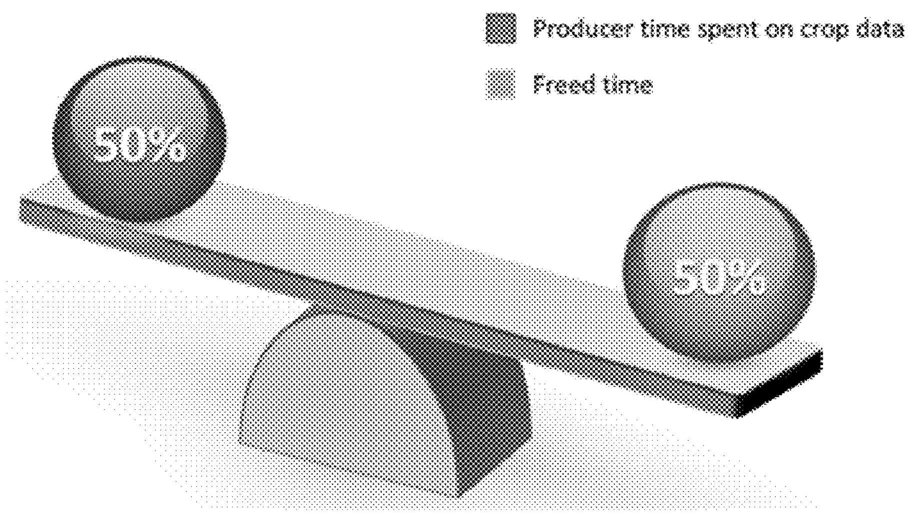
FIG. 2D is an illustration of resources required for crop data reporting of the systems and methods of FIGS. 2A-2C, according to an embodiment.

Referring to FIG. 2C, an improved process is achieved. As will be described, a producer can electronically enter field data into a single platform. That data can be analyzed or normalized and transmitted to AIP, FSA, and RMA. Referring to FIG. 2D, and in contrast to FIG. 1I, producer time is thereby freed up.

Figure 3A:
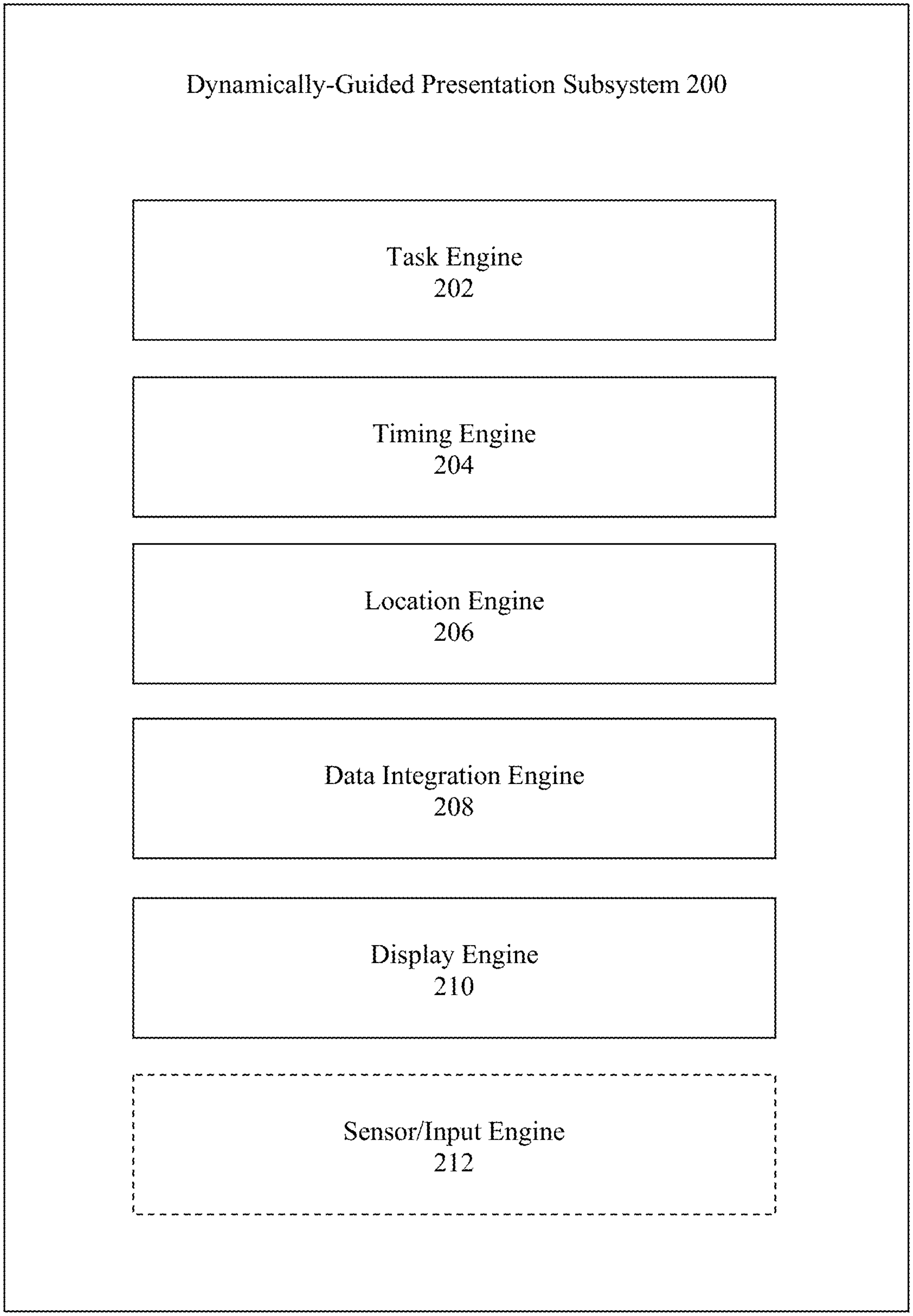
FIG. 3A is a block diagram of a dynamically-guided presentation subsystem, according to an embodiment.

In particular, referring to FIG. 3A, a block diagram of a dynamically-guided presentation subsystem 200 is depicted, according to an embodiment. Dynamically-guided presentation subsystem 200 can be implemented by processor 110 and memory 112 described above with respect to dynamic agriculture server 104.

In an embodiment, dynamically-guided presentation subsystem 200 generally comprises a task engine 202, a timing engine 204, a location engine 206, a data integration engine 208, a display engine 210, and optionally, a sensor/input engine 212. In embodiments, any of task engine 202, timing engine 204, location engine 206, data integration engine 208, and display engine 210 can be operably coupled with each other such that data can be passed.

Task engine 202 is configured to manage the user-specific tasks for presentation. For example, task engine 202 can be preconfigured with or access data corresponding to policy tasks, yield tasks, reporting tasks, coverage tasks, claim tasks, billing tasks, and so on. In an embodiment, task engine 202 is configured to input best practices such as, for example, Sustainable Agricultural Research and Education (SARE) or the USDA and output tasks corresponding to those best practices. In an embodiment, task engine 202 can be integrated with a farm management information system to develop tasks related to the particular farm. In an embodiment, task engine 202 can be integrated with accounting systems, production records, inventory controls, finance evaluations, or an enterprise resource planning system to develop tasks related to the particular farm. In an embodiment, task engine 202 can be integrated with a farmer's almanac to develop tasks related to the particular farm. Task engine 202 can selectively strip these data sources for relevant data related to a predefined set of tasks using natural language recognition and artificial intelligence to supplement the predefined set of tasks. In another embodiment, task engine 202 can selectively strip data sources to define a new set of tasks or individual tasks.

In an embodiment, task engine 202 can be communicatively coupled to other farms' data repositories. For example, task engine 202 can utilize data from other farms to develop tasks related to the at-issue farm. Similar situations (e.g. weather, location, and crop) can then be utilized to more accurately develop task data.

Timing engine 204 is configured to determine timing data related to each task. Timing engine 204 can determine time as narrow or broad as needed for the various tasks. For example, timing engine 204 can utilize a computer clock timestamp for narrow tasks, or in another example, an electronic seasonal calendar indicator for broader season-based tasks. In an embodiment, timing engine 204 can utilize electronic-available timing data such as the relative phases of the moon or daylight phases. In an embodiment, timing engine 204 can dynamically update timing data as necessary, including when an additional piece of timing data is incorporated. In an embodiment, timing engine 204 can derive timing information from a user device, such as the user's mobile or desktop device.

Location engine 206 is configured to determine location data related to each task. In an embodiment, location engine 206 can utilize computer location-based hardware such as a MAC or network address, or GPS-based location of a farm, farm equipment, or farmer location. For example, farm equipment can include a GPS transmitter that can be read by location engine 206. Similarly, a farmer user's personal device such as a mobile phone can include a GPS transmitter or GPS-based "home" setting that can be read by location engine 206. In embodiments, location data can be manually entered into location engine 206, such as the user indicating a relative location on an electronic map.

Data integration engine 208 is configured to integrate task data, timing data, and location data from the various engines and databases to populate the displays of display engine 210. In embodiments, data integration engine 208 is configured to consider various decision criteria related to the task, timing, and location of the data in order to select only appropriate data. Accordingly, tasks are populated according to user-specific timing and location data. In an embodiment, data integration engine 208 can incorporate decision criteria based on individual user data, such as crop not yet sold. In embodiments, once populated, the data is packaged for display engine 210.

In an embodiment, data integration engine 208 can make predictive suggestions based on historical data for the particular farm/field (and/or neighboring farms). Predictive suggestions can be made based on commonality of tasks or efficiency considerations (e.g. a neighboring farm is given more weight than a farm that is far from the instant farm). In another example, a farm operating at higher efficiency is given more weight than a farm operating at lower efficiency. Further, data integration engine 208 can indicate where the instant farm is slow or fast compared to nearby farms and package the task data accordingly. In an embodiment, data integration engine 208 can suggest key times for tasks (planning, etc.) based on the schedule of nearby farms from timing engine 204.

In an embodiment, data integration engine 208 can automatically suggest acreage during a reporting process based on the location data suggested. In an embodiment, data from location engine 206 can be utilized such that planting areas and/or rotations are suggested by analyzing the layout of the farm (e.g. easier to plan certain crops in long, straight rectangles compared to squares due to amount of turns for planting and harvesting).

In an embodiment, in the event of a problem area (or pending claim) on part of the farm (such as a flood), data integration engine 208 can automatically recommend a new layout with available space and report damage to the insurance agent user or insurance company database.

In an embodiment, data integration engine 208 can track or allow the farmer to enter pesticide location and/or frequency to order to predict the location of potential spread (in case of danger to other crops or "organics" considerations.

In an embodiment, data integration engine 208 can find and compare similar farm profiles based on data from location engine 206. In an embodiment, data integration engine 208 can automatically anonymize all data moving in and out of the system to provide privacy for the instant farm and comparison farms.

Display engine 210 is configured to display selected task data, as populated by timing engine 204, location engine 206, and data integration engine 208. In embodiments, display engine 210 can be integrated with a user interface such as user interface 102. The goal of display engine 210 is to present task data as applied to the specific user without overwhelming the user with massive amounts of data. For example, intuitive data fields, graphical icons, and radio buttons are utilized to intuitively present data to a user and receive data from the user. Algorithms determining the type and style of presentation are described herein, which one skilled in the art will understand can be implemented across task engine 202, timing engine 204, location engine 206, data integration engine 208, and sensor/input engine 212 as appropriate.

In an embodiment, display engine 210 is configured to populate the selected task data to the graphical user interface by selectively presenting all products the user has purchased on a single screen. Usability is thereby improved over existing systems.

In an embodiment, each of the plurality of tasks includes a set of icons associated with the task. Accordingly, display engine 210 is further configured to delete from memory the sets of icons for all tasks that have been completed. For example, icon data is not stored in the cloud and does not take up any memory. In an embodiment, a first step in executing a task is deleting the previous task's icon data and temporary data. In another embodiment, a final step in a task is deleting that task's icon data and other temporary data. Thus, memory usage is more efficient compared to existing systems.

In an embodiment, display engine 210 is further configured to populate a primary screen and a task-based screen, wherein upon log-out and re-log-in, the display engine is further configured to immediately populate the task-based screen. Usability is thereby improved over existing systems.

In an embodiment, display engine 210 is further configured to automatically present a subsequent task in the plurality of tasks once a previous task in the plurality of tasks is completed, as shown in subsequent figures and algorithms. More particularly, once an action has been completed, the main screen changes based on what has been completed. For example, crop insurance comprises four quarters (sales, acreage reporting, production reporting and claims). Once a quarter is done or if all actions within the quarter are completed, the system moves on to the next quarter (task). For example, if a farmer has reported harvested yields (production report), embodiments will proceed to the next cycle (e.g. sales screen). In an embodiment, if a deadline is approaching and the farmer has not completed certain criteria, the farmer will receive a text, phone call or email (he chooses) to remind him of the deadline. Usability is thereby improved over existing systems.

In an embodiment, dynamically-gided presentation subsystem 200 can optionally further comprise a sensor/input engine 212. In an embodiment, sensor/input engine 212 can utilize one or more sensors to drive task engine 202 presentation. For example, sensor/input engine 212 can be operably coupled to a rain sensor, sun sensor, atmospheric pressure sensor, or any other suitable sensor. Data from such sensors can be incorporated into task engine 202 so that tasks can be micro-tailored to particular users. For example, users in locations receiving an excess amount of rain can be presented different tasks that users in locations receiving an excess amount of sun. In embodiments, sensors can be located at specific user locations, such as a particular farm, or at particular regions such that regional data can be extrapolated for a particular location within that region. In another embodiment, sensor/input engine 212 can interface with databases containing weather data, such as from the National Weather Service.

Accordingly, external weather synchronization (both negative and positive weather indications) can be realized with sensor/input engine 212 to optimize the presented tasks. For example, a planting task may be moved up or back in the task schedule based on frost timing, rain, sun, etc.

In an embodiment, display engine 210 is configured to display and receive selected task data according to the algorithms described and depicted herein. For example, referring to FIGS. 4-24, screenshots of user interfaces for a system for dynamic agriculture data processing are depicted, according to embodiments. The interfaces depicted in FIGS. 4-24 can be controlled or operated on by the following tables.

TABLE 1

| Icon identifier | Icon |
|---|---|
| a | Add crop or county |
| b | Add fall crop |
| c | Add land |
| d | acres |
| e | buy/renew coverage |
| f | claim info |
| g | compare premiums and plans |
| h | Compare products for all companies |
| i | Crop insurance tools |

TABLE 1-continued

| Icon identifier | Icon |
|---|---|
| j | current coverage |
| k | FSA recon |
| l | guarantees |
| m | Home |
| n | import FSA acres |
| o | import FSN data |
| p | import planting intentions |
| q | import precision farm acres |
| r | import precision field data |
| s | live chat |
| t | maps |
| u | my account |
| v | pay bill |
| w | planting intentions |
| x | policy info |
| y | premium |
| z | prevent plant calculator |
| aa | prevent plant claim |
| bb | Quick plant |
| cc | quote |
| dd | replant calculator |

TABLE 1-continued

| Icon identifier | Icon |
|---|---|
| ee | replant claim |
| ff | Report acres to FSA |
| gg | reported acres |
| hh | report yields |
| ii | revenue calculator |
| jj | revenue price discovery |
| kk | revise yields |
| ll | share data |
| mm | update field info |
| nn | update planting intentions |
| oo | update yields |
| pp | upload scale tickets |
| qq | 1099 info |
| ! | important notices |
| rr | add or revise hail coverage |
| ss | revise acres |
| tt | report claim |
| uu | field map |
| vv | buy/renew fall coverage |

TABLE 2

| UI Page # | Date span | If this situation | Icons on screen | When this item has been submitted | Then this is the result to the UI | changes to UI page # |
|---|---|---|---|---|---|---|
| 1 | all year | Home page -- only if selected | n/a | n/a | n/a | n/a |
| 2 | 3/16 to 4/29 | yields haven't been reported, add or revise hail | hh, !, j, nn, r, pp, dd, ee, z, rr | hh | !, j, nn, dd, oo, z, rr | 3 |
| 3 | 3/16 to 4/29 | yields have been reported, add or revise hail | !, j, nn, dd, oo, z, rr | oo | !, j, nn, dd, oo, z, rr | 3 |
| 4 | 4/30 to 7/15 | acreage reporting | gg, !, r, k, p, ee, z, c, uu, bb, rr | gg | ii, ss, tt, ll, v | 5 |
| 5 | to July 15 | after acres reported through July 15 | ss, cc, ll, v | none | ss, tt, ll, v | 5 |
| 6 | 7/16 to 8/14 | Crop revenue calculator - bill has not been paid | ii, tt, ll, hh, v | v | ii, tt, ll, hh | 10 |
| 7 | 8/15 to 9/30 | Fall Renewal and revenue calculator - bill paid | vv, ii, tt, ll, b | | vv, ii, tt, ll, b | 8 |
| 8 | 8/15 to 9/30 | Fall Renewal and revenue calculator - bill not paid | vv, ii, tt, ll, v, b | v | vv, ii, tt, ll, b | 8 |
| 9 | 10/1 to 10/31 | Crop revenue calculato r- bill has not been paid | ii, tt, ll, hh, v | v | ii, tt, ll, hh | 10 |
| 10 | 10/1 to 10/31 | Crop revenue calculator - bill has been paid & yields not reported | ii, tt, ll hh | hh | ii, tt, ll, hh | 11 |
| 11 | 10/1 to 10/31 | Crop revenue calculator - bill has been paid & yields reported | ii, tt, ll | | e, !, h, jj, mm, kk, qq, a | 11 |
| 12 | 11/1 to 12/14 | Report yields-bill hasn't been paid | hh, !, r, pp, tt, v | hh | e, !, h, jj, mm, kk, v | 16 |
| 13 | 11/1 to 12/14 | Report yields - bill has been paid | hh, !, h, jj, mm, qq, a | hh | e, !, h, jj, mm, kk, qq, a | 14 |
| 14 | 12/15 to 3/15 | Sales Season - production reported & billed paid | e, !, h, jj, mm, kk, qq, a | | e, !, h, jj, mm, kk, qq, a | 14 |
| 15 | 12/15 to 3/15 | Sales Season - production not reported & billed paid | e, !, h, jj, mm, qq, hh, a | hh | e, !, h, jj, mm, kk, qq, a | 14 |

TABLE 2-continued

| UI Page # | Date span | If this situation | Icons on screen | When this item has been submitted | Then this is the result to the UI | changes to UI page # |
|---|---|---|---|---|---|---|
| 16 | 12/15 to 3/15 | Sales Season - production has been reported and bill not paid | e, !, h, jj, mm, kk, v, a | v | e, !, h, jj, mm, kk, qq, a | 14 |
| 17 | 12/15 to 3/15 | Sales Season - production has not been reported and bill not paid | e, !, h, jj, mm, v, hh, a | v, hh | e, !, h, jj, mm, kk, qq, a | 14 |
| 18 | 10/1 to 10/31 | Crop revenue calculator- production reported & bill not paid | !, ii tt, ll, oo, v | v | !, ii, tt, ii, oo | 18 |
| 19 | | Sales renewal -- overview | | | | |
| 20 | | Transparency Layer example | dependent upon date span & icon selected | n/a | n/a | n/a |
| 21 | | Transparency Layer example | dependent upon date span & icon selected | n/a | n/a | n/a |
| | all year | displayed 100% of the time | i, m, s, u, ll | n/a | n/a | n/a |

TABLE 3

| Icon Identifier | Action | Action |
|---|---|---|
| | 1 | 1099 info |
| | 2 | acreage report electronically submitted |
| | 3 | acreage report entered, not submitted |
| | 4 | acreage reporting |
| a | 5 | add crop or county |
| b | 6 | add fall crop |
| c | 7 | add land |
| rr | 8 | add or revise hail coverage |
| e | 9 | buy/renew coverage |
| vv | 10 | buy/renew fall coverage |
| | 11 | claims electronically submitted |
| | 12 | claims electronically submitted |
| | 13 | claims entered, not submitted |
| g | 14 | compare premiums and plans |
| h | 15 | Compare products for all companies |
| | 16 | coverage electroncally submitted |
| | 17 | coverage entered, not submitted |
| j | 18 | current coverage |
| | 19 | data sent to server |
| | 20 | fall coverage electronically submitted |
| | 21 | field map |
| k | 22 | FSA recon |
| p | 23 | import planting intentions |
| r | 24 | import precision field data |
| | 25 | manually enter acres |

TABLE 3-continued

| Icon Identifier | Action | Action |
|---|---|---|
| | 26 | manually enter yields |
| | 27 | Non Stored Data tools |
| v | 28 | pay bill - in full |
| | 29 | pay bill - partial |
| w | 30 | planting intentions |
| z | 31 | prevent plant calculator |
| aa | 32 | prevent plant claim |
| bb | 33 | quick plant |
| dd | 34 | replant calculator |
| ee | 35 | replant claim |
| | 36 | report acres |
| tt | 37 | report claim |
| hh | 38 | report yields |
| ii | 39 | revenue calculator |
| jj | 40 | revenue price discovery |
| ss | 41 | revise acres |
| kk | 42 | revise yields |
| ll | 43 | share data |
| mm | 44 | update field info |
| nn | 45 | update planting intentions |
| oo | 46 | update yields |
| pp | 47 | upload scale tickets |
| | 48 | yield report electronically submitted |
| | 49 | yield report entered, not submitted |

TABLE 4

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 3/16 | 4/29 | Current coverage | oo, j, nn, dd, z, rr | 3 | 31 | Prevent plant calculator | z | No | none | oo, j, nn, dd, z, rr | 3 |
| 3/16 | 4/29 | Current coverage | oo, j, nn, dd, z, rr | 3 | 34 | Replant calculator | dd | No | none | oo, j, nn, dd, z, rr | 3 |
| 3/16 | 4/29 | Current coverage | oo, j, nn, dd, z, rr | 3 | 45 | Update planting intentions | nn | No | none | oo, j, nn, dd, z, rr | 3 |
| 3/16 | 4/29 | Current coverage | oo, j, nn, dd, z, rr | 3 | 46 | update yields | oo | No | none | oo, j, nn, dd, z, rr | 3 |
| 3/16 | 4/29 | Current coverage | oo, j, nn, dd, z, rr | 3 | 46 | update yields | oo | Yes | none | oo, j, nn, dd, z, rr | 3 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 3/16 | 4/29 | Report yields | hh, j, nn, r, pp, dd, z, rr | 2 | 8 | Add or revise hail coverage | rr | No | none | hh, j, nn, r, pp, dd, z, rr | 2 |
| 3/16 | 4/29 | Report yields | hh, j, nn, r, pp, dd, z, rr | 2 | 8 | Add or revise hail coverage | rr | Yes | none | hh, j, nn, r, pp, dd, z, rr | 2 |
| 3/16 | 4/29 | Report yields | hh, j, nn, r, pp, dd, z, rr | 2 | 24 | import precision field data | r | No | none | hh, j, nn, r, pp, dd, z, rr | 2 |
| 3/16 | 4/29 | Report yields | hh, j, nn, r, pp, dd, z, rr | 2 | 24 | import precision field data | r | Yes | r, hh, pp | oo, j, nn, dd, z, rr | 3 |
| 3/16 | 4/29 | Report yields | hh, j, nn, r, pp, dd, z, rr | 2 | 31 | Prevent plant calculator | z | No | none | hh, j, nn, r, pp, dd, z, rr | 2 |
| 3/16 | 4/29 | Report yields | hh, j, nn, r, pp, dd, z, rr | 2 | 34 | Replant calculator | dd | No | none | hh, j, nn, r, pp, dd, z, rr | 2 |
| 3/16 | 4/29 | Report yields | hh, j, nn, r, pp, dd, z, rr | 2 | 38 | report yields | hh | No | none | hh, j, nn, r, pp, dd, z, rr | 2 |
| 3/16 | 4/29 | Report yields | hh, j, nn, r, pp, dd, z, rr | 2 | 38 | report yields | hh | Yes | r, hh, pp | oo, j, nn, dd, z, rr | 3 |
| 3/16 | 4/29 | Report yields | hh, j, nn, r, pp, dd, z, rr | 2 | 45 | Update Planting intentions | nn | No | none | hh, j, nn, r, pp, dd, z, rr | 2 |
| 3/16 | 4/29 | Report yields | hh, j, nn, r, pp, dd, z, rr | 2 | 47 | Upload scale tickets | pp | No | none | hh, j, nn, r, pp, dd, z, rr | 2 |
| 3/16 | 4/29 | Report yields | hh, j, nn, r, pp, dd, z, rr | 2 | 47 | Upload scale tickets | pp | Yes | r, hh, pp | oo, j, nn, dd, z, rr | 3 |
| 4/30 | 7/15 | Acreage reporting | gg, rr, bb, r, k, p, ee aa, c, uu | 4 | 7 | add land | c | No | none | gg, rr, bb, r, k, p, ee aa, c, uu | 4 |
| 4/30 | 7/15 | Acreage reporting | gg, rr, bb, r, k, p, ee aa, c, uu | 4 | 7 | add land | c | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 8 | add or revice hail coverage | rr | No | none | gg, rr, bb, r, k, p, ee aa, c, uu | 4 |
| 4/30 | 7/15 | Acreage reporting | gg, rr, bb, r, k, p, ee aa, c, uu | 4 | 8 | add or revice hail coverage | rr | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 21 | filed map | uu | No | none | gg, rr, bb, r, k, p, ee aa, c, uu | 4 |
| 4/30 | 7/15 | Acreage reporting | gg, rr, bb, r, k, p, ee aa, c, uu | 4 | 21 | filed map | uu | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 22 | FSA recon | k | No | none | gg, rr, bb, r, k, p, ee aa, c, uu | 4 |
| 4/30 | 7/15 | Acreage reporting | gg, rr, bb, r, k, p, ee aa, c, uu | 4 | 22 | FSA recon | k | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 23 | import planting intentions | p | No | none | gg, rr, bb, r, k, p, ee aa, c, uu | 4 |
| 4/30 | 7/15 | Acreage reporting | gg, rr, bb, r, k, p, ee aa, c, uu | 4 | 23 | import planting intentions | p | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 24 | import precision field data | r | No | none | gg, rr, bb, r, k, p, ee aa, c, uu | 4 |
| 4/30 | 7/15 | Acreage reporting | gg, rr, bb, r, k, p, ee aa, c, uu | 4 | 24 | import precision field data | r | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 30 | planting intentions | w | No | none | gg, rr, bb, r, k, p, ee aa, c, uu | 4 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 4/30 | 7/15 | Acreage reporting | gg, rr, bb, r, k, p, ee aa, c, uu | 4 | 30 | planting intentions | w | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 32 | prevent plant claim | aa | No | none | gg, rr, bb, r, k, p, ee aa, c, uu | 4 |
| 4/30 | 7/15 | Acreage reporting | gg, rr, bb, r, k, p, ee aa, c, uu | 4 | 32 | prevent plant claim | aa | Yes | aa | ii, ss, tt, ll, v | 5 |
| 4/30 | 7/15 | Acreage reporting | gg, rr, bb, r, k, p, ee aa, c, uu | 4 | 33 | quick plant | bb | No | none | gg, rr, bb, r, k, p, ee aa, c, uu | 4 |
| 4/30 | 7/15 | Acreage reporting | gg, rr, bb, r, k, p, ee aa, c, uu | 4 | 33 | quick plant | bb | Yes | c, gg, bb, r, k, w, uu, rr | ii, ss, tt, ll, v | 5 |
| 4/30 | 7/15 | Acreage reporting | gg, rr, bb, r, k, p, ee aa, c, uu | 4 | 35 | replant claim | ee | No | none | gg, rr, bb, r, k, p, ee aa, c, uu | 4 |
| 4/30 | 7/15 | Acreage reporting | gg, rr, bb, r, k, p, ee aa, c, uu | 4 | 35 | replant claim | ee | Yes | ee | ii, ss, tt, ll, v | 5 |
| 4/30 | 7/15 | Acreage reporting | gg, rr, bb, r, k, p, ee aa, c, uu | 4 | 36 | report acres | gg | No | none | gg, rr, bb, r, k, p, ee aa, c, uu | 4 |
| 4/30 | 7/15 | Acreage reporting | gg, rr, bb, r, k, p, ee aa, c, uu | 4 | 36 | report acres | gg | Yes | c, gg, bb, r, k, w, uu, rr | ii, ss, tt, ll, v | 5 |
| 7/16 | 8/14 | Revenue Calculator | ii, tt, ll, v | 6 | 28 | pay bill-in full | v | Yes | v | ii, tt, ll | 6 |
| 7/16 | 8/14 | Revenue Calculator | ii, tt, ll, v | 6 | 29 | pay bill-partially | v | Yes | none | ii, tt, ll, v | 6 |
| 7/16 | 8/14 | Revenue Calculator | ii, tt, ll, v | 6 | 35 | report claim | tt | No | none | ii, tt, ll, v | 6 |
| 7/16 | 8/14 | Revenue Calculator | ii, tt, ll, v | 6 | 35 | report claim | tt | Yes | none | ii, tt, ll, v | 6 |
| 7/16 | 8/14 | Revenue Calculator | ii, tt, ll, v | 6 | 38 | report yields | hh | No | none | ii, tt, ll, v | 6 |
| 7/16 | 8/14 | Revenue Calculator | ii, tt, ll, v | 6 | 43 | share data | ll | No | none | ii, tt, ll, v | 6 |
| 7/16 | 8/14 | Revenue Calculator | ii, tt, ll, v | 6 | 43 | share data | ll | Yes | none | ii, tt, ll, v | 6 |
| 8/15 | 9/30 | Fall Sales | vv, ii, tt, ll, b | 7 | 6 | add fall crop | b | Yes | none | vv, ii, tt, ll, b | 7 |
| 8/15 | 9/30 | Fall Sales | vv, ii, tt, ll, b | 7 | 6 | add fall crop | b | No | none | vv, ii, tt, ll, b | 7 |
| 8/15 | 9/30 | Fall Sales | vv, ii, tt, ll, v, b | 8 | 6 | add fall crop | b | No | none | vv, ii, tt, ll, v, b | 8 |
| 8/15 | 9/30 | Fall Sales | vv, ii, tt, ll, v, b | 8 | 6 | add fall crop | b | Yes | none | vv, ii, tt, ll, v, b | 8 |
| 8/15 | 9/30 | Fall Sales | vv, ii, tt, ll, b | 7 | 10 | buy or renew fall coverage | vv | Yes | none | vv, ii, tt, ll, b | 7 |
| 8/15 | 9/30 | Fall Sales | vv, ii, tt, ll, b | 7 | 10 | buy or renew fall coverage | vv | No | none | vv, ii, tt, ll, b | 7 |
| 8/15 | 9/30 | Fall Sales | vv, ii, tt, ll, v, b | 8 | 10 | buy or renew fall coverage | vv | No | none | vv, ii, tt, ll, v, b | 8 |
| 8/15 | 9/30 | Fall Sales | vv, ii, tt, ll, v, b | 8 | 10 | buy or renew fall coverage | vv | Yes | none | vv, ii, tt, ll, v, b | 8 |
| 8/15 | 9/30 | Fall Sales | vv, ii, tt, ll, v, b | 8 | 28 | pay bill-in full | v | Yes | v | vv, ii, tt, ll, v, b | 7 |
| 8/15 | 9/30 | Fall Sales | vv, ii, tt, ll, v, b | 8 | 29 | pay bill-partially | v | Yes | none | vv, ii, tt, ll, v, b | 8 |
| 8/15 | 9/30 | Fall Sales | vv, ii, tt, ll, b | 7 | 35 | report claim | tt | Yes | none | vv, ii, tt, ll, b | 7 |
| 8/15 | 9/30 | Fall Sales | vv, ii, tt, ll, b | 7 | 35 | report claim | tt | No | none | vv, ii, tt, ll, b | 7 |
| 8/15 | 9/30 | Fall Sales | vv, ii, tt, ll, v, b | 8 | 35 | report claim | tt | No | none | vv, ii, tt, ll, v, b | 8 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 8/15 | 9/30 | Fall Sales | vv, ii, tt, ll, v, b | 8 | 35 | report claim | tt | Yes | none | vv, ii, tt, ll, v, b | 8 |
| 8/15 | 9/30 | Fall Sales | vv, ii, tt, ll, b | 7 | 39 | revenue calculator | ii | No | none | vv, ii, tt, ll, b | 7 |
| 8/15 | 9/30 | Fall Sales | vv, ii, tt, ll, v, b | 8 | 39 | revenue calculator | ii | No | none | vv, ii, tt, ll, v, b | 8 |
| 8/15 | 9/30 | Fall Sales | vv, ii, tt, ll, b | 7 | 43 | share data | ll | Yes | none | vv, ii, tt, ll, b | 7 |
| 8/15 | 9/30 | Fall Sales | vv, ii, tt, ll, b | 7 | 43 | share data | ll | No | none | vv, ii, tt, ll, b | 7 |
| 8/15 | 9/30 | Fall Sales | vv, ii, tt, ll, v, b | 8 | 43 | share data | ll | No | none | vv, ii, tt, ll, v, b | 8 |
| 8/15 | 9/30 | Fall Sales | vv, ii, tt, ll, v, b | 8 | 43 | share data | ll | Yes | none | vv, ii, tt, ll, v, b | 8 |
| 10/1 | 10/31 | Revenue Calculator | ii, tt, ll, hh, v | 9 | 29 | pay bill-partially | v | Yes | none | ii, tt, ll, hh, v | 9 |
| 10/1 | 10/31 | Revenue Calculator | ii, tt, ll, hh, v | 9 | 28 | pay bill-in full | v | Yes | v | ii, tt, ll, hh | 10 |
| 10/1 | 10/31 | Revenue Calculator | ii, tt, ll, oo, v | 18 | 28 | pay bill-in full | v | Yes | v | ii, tt, ll | 11 |
| 10/1 | 10/31 | Revenue Calculator | ii, tt, ll, oo, v | 18 | 29 | pay bill-partially | v | Yes | none | ii, tt, ll, oo, v | 18 |
| 10/1 | 10/31 | Revenue Calculator | ii, tt, ll, hh, v | 9 | 35 | report claim | tt | No | none | ii, tt, ll, hh, v | 9 |
| 10/1 | 10/31 | Revenue Calculator | ii, tt, ll, hh, v | 9 | 35 | report claim | tt | Yes | none | ii, tt, ll, hh, v | 9 |
| 1-Oct | 31-Oct | Revenue Calculator | ii, tt, ll, hh | 10 | 35 | report claim | tt | No | none | ii, tt, ll, hh | 10 |
| 1-Oct | 31-Oct | Revenue Calculator | ii, tt, ll, hh | 10 | 35 | report claim | tt | Yes | none | ii, tt, ll, hh | 10 |
| 1-Oct | 31-Oct | Revenue Calculator | ii, tt, ll | 11 | 35 | report claim | tt | No | none | ii, tt, ll | 11 |
| 1-Oct | 31-Oct | Revenue Calculator | ii, tt, ll | 11 | 35 | report claim | tt | Yes | none | ii, tt, ll | 11 |
| 10/1 | 10/31 | Revenue Calculator | ii, tt, ll, oo, v | 18 | 35 | report claim | tt | Yes | none | ii, tt, ll, oo, v | 18 |
| 10/1 | 10/31 | Revenue Calculator | ii, tt, ll, oo, v | 18 | 35 | report claim | tt | No | none | ii, tt, ll, oo, v | 18 |
| 10/1 | 10/31 | Revenue Calculator | ii, tt, ll, hh, v | 9 | 38 | report yields | hh | No | none | ii, tt, ll, hh, v | 9 |
| 10/1 | 10/31 | Revenue Calculator | ii, tt, ll, hh, v | 9 | 38 | report yields | hh | Yes | hh | ii, tt, ll | 18 |
| 1-Oct | 31-Oct | Revenue Calculator | ii, tt, ll, hh | 10 | 38 | revenue yields | hh | No | none | ii, tt, ll, hh | 10 |
| 1-Oct | 31-Oct | Revenue Calculator | ii, tt, ll, hh | 10 | 38 | report yields | hh | Yes | hh | ii, tt, ll | 11 |
| 1-Oct | 31-Oct | Revenue Calculator | ii, tt, ll, hh | 10 | 39 | revenue calculator | ii | No | none | ii, tt, ll, hh | 10 |
| 1-Oct | 31-Oct | Revenue Calculator | ii, tt, ll | 11 | 39 | revenue calculator | ii | No | none | ii, tt, ll | 11 |
| 10/1 | 10/31 | Revenue Calculator | ii, tt, ll, oo, v | 18 | 39 | revenue calculator | ii | No | none | ii, tt, ll, oo, v | 18 |
| 1-Oct | 31-Oct | Revenue Calculator | ii, tt, ll, hh, v | 9 | 43 | share data | ll | No | none | ii, tt, ll, hh, v | 9 |
| 1-Oct | 31-Oct | Revenue Calculator | ii, tt, ll, hh, v | 9 | 43 | share data | ll | Yes | none | ii, tt, ll, hh, v | 9 |
| 1-Oct | 31-Oct | Revenue Calculator | ii, tt, ll, hh | 10 | 43 | share data | ll | No | none | ii, tt, ll, hh | 10 |
| 1-Oct | 31-Oct | Revenue Calculator | ii, tt, ll, hh | 10 | 43 | share data | ll | Yes | none | ii, tt, ll, hh | 10 |
| 1-Oct | 31-Oct | Revenue Calculator | ii, tt, ll | 11 | 43 | share data | ll | No | none | ii, tt, ll | 11 |
| 1-Oct | 31-Oct | Revenue Calculator | ii, tt, ll | 11 | 43 | share data | ll | Yes | none | ii, tt, ll | 11 |
| 10/1 | 10/31 | Revenue Calculator | ii, tt, ll, oo, v | 18 | 43 | share data | ll | Yes | none | ii, tt, ll, oo, v | 18 |
| 10/1 | 10/31 | Revenue Calculator | ii, tt, ll, oo, v | 18 | 43 | share data | ll | No | none | ii, tt, ll, oo, v | 18 |
| 10/1 | 10/31 | Revenue Calculator | ii, tt, ll, oo, v | 18 | 46 | update yields | oo | No | none | ii, tt, ll, oo, v | 18 |
| 10/1 | 10/31 | Revenue Calculator | ii, tt, ll, oo, v | 18 | 46 | update yields | oo | Yes | none | ii, tt, ll, oo, v | 18 |
| 11/1 | 12/14 | Report yelds | hh, r, pp, tt, v | 12 | 24 | import precision field data | r | No | none | hh, r, pp, tt, v | 12 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 11/1 | 12/14 | Report yelds | hh, r, pp, tt, v | 12 | 24 | import precision field data | r | Yes | pp, hh, r | e, h, jj, mm, kk, v, a | 16 |
| 11/1 | 12/14 | Report yelds | hh, r, pp, tt, v | 13 | 24 | import precision field data | r | No | none | hh, r, pp, tt | 13 |
| 11/1 | 12/14 | Report yelds | hh, r, pp, tt | 13 | 24 | import precision field data | r | Yes | r, hh, pp | e, h, jj, mm, kk, qq, a | 14 |
| 11/1 | 12/14 | Report yelds | hh, r, pp, tt, v | 12 | 28 | pay bill-in full | v | Yes | v | hh, r, pp, tt | 13 |
| 11/1 | 12/14 | Report yelds | hh, r, pp, tt, v | 12 | 29 | pay bill-partially | v | Yes | none | hh, r, pp, tt, v | 12 |
| 11/1 | 12/14 | Report yelds | hh, r, pp, tt, v | 12 | 35 | report claim | tt | No | none | hh, r, pp, tt, v | 12 |
| 11/1 | 12/14 | Report yelds | hh, r, pp, tt, v | 12 | 35 | report claim | tt | Yes | none | hh, r, pp, tt, v | 12 |
| 11/1 | 12/14 | Report yelds | hh, r, pp, tt | 13 | 35 | report claim | tt | No | none | hh, r, pp, tt | 13 |
| 11/1 | 12/14 | Report yelds | hh, r, pp, tt | 13 | 35 | report claim | tt | Yes | none | hh, r, pp, tt | 13 |
| 11/1 | 12/14 | Report yelds | hh, r, pp, tt, v | 12 | 38 | report claim | hh | No | none | hh, r, pp, tt, v | 12 |
| 11/1 | 12/14 | Report yelds | hh, r, pp, tt, v | 12 | 38 | report yields | hh | Yes | pp, hh, r | e, h, jj, mm, kk, v, a | 16 |
| 11/1 | 12/14 | Report yelds | hh, r, pp, tt | 13 | 38 | report yields | hh | No | none | hh, r, pp, tt | 13 |
| 11/1 | 12/14 | Report yelds | hh, r, pp, tt | 13 | 38 | report yields | hh | Yes | r, hh, pp | e, h, jj, mm, kk, qq, a | 14 |
| 11/1 | 12/14 | Report yelds | hh, r, pp, tt, v | 12 | 47 | Upload scale tickets | pp | No | none | hh, r, pp, tt, v | 12 |
| 11/1 | 12/14 | Report yelds | hh, r, pp, tt, v | 12 | 47 | Upload scale tickets | pp | Yes | pp, hh, r | e, h, jj, mm, kk, v, a | 16 |
| 11/1 | 12/14 | Report yelds | hh, r, pp, tt | 13 | 47 | Upload scale tickets | pp | No | none | hh, r, pp, tt | 13 |
| 11/1 | 12/14 | Report yelds | hh, r, pp, tt | 13 | 47 | Upload scale tickets | pp | Yes | r, hh, pp | e, h, jj, mm, kk, qq, a | 14 |
| 12/15 | 3/15 | Sales Season | e, h, jj, mm, kk, qq, a | 14 | 1 | 1099 info | qq | No | none | e, h, jj, mm, kk, qq, a | 14 |
| 12/15 | 3/15 | Sales Season | e, h, jj, mm, qq, hh, a | 15 | 1 | 1099 info | qq | No | none | e, h, jj, mm, qq, hh, a | 15 |
| 12/15 | 3/15 | Sales Season | e, h, jj, mm, kk, v, a | 16 | 1 | 1099 info | qq | No | none | e, h, jj, mm, kk, v, a | 16 |
| 12/15 | 3/15 | Sales Season | e, h, jj, mm, v, hh, a | 17 | 5 | add crop or county | a | No | none | e, h, jj, mm, v, hh, a | 17 |
| 12/15 | 3/15 | Sales Season | e, h, jj, mm, v, hh, a | 17 | 5 | add crop or county | a | Yes | none | e, h, jj, mm, v, hh, a | 17 |
| 12/15 | 3/15 | Sales Season | e, h, jj, mm, kk, qq, a | 14 | 5 | add crop or county | a | No | none | e, h, jj, mm, kk, qq, a | 14 |
| 12/15 | 3/15 | Sales Season | e, h, jj, mm, kk, qq, a | 14 | 5 | add crop or county | a | Yes | none | e, h, jj, mm, kk, qq, a | 14 |
| 12/15 | 3/15 | Sales Season | e, h, jj, mm, qq, hh, a | 15 | 5 | add crop or county | a | No | none | e, h, jj, mm, qq, hh, a | 15 |
| 12/15 | 3/15 | Sales Season | e, h, jj, mm, qq, hh, a | 15 | 5 | add crop or county | a | Yes | none | e, h, jj, mm, qq, hh, a | 15 |
| 12/15 | 3/15 | Sales Season | e, h, jj, mm, kk, v, a | 16 | 5 | add crop or county | a | No | none | e, h, jj, mm, kk, v, a | 16 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 12/15 | 3/15 | Sales Season | e, h, jj, mm, kk, v, a | 16 | 5 | add crop or county | a | Yes | none | e, h, jj, mm, kk, vv, a | 16 |
| 12/15 | 3/15 | Sales Season | e, h, jj, mm, kk, qq, a | 14 | 10 | buy/renew coverage | e | No | none | e, h, jj, mm, kk, qq, a | 14 |
| 12/15 | 3/15 | Sales Season | e, h, jj, mm, kk, qq, a | 14 | 10 | buy/renew coverage | e | Yes | none | e, h, jj, mm, kk, qq, a | 14 |
| 12/15 | 3/15 | Sales Season | e, h, jj, mm, qq, hh, a | 15 | 10 | buy/renew coverage | e | No | none | e, h, jj, mm, qq, hh, a | 15 |
| 12/15 | 3/15 | Sales Season | e, h, jj, mm, qq, hh, a | 15 | 10 | buy/renew coverage | e | Yes | none | e, h, jj, mm, qq, hh, a | 15 |
| 12/15 | 3/15 | Sales Season | e, h, jj, mm, kk, v, a | 16 | 10 | buy/renew coverage | e | No | none | e, h, jj, mm, kk, v, a | 16 |
| 12/15 | 3/15 | Sales Season | e, h, jj, mm, kk, v, a | 16 | 10 | buy/renew coverage | e | Yes | none | e, h, jj, mm, kk, v, a | 16 |
| 12/15 | 3/15 | Sales Season | e, h, jj, mm, v, hh, a | 17 | 10 | buy/renew coverage | e | No | none | e, h, jj, mm, v, hh, a | 17 |
| 12/15 | 3/15 | Sales Season | e, h, jj, mm, v, hh, a | 17 | 10 | buy/renew coverage | e | Yes | none | e, h, jj, mm, v, hh, a | 17 |
| 12/15 | 3/15 | Sales Season | e, h, jj, mm, v, hh, a | 17 | 15 | compare products for all companies | h | No | none | e, h, jj, mm, v, hh, a | 17 |
| 12/15 | 3/15 | Sales Season | e, h, jj, mm, v, hh, a | 17 | 15 | compare products for all companies | h | No | none | e, h, jj, mm, v, hh, a | 17 |
| 12/15 | 3/15 | Sales Season | e, h, jj, mm, kk, qq, a | 14 | 15 | compare products for all companies | h | No | none | e, h, jj, mm, kk, qq, a | 14 |
| 12/15 | 3/15 | Sales Season | e, h, jj, mm, qq, hh, a | 15 | 15 | compare products for all companies | h | No | none | e, h, jj, mm, qq, hh, a | 15 |
| 12/15 | 3/15 | Sales Season | e, h, jj, mm, kk, v, a | 16 | 15 | compare products for all companies | h | No | none | e, h, jj, mm, kk, v, a | 16 |
| 12/15 | 3/15 | Sales Season | e, h, jj, mm, kk, v, a | 16 | 28 | pay bill-in full | v | Yes | v | e, h, jj, mm, kk, qq, a | 14 |
| 12/15 | 3/15 | Sales Season | e, h, jj, mm, v, hh, a | 17 | 28 | pay bill-in full | v | Yes | v | e, h, jj, mm, qq, hh, a | 15 |
| 12/15 | 3/15 | Sales Season | e, h, jj, mm, kk, v, a | 16 | 29 | pay bill-partially | v | Yes | none | e, h, jj, mm, kk, v, a | 16 |
| 12/15 | 3/15 | Sales Season | e, h, jj, mm, v, hh, a | 17 | 29 | pay bill-partially | v | Yes | none | e, h, jj, mm, hh, a | 17 |
| 12/15 | 3/15 | Sales Season | e, h, jj, mm, qq, hh, a | 15 | 38 | report yields | hh | No | none | e, h, jj, mm, qq, hh, a | 15 |
| 12/15 | 3/15 | Sales Season | e, h, jj, mm, qq, hh, a | 15 | 38 | report yields | hh | Yes | hh | e, h, jj, mm, kk, qq, a | 14 |
| 12/15 | 3/15 | Sales Season | e, h, jj, mm, v, hh, a | 17 | 38 | report yields | hh | No | none | e, h, jj, mm, v, hh, a | 17 |
| 12/15 | 3/15 | Sales Season | e, h, jj, mm, v, hh, a | 17 | 38 | report yields | hh | Yes | hh | e, h, jj, mm, kk, v, a | 16 |
| 12/15 | 3/15 | Sales Season | e, h, jj, mm, v, hh, a | 17 | 40 | revenue price discovery | jj | No | none | e, h, jj, mm, v, a | 17 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| 12/15 | 3/15 | Sales Season | e, h, jj, mm, v, hh, a | 17 | 40 | revenue price discovery | jj | No | none | e, h, jj, mm, v, hh, a | 17 |
| 12/15 | 3/15 | Sales Season | e, h, jj, mm, kk, qq, a | 14 | 40 | revenue price discovery | jj | No | none | e, h, jj, mm, kk, qq, a | 14 |
| 12/15 | 3/15 | Sales Season | e, h, jj, mm, qq, hh, a | 15 | 40 | revenue price discovery | jj | No | none | e, h, jj, mm, qq, hh, a | 15 |
| 12/15 | 3/15 | Sales Season | e, h, jj, mm, kk, v, a | 16 | 40 | revenue price discovery | jj | No | none | e, h, jj, mm, kk, v, a | 16 |
| 12/15 | 3/15 | Sales Season | e, h, jj, mm, kk, qq, a | 14 | 42 | revise yields | kk | No | none | e, h, jj, mm, kk, qq, a | 14 |
| 12/15 | 3/15 | Sales Season | e, h, jj, mm, kk, qq, a | 14 | 42 | revise yields | kk | Yes | none | e, h, jj, mm, kk, qq, a | 14 |
| 12/15 | 3/15 | Sales Season | e, h, jj, mm, kk, v, a | 16 | 42 | revise yields | kk | No | none | e, h, jj, mm, kk, v, a | 16 |
| 12/15 | 3/15 | Sales Season | e, h, jj, mm, kk, v, a | 16 | 42 | revise yields | kk | Yes | none | e, h, jj, mm, kk, v, a | 16 |
| 12/15 | 3/15 | Sales Season | e, h, jj, mm, v, hh, a | 17 | 44 | update field info | mm | No | none | e, h, jj, mm, v, hh, a | 17 |
| 12/15 | 3/15 | Sales Season | e, h, jj, mm, v, hh, a | 17 | 44 | update field info | mm | Yes | none | e, h, jj, mm, v, hh, a | 17 |
| 12/15 | 3/15 | Sales Season | e, h, jj, mm, kk, qq, a | 14 | 44 | update field info | mm | No | none | e, h, jj, mm, kk, qq, a | 14 |
| 12/15 | 3/15 | Sales Season | e, h, jj, mm, kk, qq, a | 14 | 44 | update field info | mm | Yes | none | e, h, jj, mm, kk, qq, a | 14 |
| 12/15 | 3/15 | Sales Season | e, h, jj, mm, qq, hh, a | 15 | 44 | update field info | mm | No | none | e, h, jj, mm, qq, hh, a | 15 |
| 12/15 | 3/15 | Sales Season | e, h, jj, mm, qq, hh, a | 15 | 44 | update field info | mm | Yes | none | e, h, jj, mm, qq, hh, a | 15 |
| 12/15 | 3/15 | Sales Season | e, h, jj, mm, kk, v, a | 16 | 44 | update field info | mm | No | none | e, h, jj, mm, kk, v, a | 16 |
| 12/15 | 3/15 | Sales Season | e, h, jj, mm, kk, v, a | 16 | 44 | update field info | mm | Yes | none | e, h, jj, mm, kk, v, a | 16 |
| After acres reported but before 7/15 | 7/15 | Acreage reporting | ii, ss, tt, ll, v | 5 | 35 | report claim | tt | No | none | ii, ss, tt, ll, v | 5 |
| After acres reported but before 7/16 | 7/15 | Acreage reporting | ii, ss, tt, ll, v | 5 | 41 | revise acres | ss | No | none | ii, ss, tt, ll, v | 5 |
| After acres reported but before 7/17 | 7/15 | Acreage reporting | ii, ss, tt, ll, v | 5 | 43 | share data | ll | No | none | ii, ss, tt, ll, v | 5 |
| After acres reported but before 7/20 | 7/15 | Acreage reporting | ii, ss, tt, ll, v | 5 | 35 | report claim | tt | Yes | none | ii, ss, tt, ll, v | 5 |

TABLE 4-continued

| Start Date | End Date | Season | Icons displayed | UI page before action | Action # | Action | Icon idenitifier | signed & electroncially submitted? | Icon(s) removed | icons displayed after action | UI page after action |
|---|---|---|---|---|---|---|---|---|---|---|---|
| After acres reported but before 7/21 | 7/15 | Acreage reporting | ii, ss, tt, ll, v | 5 | 41 | revise acres | ss | Yes | none | ii, ss, tt, ll, v | 5 |
| After acres reported but before 7/22 | 7/15 | Acreage reporting | ii, ss, tt, ll, v | 5 | 39 | revenue calculator | ii | No | None | ii, ss, tt, ll, v | 5 |
| After acres reported but before 7/22 | 7/15 | Acreage reporting | ii, tt, ll, v | 6 | 39 | revenue calculator | ii | No | None | ii, ss, ll, v | 6 |
| After acres reported but before 7/22 | 7/15 | Acreage reporting | ii, ss, tt, ll, v | 5 | 43 | share data | ll | Yes | none | ii, ss, tt, ll, v | 5 |

TABLE 5A

| Start Date | End Date | Season | | Action 1 | Action 1 identifier | Actios 1 signed & electronically submitted form? | Action 1 icon removed |
|---|---|---|---|---|---|---|---|
| 10/1 | 10/31 | Revenue Calculator | Scenario 1 | pay bill - in full | v | Yes | v |
| 10/1 | 10/31 | Revenue Calculator | Scenario 2 | pay bill - in full | v | Yes | v |
| 10/1 | 10/31 | Revenue Calculator | Scenario 3 | pay bill - in full | v | Yes | v |
| 10/1 | 10/31 | Revenue Calculator | | report claim | tt | Yes | n/a |
| 10/1 | 10/31 | Revenue Calculator | | report claim | tt | Yes | n/a |
| 10/1 | 10/31 | Revenue Calculator | | report claim | tt | Yes | n/a |
| 10/1 | 10/31 | Revenue Calculator | | report yields | hh | Yes | hh |
| 10/1 | 10/31 | Revenue Calculator | | report yields | hh | Yes | hh |
| 10/1 | 10/31 | Revenue Calculator | | report yields | hh | Yes | hh |
| 10/1 | 10/31 | Revenue Calculator | | pay bill - partial | v | Yes | n/a |
| 10/1 | 10/31 | Revenue Calculator | | pay bill - partial | v | Yes | n/a |
| 10/1 | 10/31 | Revenue Calculator | | pay bill - partial | v | Yes | n/a |
| 10/1 | 10/31 | Revenue Calculator | | report claim | tt | Yes | n/a |
| 10/1 | 10/31 | Revenue Calculator | | report claim | tt | Yes | n/a |
| 10/1 | 10/31 | Revenue Calculator | | report claim | tt | Yes | n/a |
| 10/1 | 10/31 | Revenue Calculator | | report yields | hh | Yes | hh |
| 10/1 | 10/31 | Revenue Calculator | | report yields | hh | Yes | hh |
| 10/1 | 10/31 | Revenue Calculator | | report yields | hh | Yes | hh |
| 3/16 | 4/29 | Production reporting | | report yields | hh | Yes | hh |
| 3/16 | 4/29 | Production reporting | | report yields | hh | Yes | hh |
| 3/16 | 4/29 | Current coverage, add or revise hail | | add hail | rr | Yes | n/a |
| 11/1 | 12/14 | Production reporting | | report yields | hh | Yes | hh |
| 11/1 | 12/14 | Production reporting | | report yields | hh | yes | hh |

TABLE 5B

| Start Date | End Date | Season | | Action 2 | Action 2 identifier | Action 2 signed & electronically submitted form? | Action 2 icon removed |
|---|---|---|---|---|---|---|---|
| 10/1 | 10/31 | Revenue Calculator | Scenario 1 | none | n/a | n/a | n/a |
| 10/1 | 10/31 | Revenue Calculator | Scenario 2 | report claim | tt | Yes | n/a |
| 10/1 | 10/31 | Revenue Calculator | Scenario 3 | report claim | tt | Yes | n/a |
| 10/1 | 10/31 | Revenue Calculator | | none | n/a | n/a | n/a |
| 10/1 | 10/31 | Revenue Calculator | | pay bill - in full | v | Yes | v |

TABLE 5B-continued

| Start Date | End Date | Season | Action 2 | Action 2 identifier | Action 2 signed & electronically submitted form? | Action 2 icon removed |
|---|---|---|---|---|---|---|
| 10/1 | 10/31 | Revenue Calculator | pay bill - in full | v | Yes | v |
| 10/1 | 10/31 | Revenue Calculator | none | n/a | n/a | n/a |
| 10/1 | 10/31 | Revenue Calculator | pay bill - in full | v | Yes | v |
| 10/1 | 10/31 | Revenue Calculator | pay bill - in full | v | Yes | v |
| 10/1 | 10/31 | Revenue Calculator | none | n/a | n/a | n/a |
| 10/1 | 10/31 | Revenue Calculator | report claim | tt | Yes | n/a |
| 10/1 | 10/31 | Revenue Calculator | report claim | tt | Yes | n/a |
| 10/1 | 10/31 | Revenue Calculator | none | n/a | n/a | n/a |
| 10/1 | 10/31 | Revenue Calculator | pay bill - partial | v | Yes | n/a |
| 10/1 | 10/31 | Revenue Calculator | pay bill - partial | v | Yes | n/a |
| 10/1 | 10/31 | Revenue Calculator | none | n/a | n/a | n/a |
| 10/1 | 10/31 | Revenue Calculator | pay bill - partial | v | Yes | n/a |
| 10/1 | 10/31 | Revenue Calculator | pay bill - partial | v | Yes | n/a |
| 3/16 | 4/29 | Production reporting | none | n/a | n/a | n/a |
| 3/16 | 4/29 | Production reporting | add hail | rr | Yes | n/a |
| 3/16 | 4/29 | Current coverage, add or revise hail | none | n/a | n/a | n/a |
| 11/1 | 12/14 | Production reporting | none | n/a | n/a | n/a |
| 11/1 | 12/14 | Production reporting | pay bill - in full | v | Yes | v |

TABLE 5C

| Start Date | End Date | Season | | Action 3 | Action 3 identifier | Action 3 signed & electronically submitted form? | Action 3 icon removed | Outcome - UI page # |
|---|---|---|---|---|---|---|---|---|
| 10/1 | 10/31 | Revenue Calculator | Scenario 1 | none | n/a | n/a | n/a | 10 |
| 10/1 | 10/31 | Revenue Calculator | Scenario 2 | none | n/a | n/a | n/a | 10 |
| 10/1 | 10/31 | Revenue Calculator | Scenario 3 | report yields | hh | Yes | hh | 11 |
| 10/1 | 10/31 | Revenue Calculator | | none | n/a | n/a | n/a | 9 |
| 10/1 | 10/31 | Revenue Calculator | | none | n/a | n/a | n/a | 10 |
| 10/1 | 10/31 | Revenue Calculator | | report yields | hh | Yes | hh | 11 |
| 10/1 | 10/31 | Revenue Calculator | | none | n/a | n/a | n/a | 18 |
| 10/1 | 10/31 | Revenue Calculator | | none | n/a | n/a | n/a | 11 |
| 10/1 | 10/31 | Revenue Calculator | | report claim | tt | Yes | n/a | 11 |
| 10/1 | 10/31 | Revenue Calculator | | none | n/a | n/a | n/a | 9 |
| 10/1 | 10/31 | Revenue Calculator | | none | n/a | n/a | n/a | 9 |
| 10/1 | 10/31 | Revenue Calculator | | report yields | hh | Yes | hh | 18 |
| 10/1 | 10/31 | Revenue Calculator | | none | n/a | n/a | n/a | 9 |
| 10/1 | 10/31 | Revenue Calculator | | none | n/a | n/a | n/a | 9 |
| 10/1 | 10/31 | Revenue Calculator | | report yields | hh | Yes | hh | 18 |
| 10/1 | 10/31 | Revenue Calculator | | none | n/a | n/a | n/a | 18 |
| 10/1 | 10/31 | Revenue Calculator | | none | n/a | n/a | n/a | 18 |
| 10/1 | 10/31 | Revenue Calculator | | report claim | tt | Yes | n/a | 18 |
| 3/16 | 4/29 | Production reporting | | none | n/a | n/a | n/a | 3 |
| 3/16 | 4/29 | Production reporting | | none | n/a | n/a | n/a | 3 |
| 3/16 | 4/29 | Current coverage, add or revise hail | | none | n/a | n/a | n/a | 3 |
| 11/1 | 12/14 | Production reporting | | none | n/a | n/a | n/a | 16 |
| 11/1 | 12/14 | Production reporting | | none | n/a | n/a | n/a | 14 |

Figure 3B:
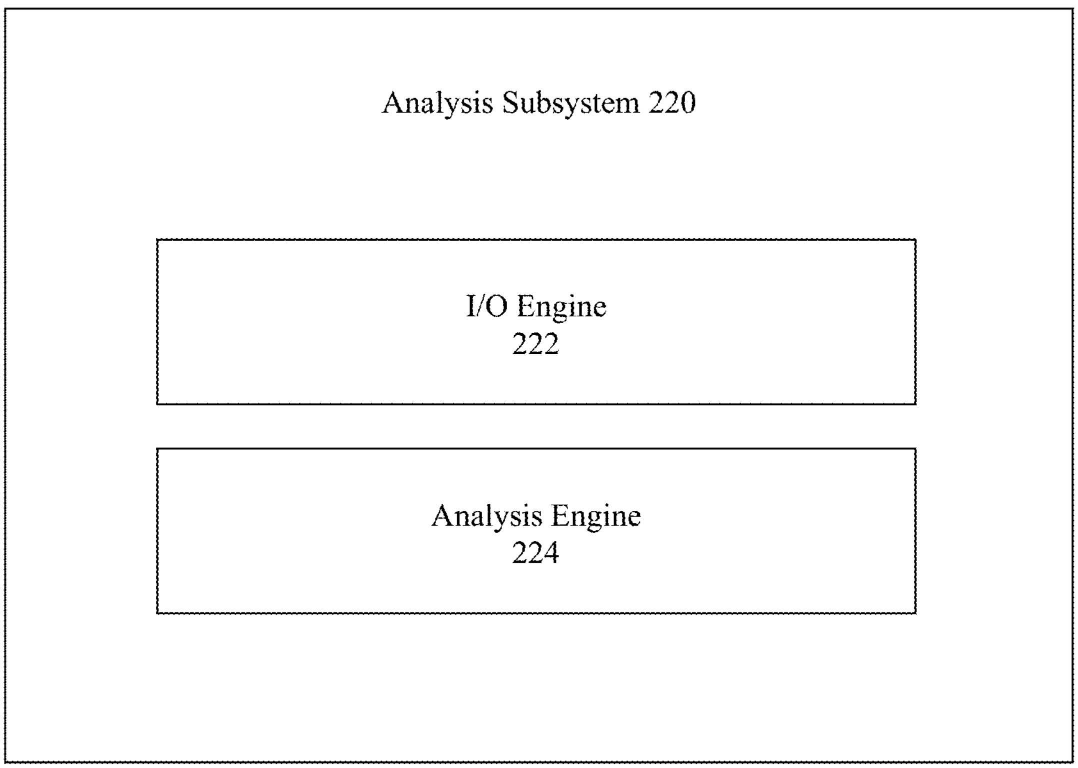
FIG. 3B is a block diagram of an analysis subsystem, according to an embodiment.

Referring to FIG. 3B, a block diagram of an analysis subsystem 220 is depicted, according to an embodiment. Analysis subsystem 220 can operate in coordination with dynamically-guided subsystem 200 to operate on the data received via display engine 210. In an embodiment, analysis subsystem 220 generally comprises an I/O engine 222 and an analysis engine 224.

I/O engine 222 is configured to receive user-inputted data from display engine 210, and upload analyzed data to various network locations. For example, I/O engine 222 can upload data in real time to a plurality of industry databases, such as an RMA database, an FSA database, or an AIP database. I/O engine 222 can be further configured to upload data to another electronic location, such as to particular users on the network (e.g. an IP address, FTP location; HTTP location, email address). In an embodiment, I/O engine 222 is programmed with the various data structures and protocols for particular target databases and particular users. Accordingly, I/O engine 222 can package data transmissions in packages unique to the target database or target user.

Analysis engine 224 is configured to analyze the user-inputted data. In an embodiment, the analysis can include normalizing, segmenting, parsing, or otherwise manipulating the data for later use or transmission. In an embodiment, analysis engine 224 can forward raw received data to I/O engine 222 such that the received data is not analyzed.

Figure 4:
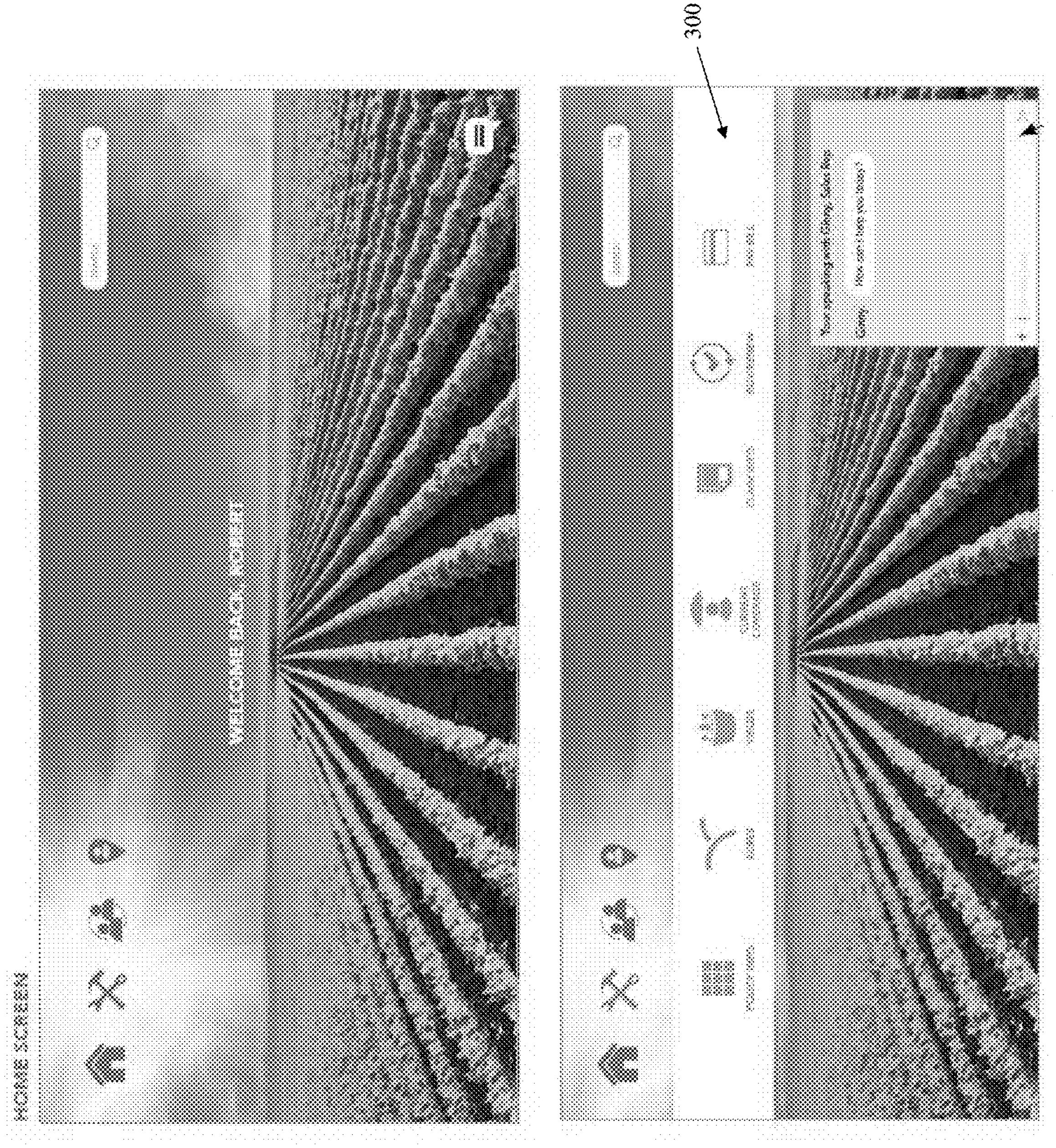
FIGS. 4-24 are screenshots of user interfaces for a system for dynamic agriculture data processing, according to embodiments.

Referring specifically to FIG. 4, embodiments can include an interactive main menu. For example, when a user hovers over main header item 300, main header item 300 can turn solid white and present a sub-navigation menu below. In embodiments, when a user hovers over a sub-navigation item icon, the icon can also turn blue.

Figure 5:
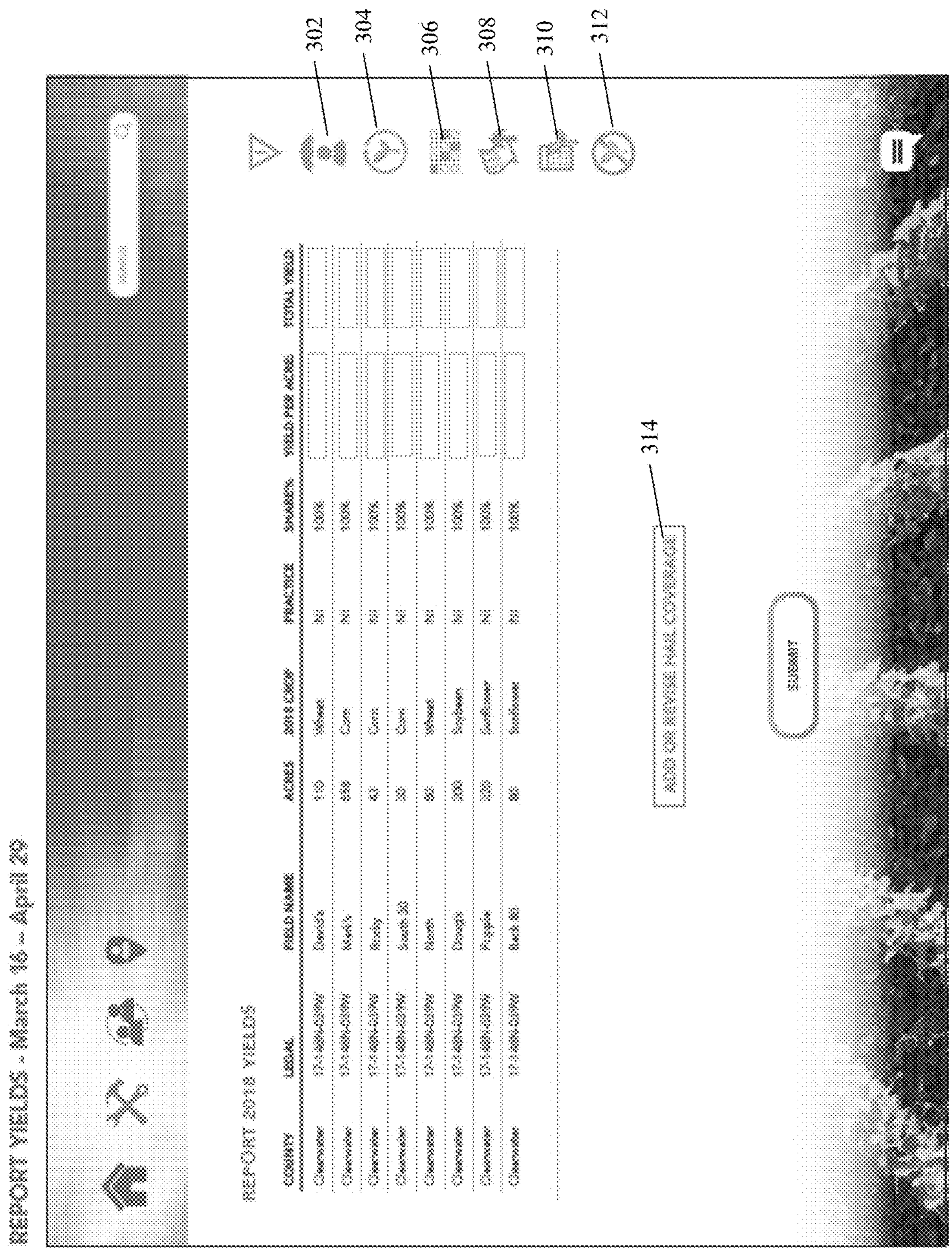

Referring specifically to FIG. 5, embodiments present easy fill-in fields for the required information to be entered by a user. In embodiments, current coverage icon 302, update planting intentions icon 304, import precision field data 306, upload scale tickets icon 308, replant calculator 310, and prevent plant calculator 312 can be presented to the user, each of which can activate a separate or embedded screen. For example, if prevent plant calculator 312 is selected, an internal embedded window can open that can be moved and resized by the user (and as will be discussed further with respect to FIGS. 23-24). In embodiments, a multi-threaded web application can spawn a new thread for presenting the embedded window. In an embodiment, a thread pool can be utilized to select and spawn the new thread. Accordingly, asynchronous calls can be made using the thread executing the original window and the new thread executing the embedded window. This offers advantages over existing systems, which require multiple separate windows to be opened.

In embodiments, even if yields have not been reported, a user can still select Add or Revise Hail Coverage 314, an important workflow differentiator from existing systems.

Figure 6:
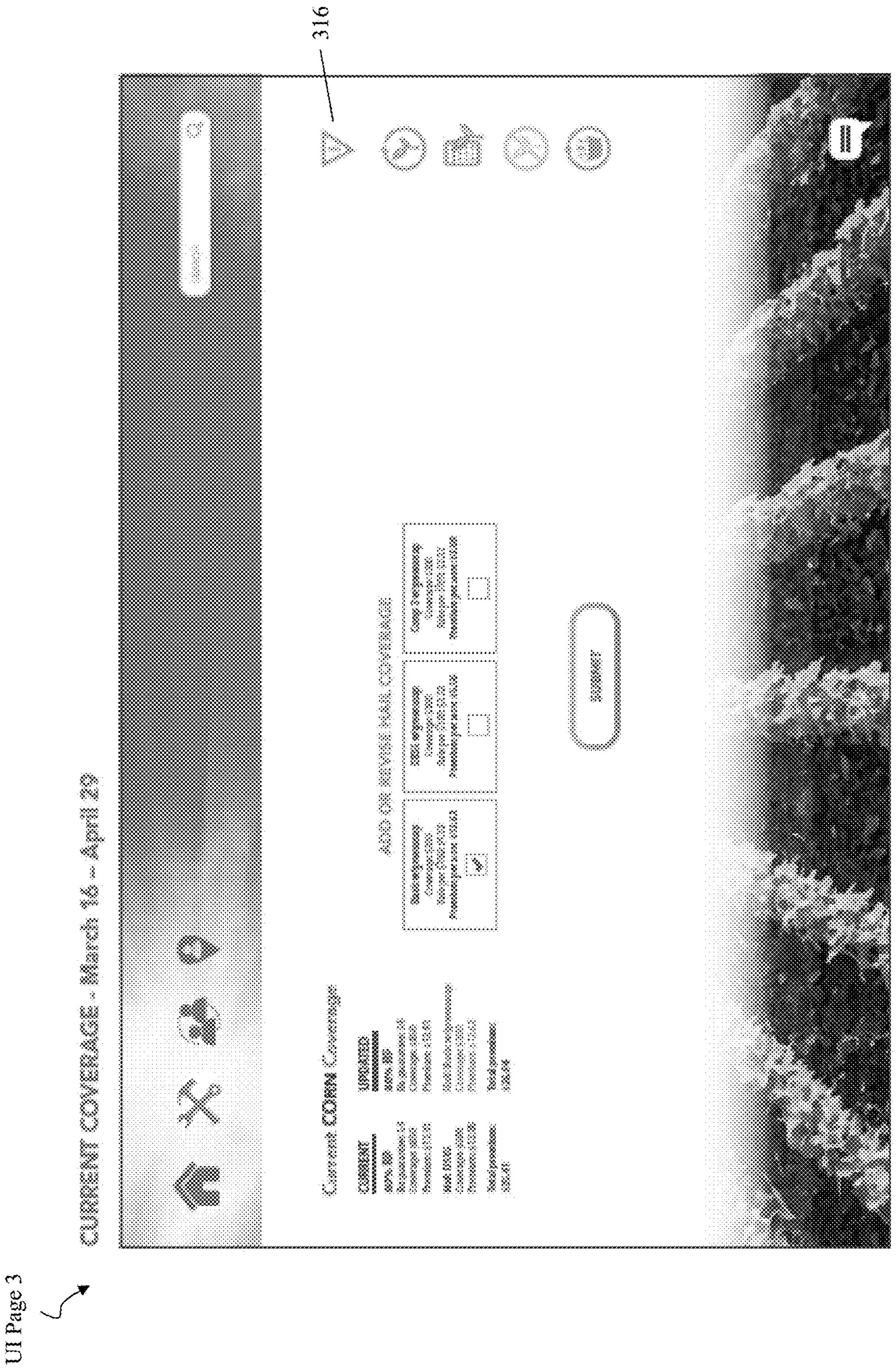

Referring specifically to FIG. 6, an urgency icon 316 can be included, relaying important notices to the user. When selected, urgency icon 316 can open a separate or embedded window to present the notices.

Figure 7:
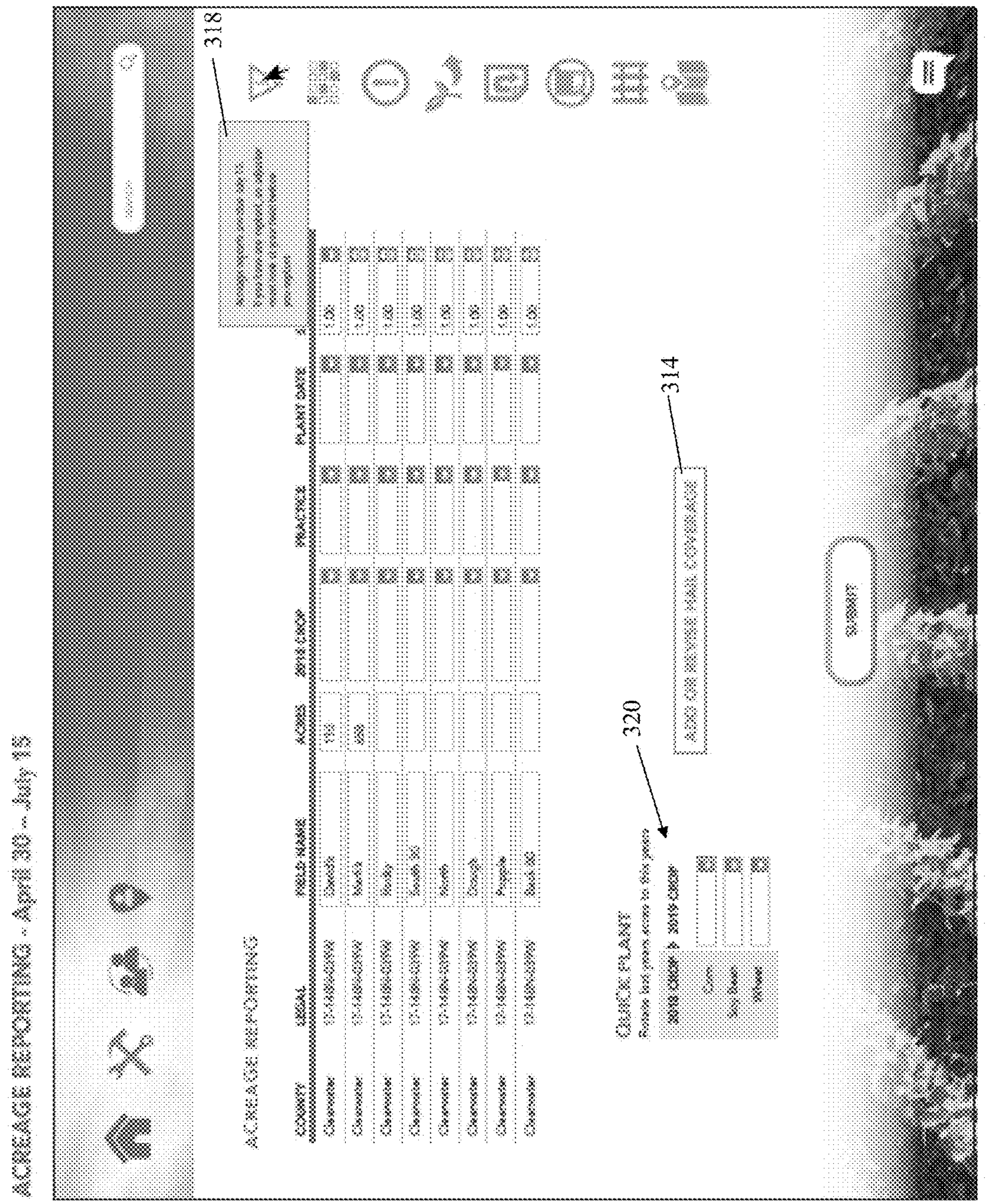

In another embodiment, referring to FIG. 7, hovering over urgency icon 316 presents notices in a pop-up 318. As shown in FIG. 7, when a user selects Add or Revise Hail Coverage 314, current coverage and options are presented in an internal embedded window that can be moved and resized by the user. Further, a quick plant sub-entry 320 can be presented.

Figure 8:
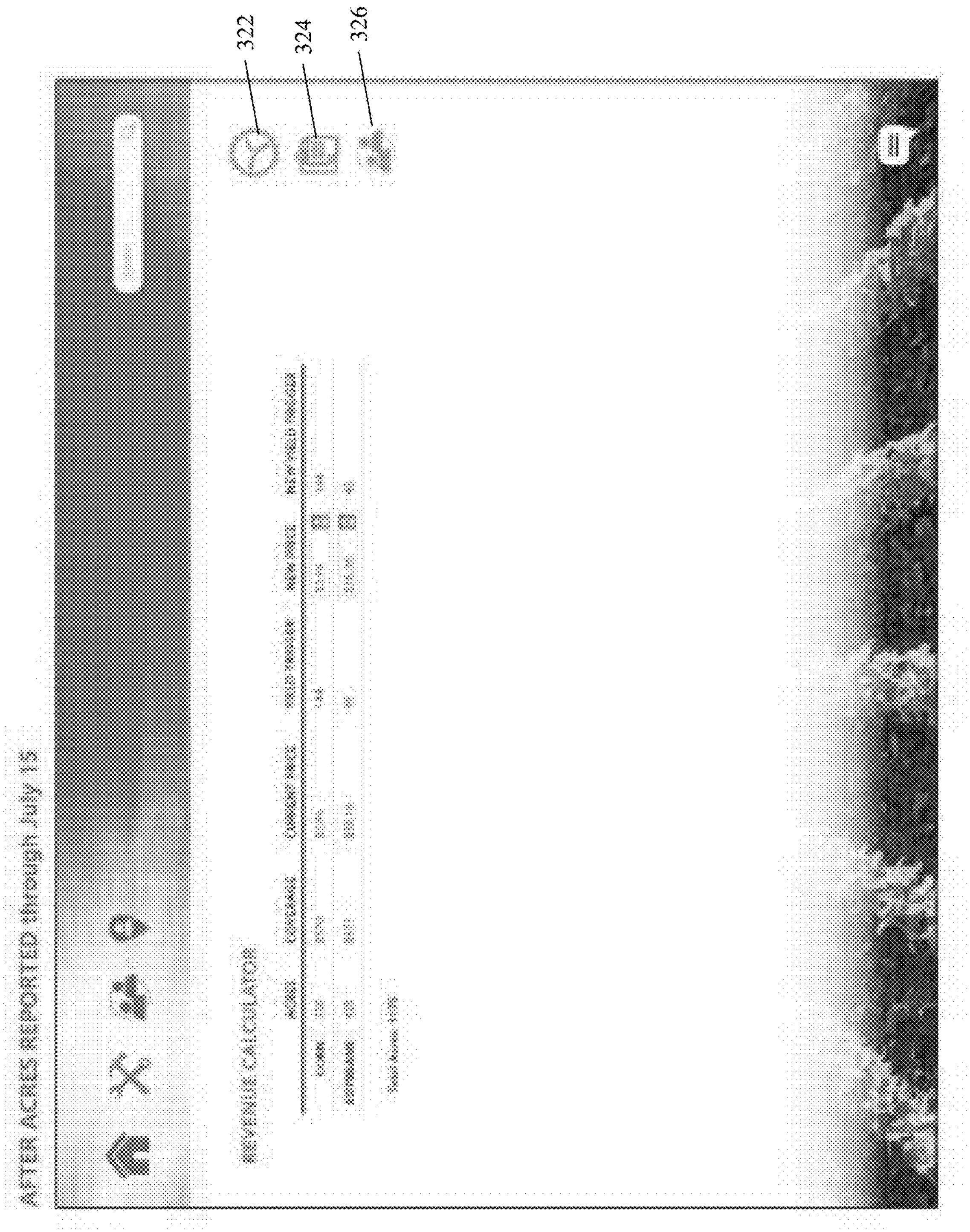

Referring specifically to FIG. 8, a revise acres icon 322, a report claim icon 324, and a share data icon 326 can be presented. When any of revise acres icon 322, report claim icon 324, or share data icon 326 are selected by the user, embedded or new windows can be presented corresponding to that functionality.

Figure 9:
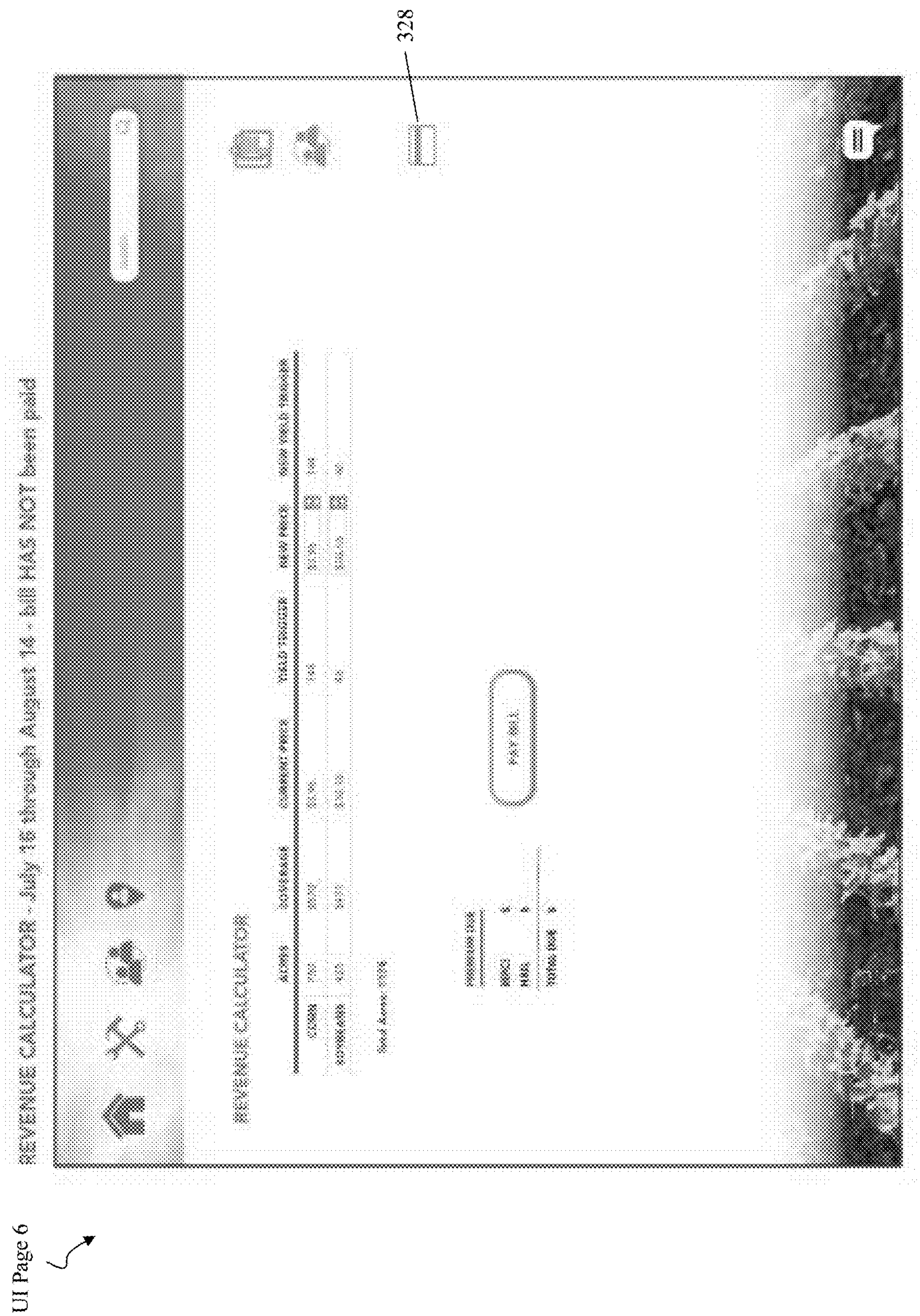

Referring specifically to FIG. 9, a bill pay icon 328 can be presented. When bill pay icon 328 is selected by the user, embedded or new windows can be presented corresponding to that functionality.

Figure 10:
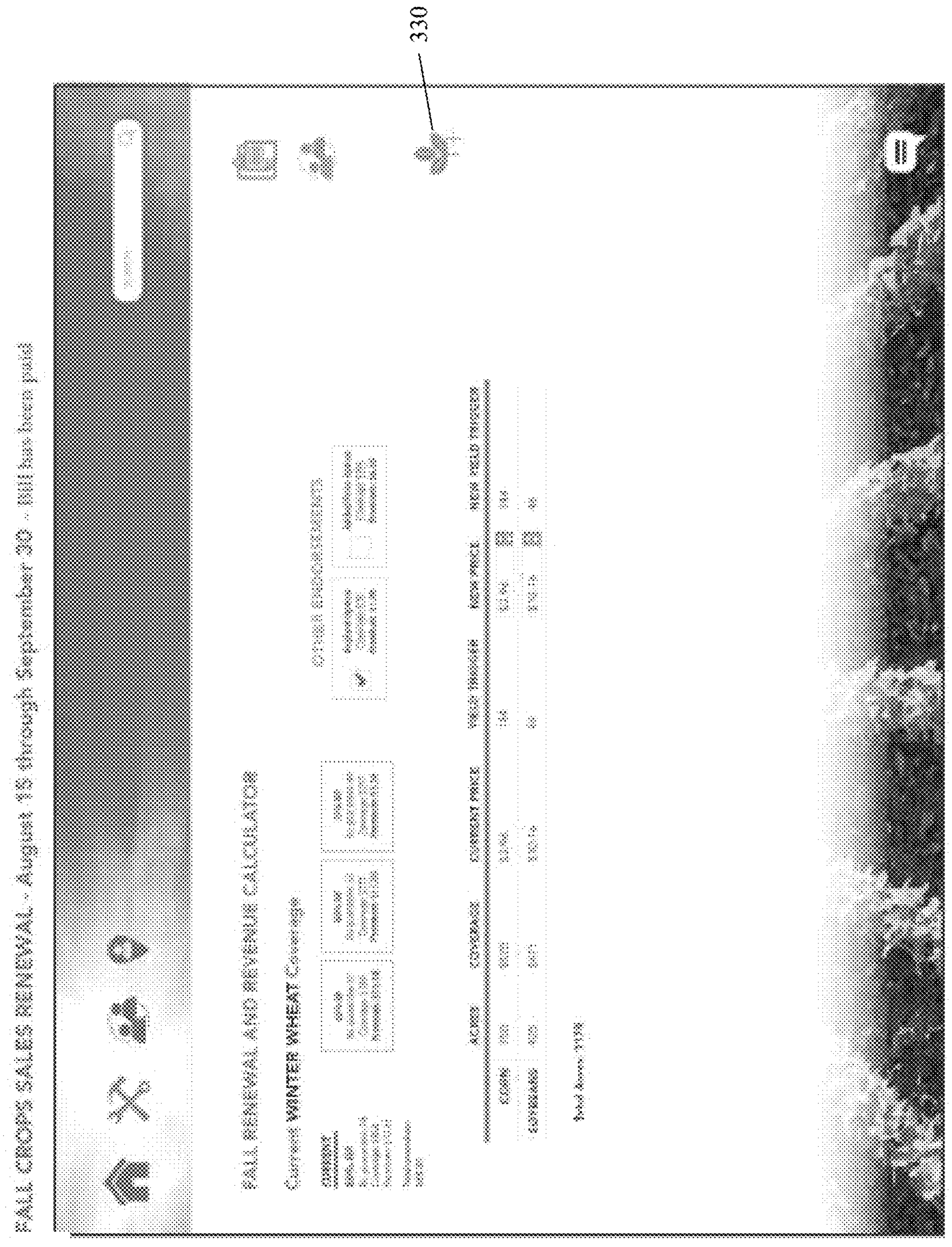
Figure 11:
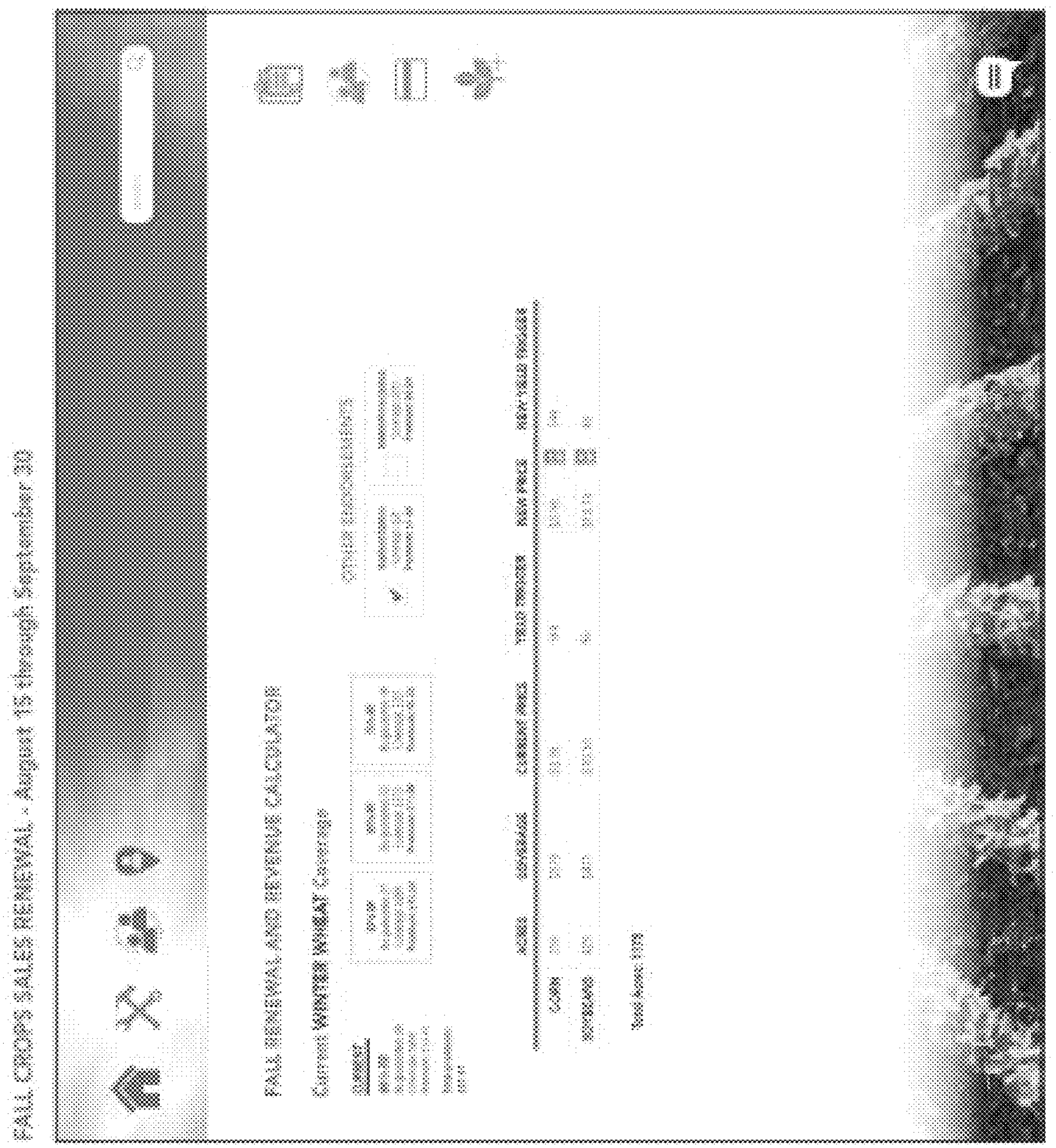

Referring specifically to FIG. 10, an add fall crop icon 330 can be presented. When add fall crop icon 330 is selected by the user, embedded or new windows can be presented corresponding to that functionality.

Figure 12:
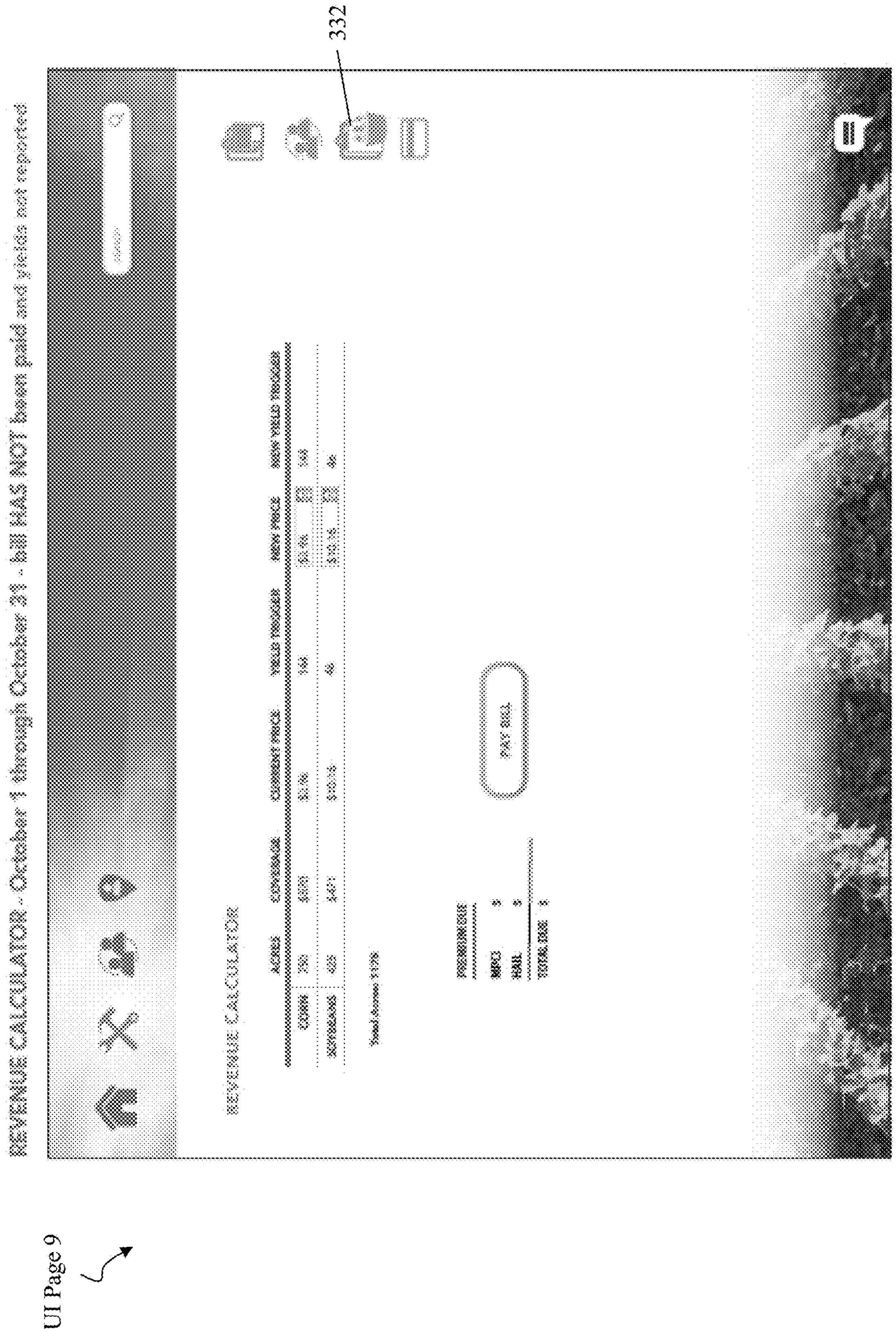
Figure 13:
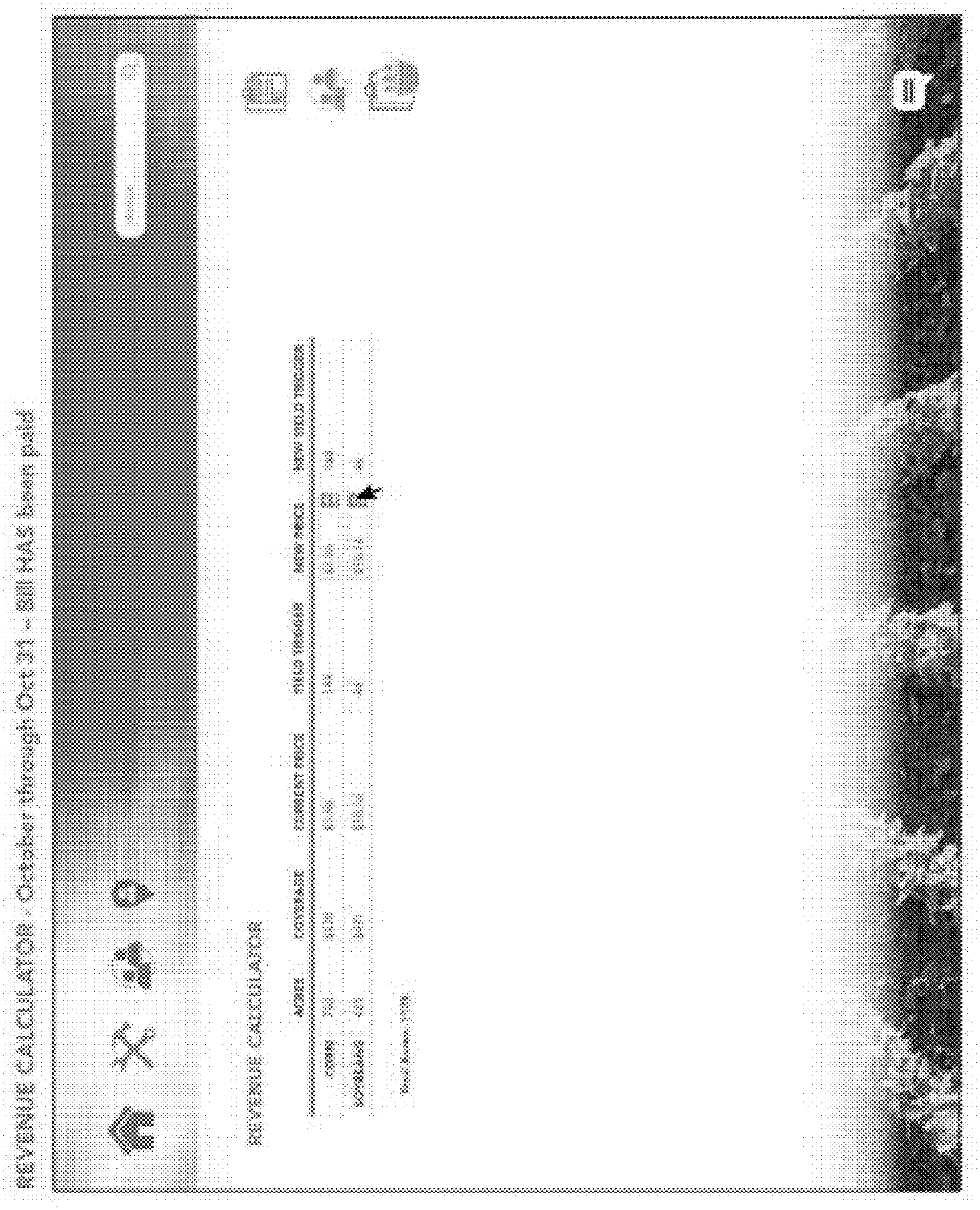
Figure 14:

Referring specifically to FIG. 12, a report yields icon 332 can be presented. When report yields icon 332 is selected by the user, embedded or new windows can be presented corresponding to that functionality.

Figure 15:
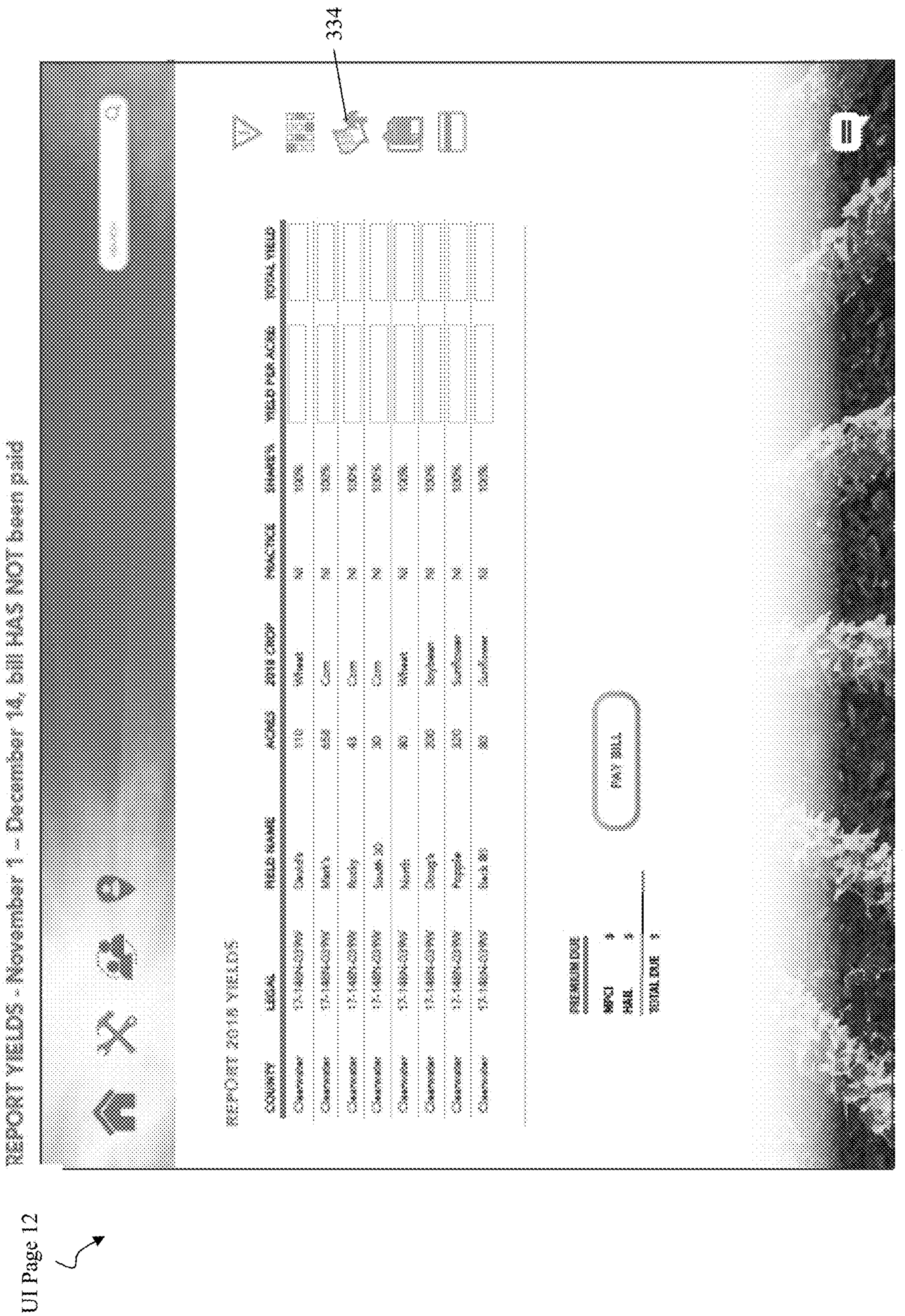
Figure 16:
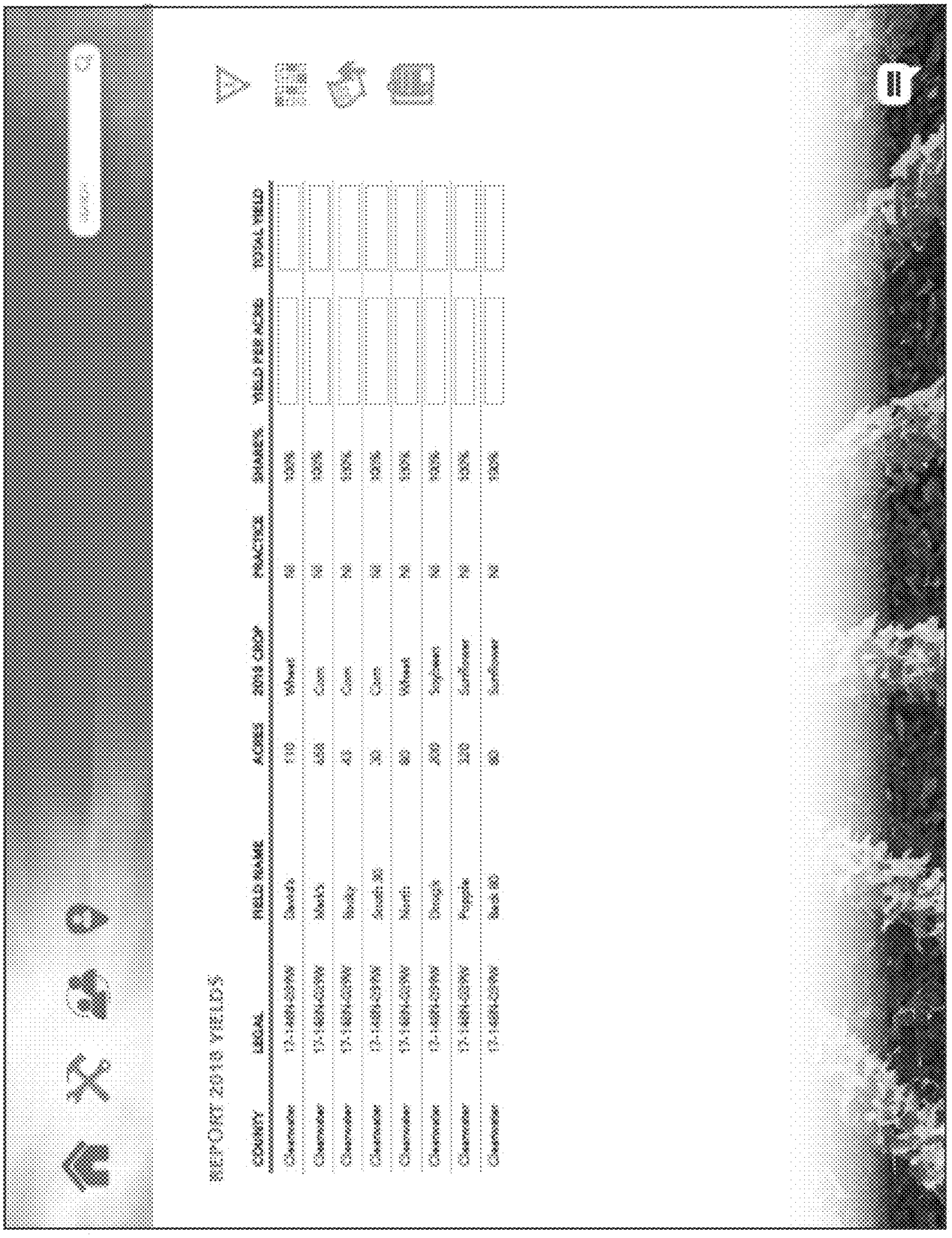

Referring specifically to FIG. 15, an upload scale tickets icon 334 can be presented. When upload scale tickets icon 334 is selected by the user, embedded or new windows can be presented corresponding to that functionality.

Figure 17:
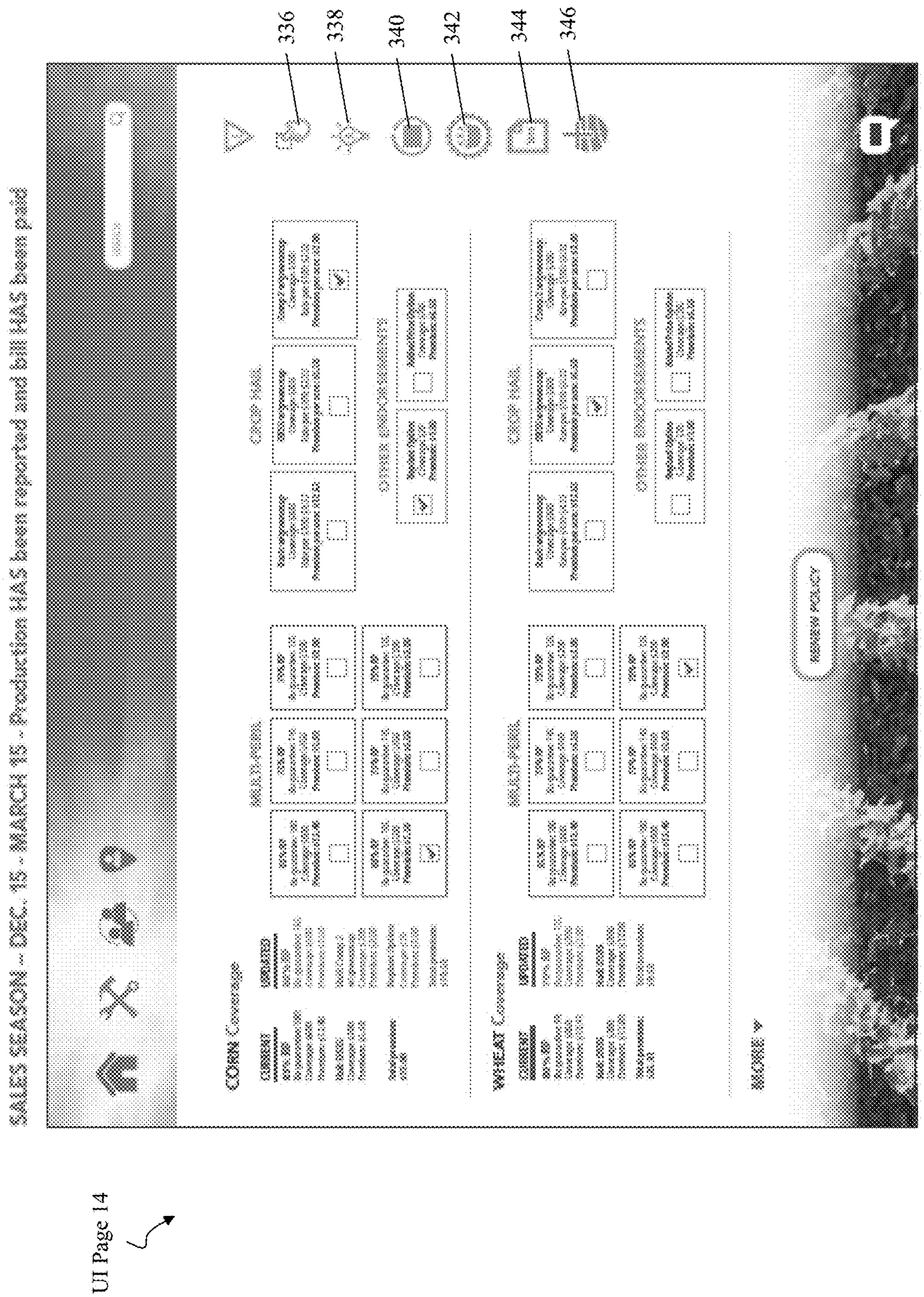

Referring specifically to FIG. 17, a compare products icon 336, a revenue price discovery icon 338, an update field info icon 340, a revise yields icon 342, a 1099 info icon 344, and an add crop or county icon 346 can be presented. When any of compare products icon 336, revenue price discovery icon 338, update field info icon 340, revise yields icon 342, 1099 info icon 344, and add crop or county icon 346 are selected by the user, embedded or new windows can be presented corresponding to that functionality.

Figure 18:
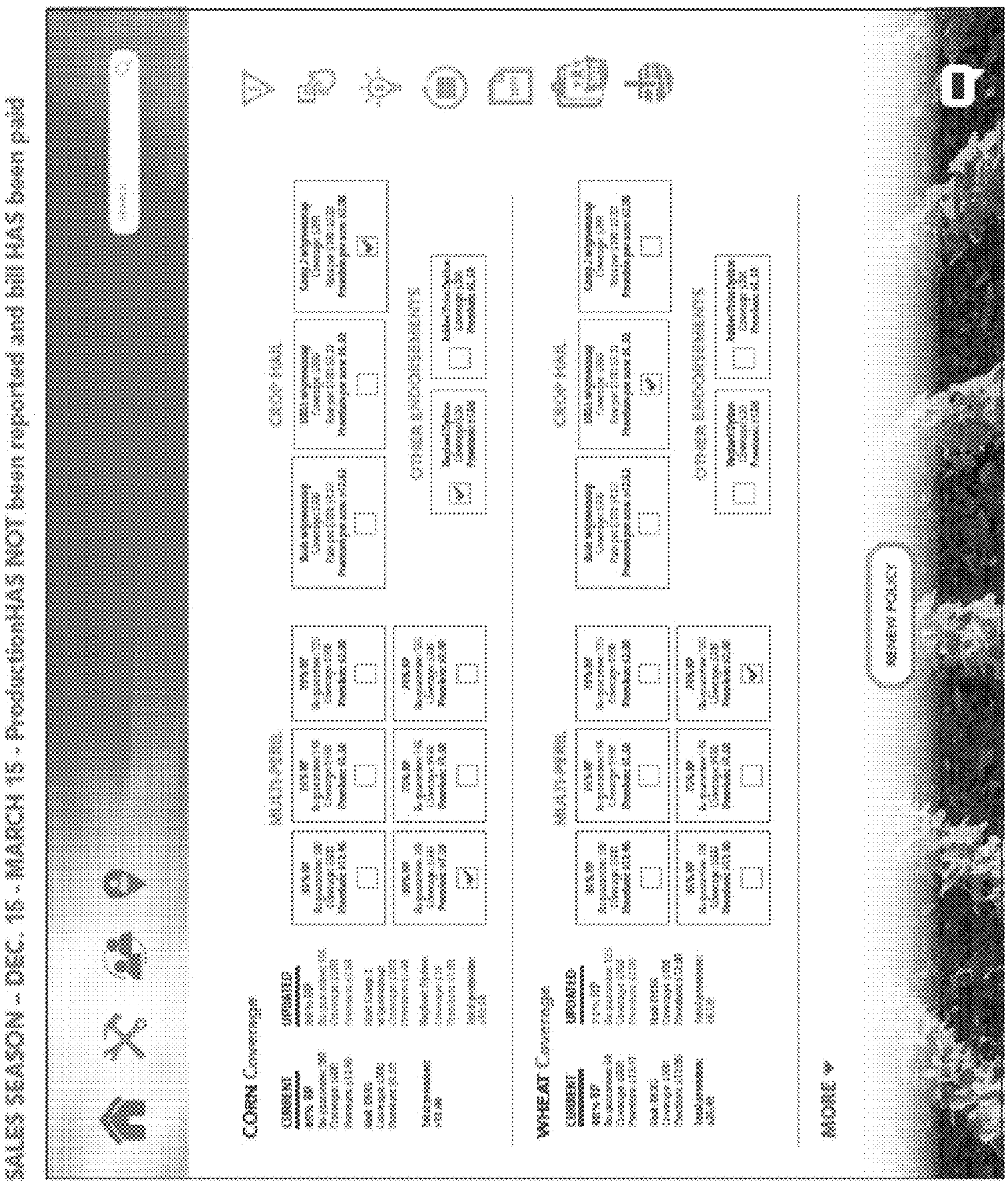

Referring specifically to FIG. 18, selected coverage is updated in real time once selected. In embodiments, multi-threading asynchronous web programming operation allows for immediate data pulls from the appropriate sources, such as local database 106*a* or industry databases 106*b*-106*c*.

Figure 19:
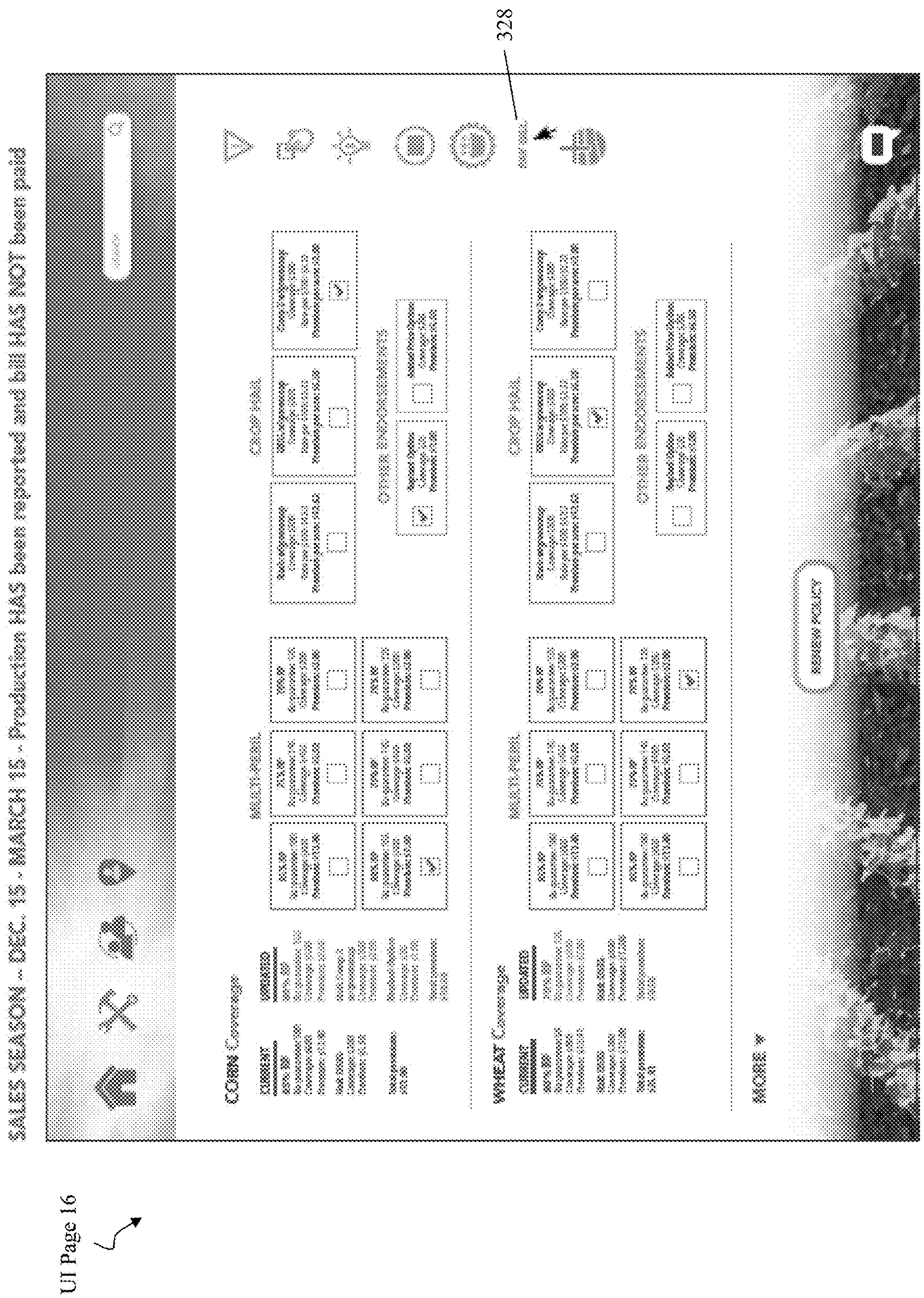
Figure 20:
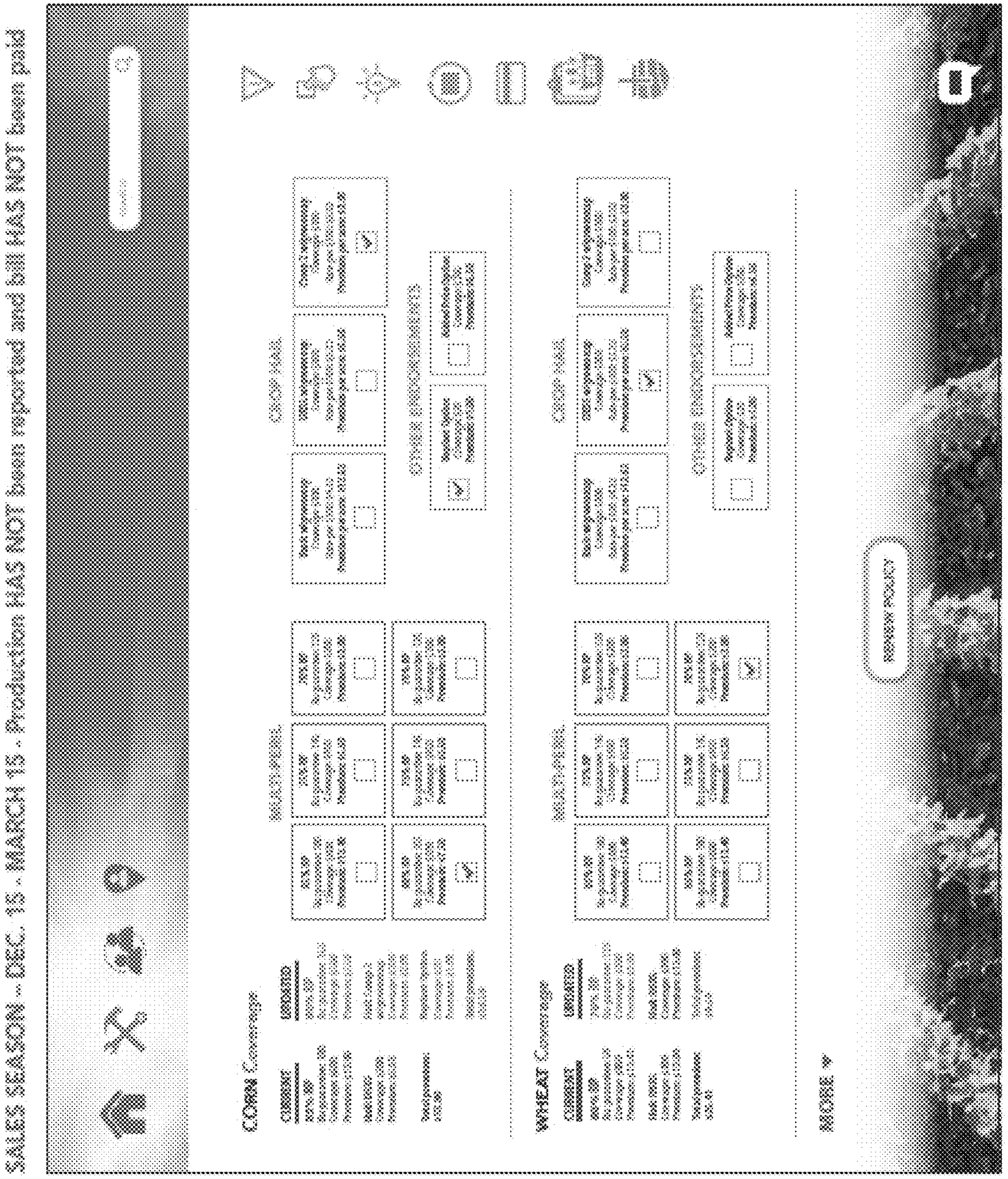
Figure 21:
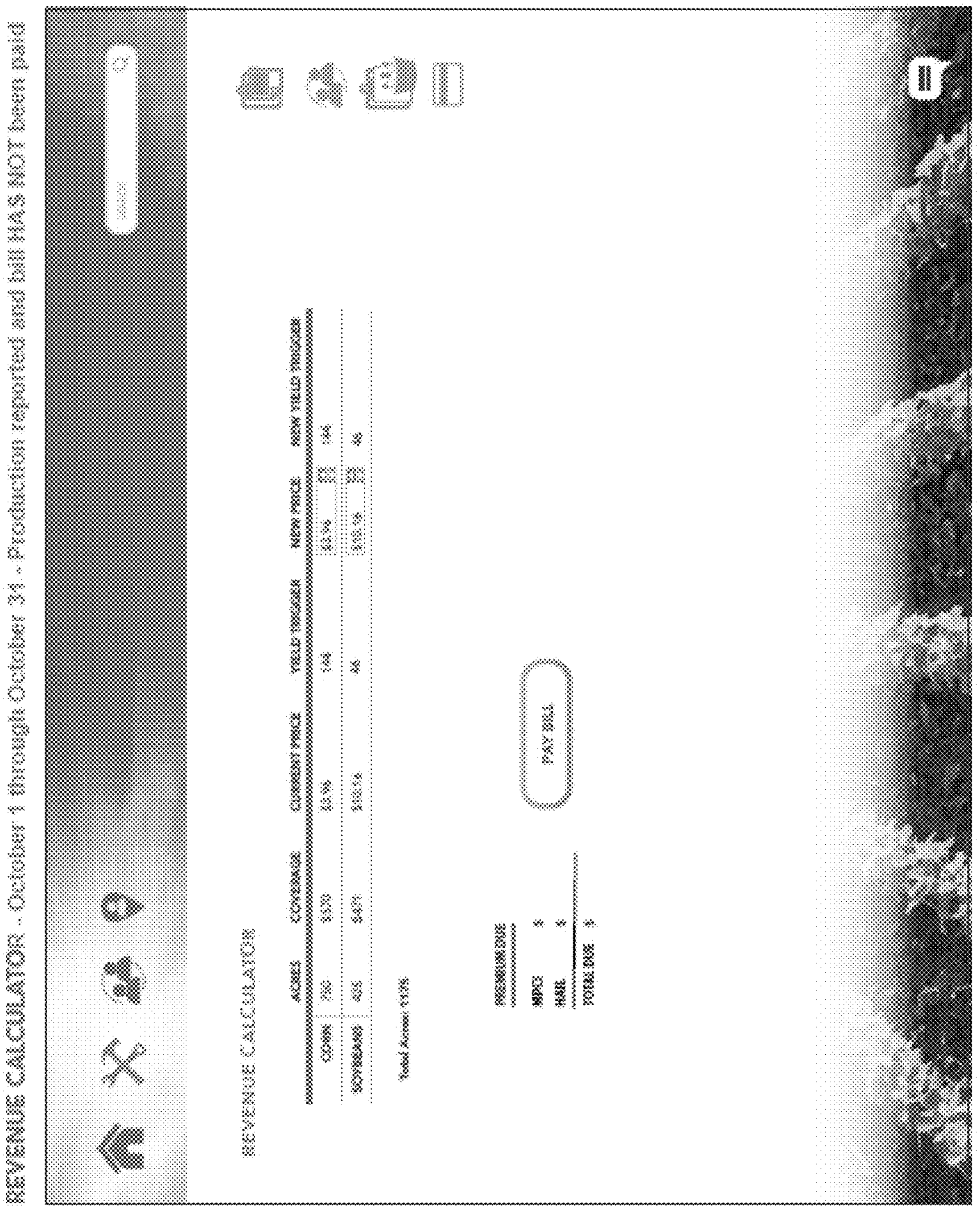
Figure 22:
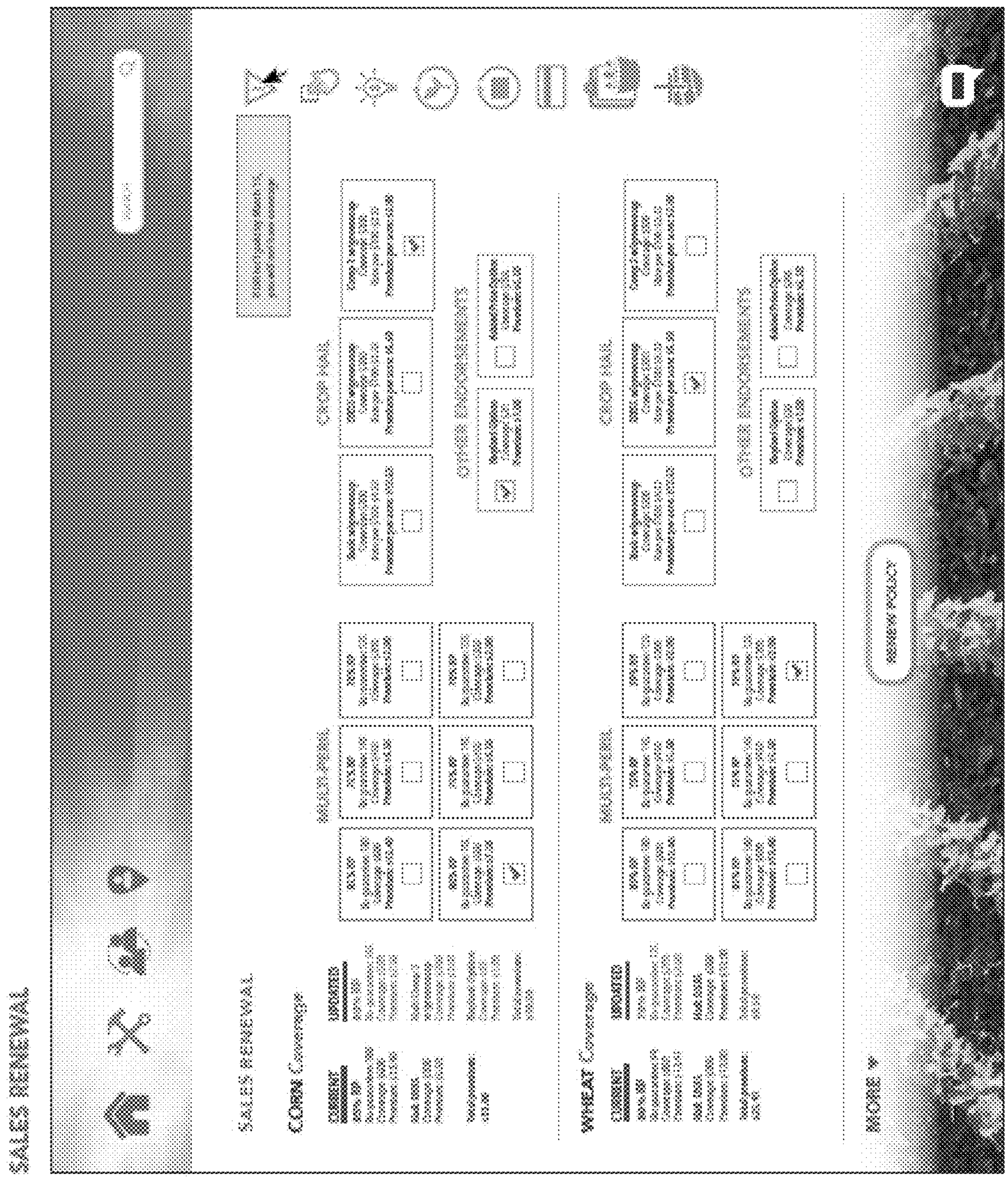

Referring specifically to FIG. 19, icons can reveal other explanatory icons or information. For example, when hovering over bill pay icon 328, an explanation of "Pay Bill" is revealed.

Figure 23:
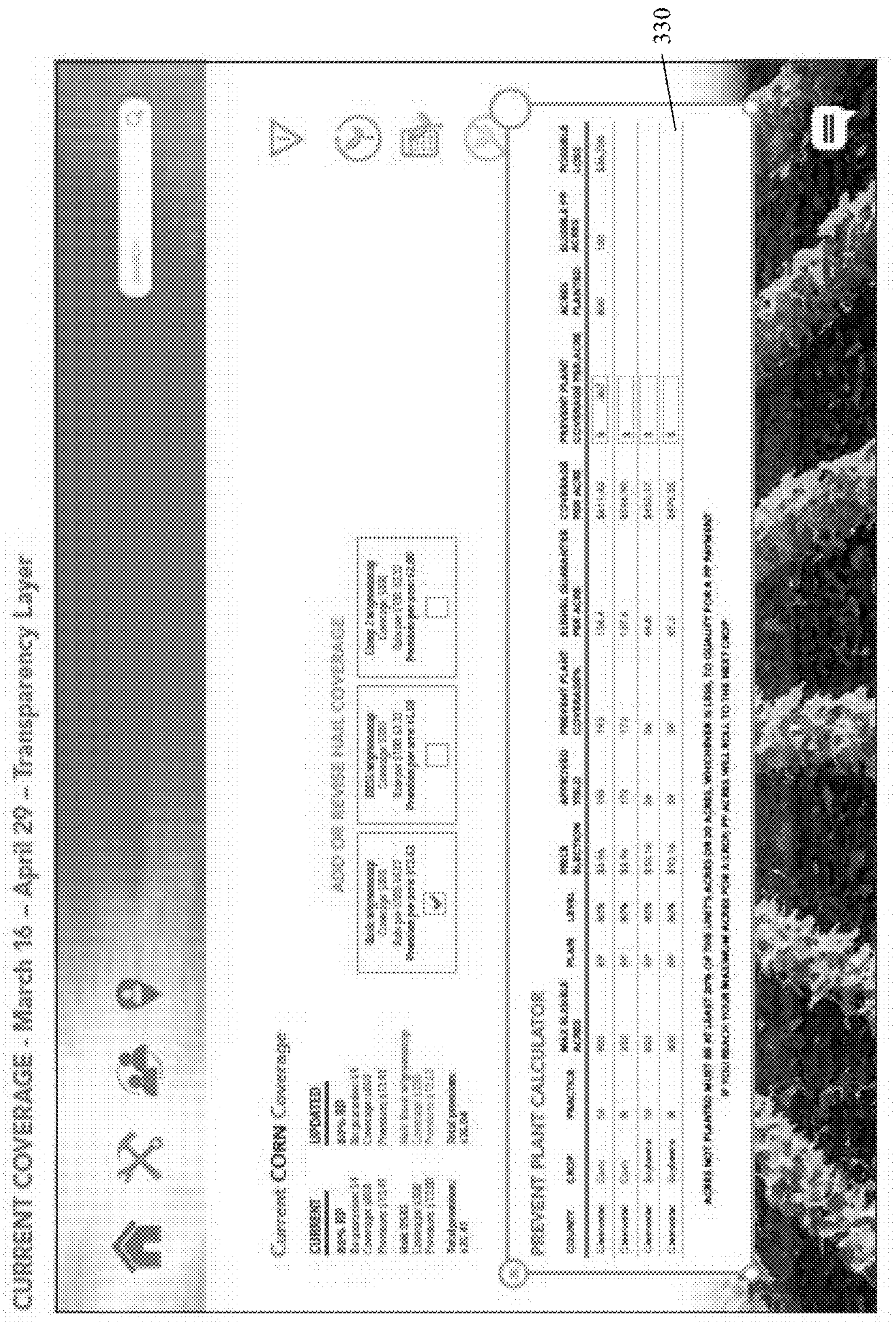
Figure 24:
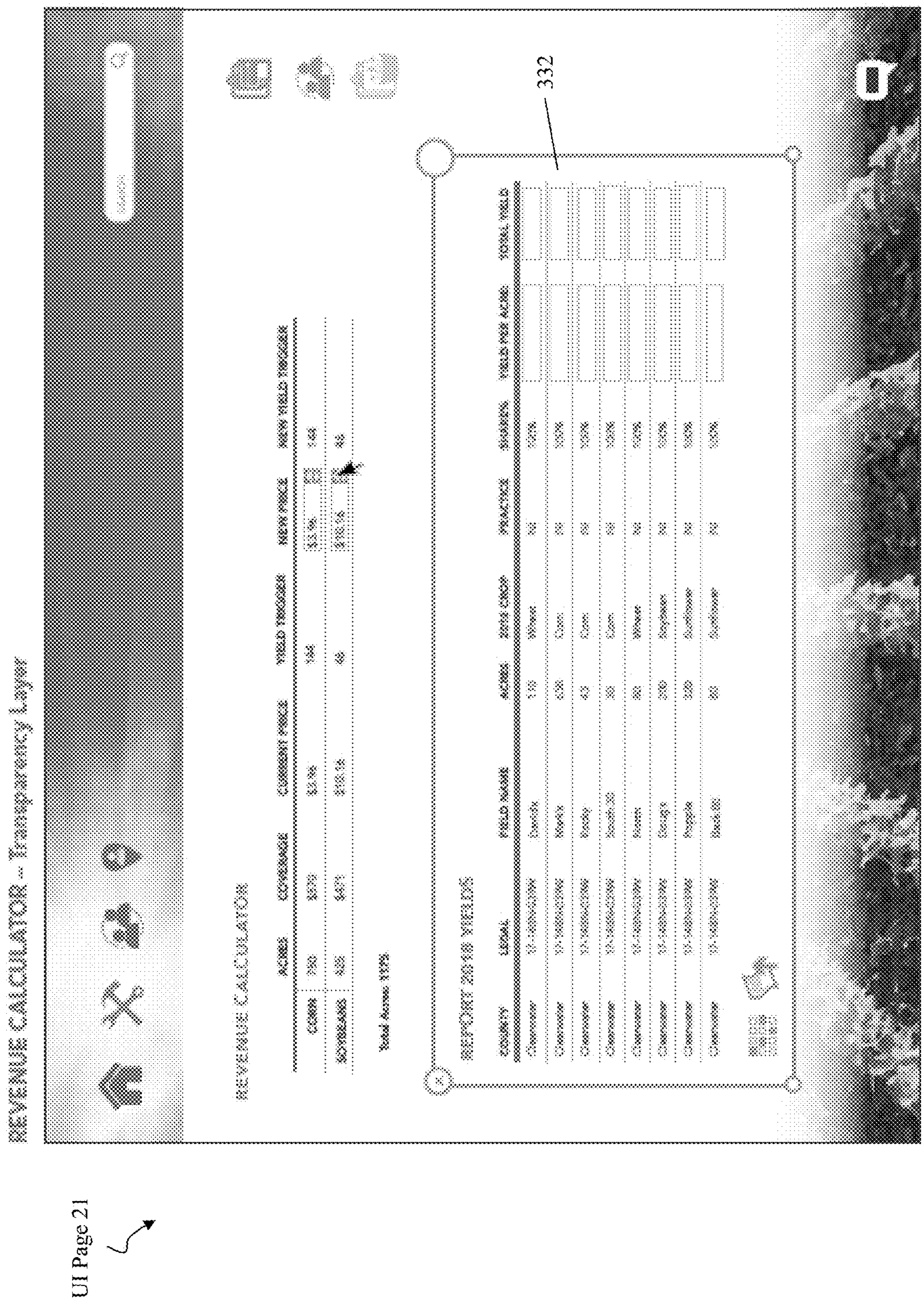
Figure 25:
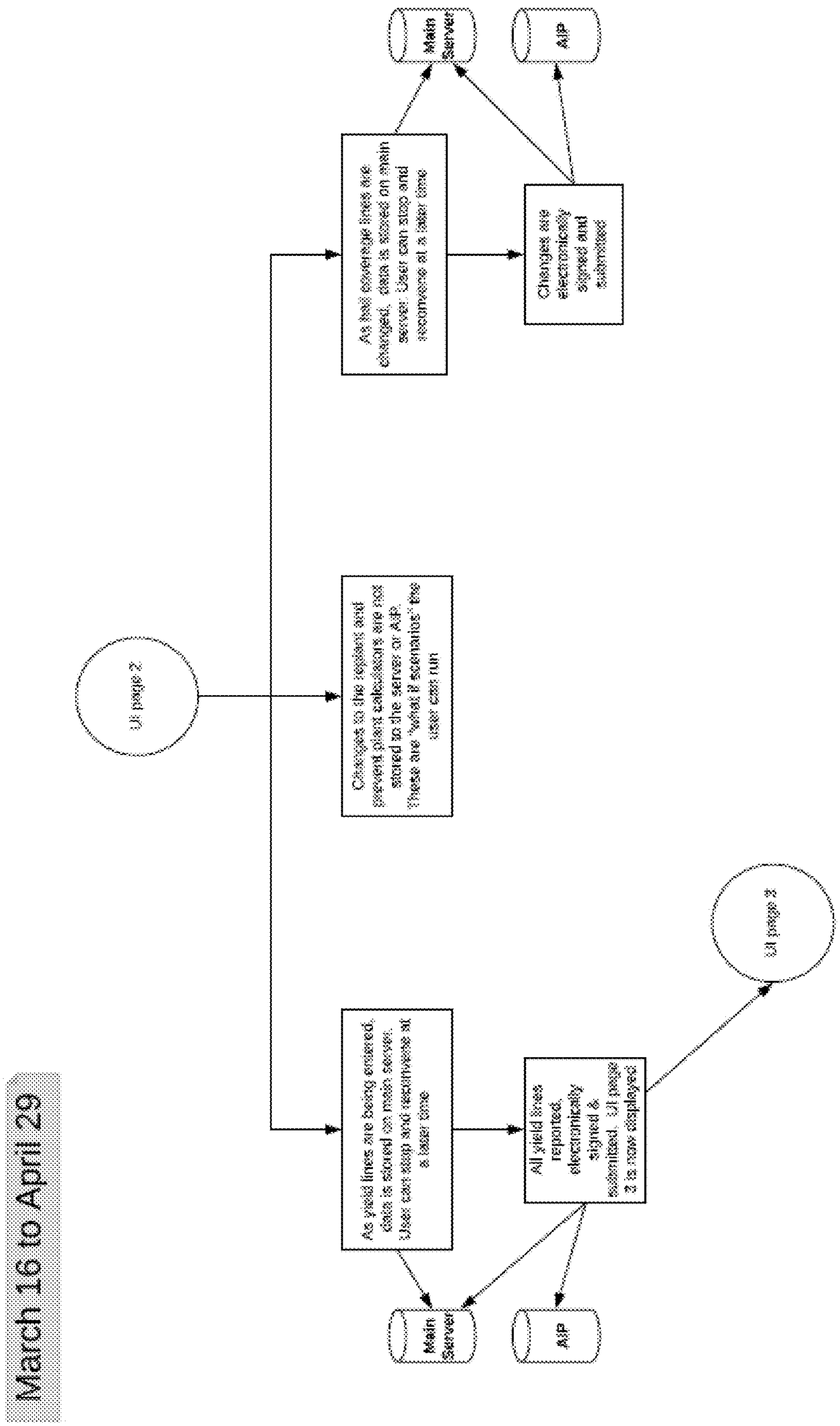
FIGS. 25-41 are flowcharts of dynamically-guided presentation corresponding to the user interfaces of FIGS. 4-24 for a system for dynamic agriculture data processing, according to embodiments.
Figure 26:
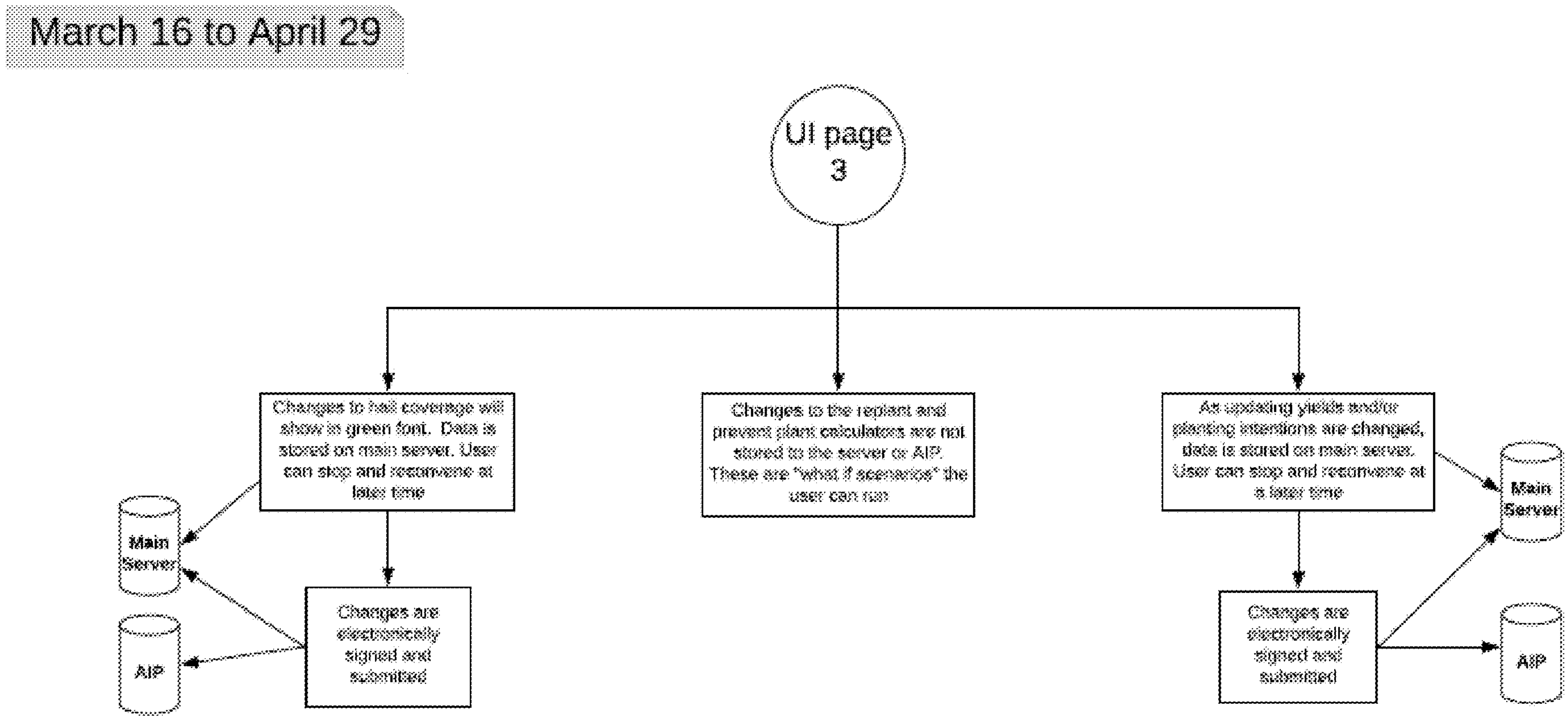
Figure 27:
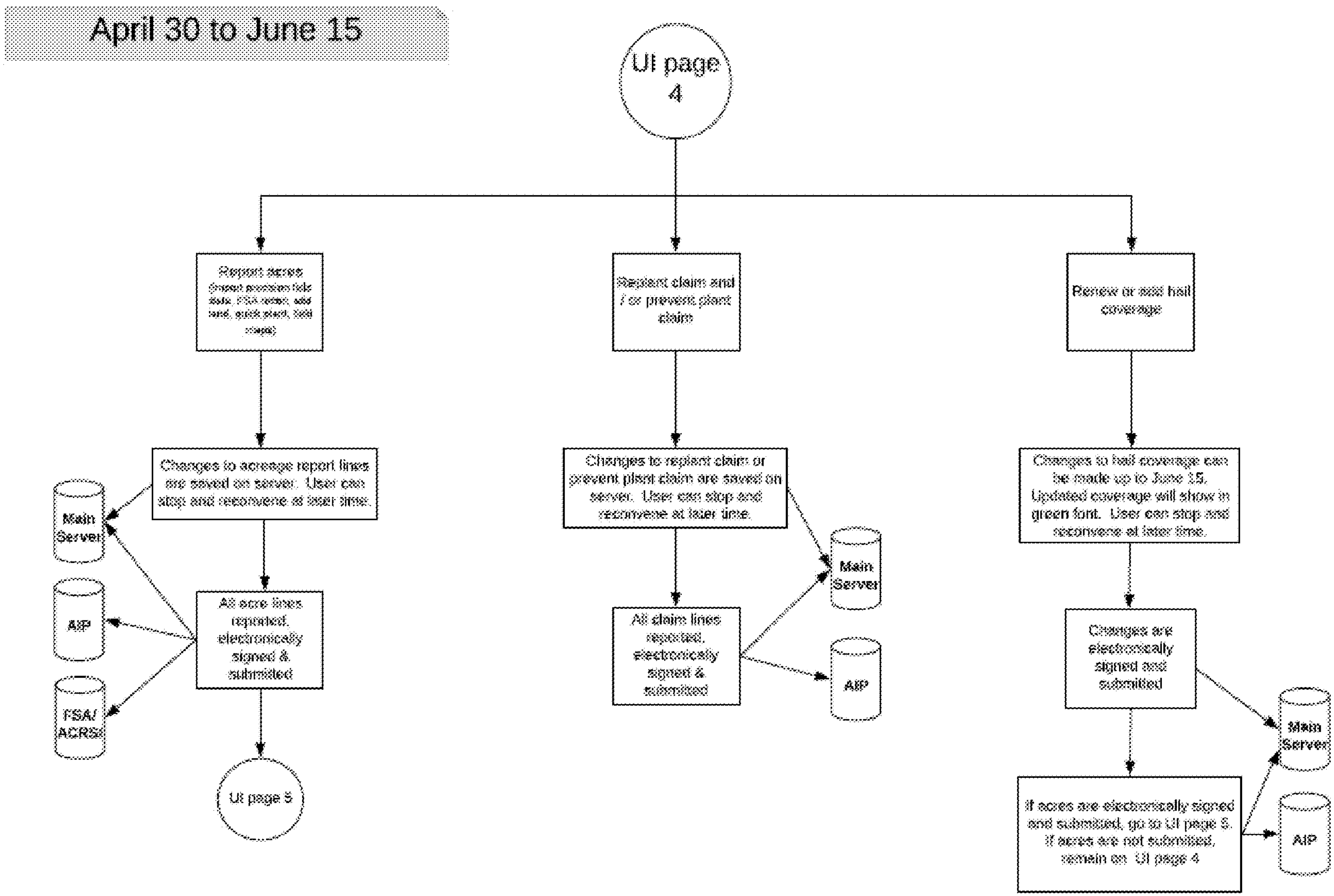
Figure 28:
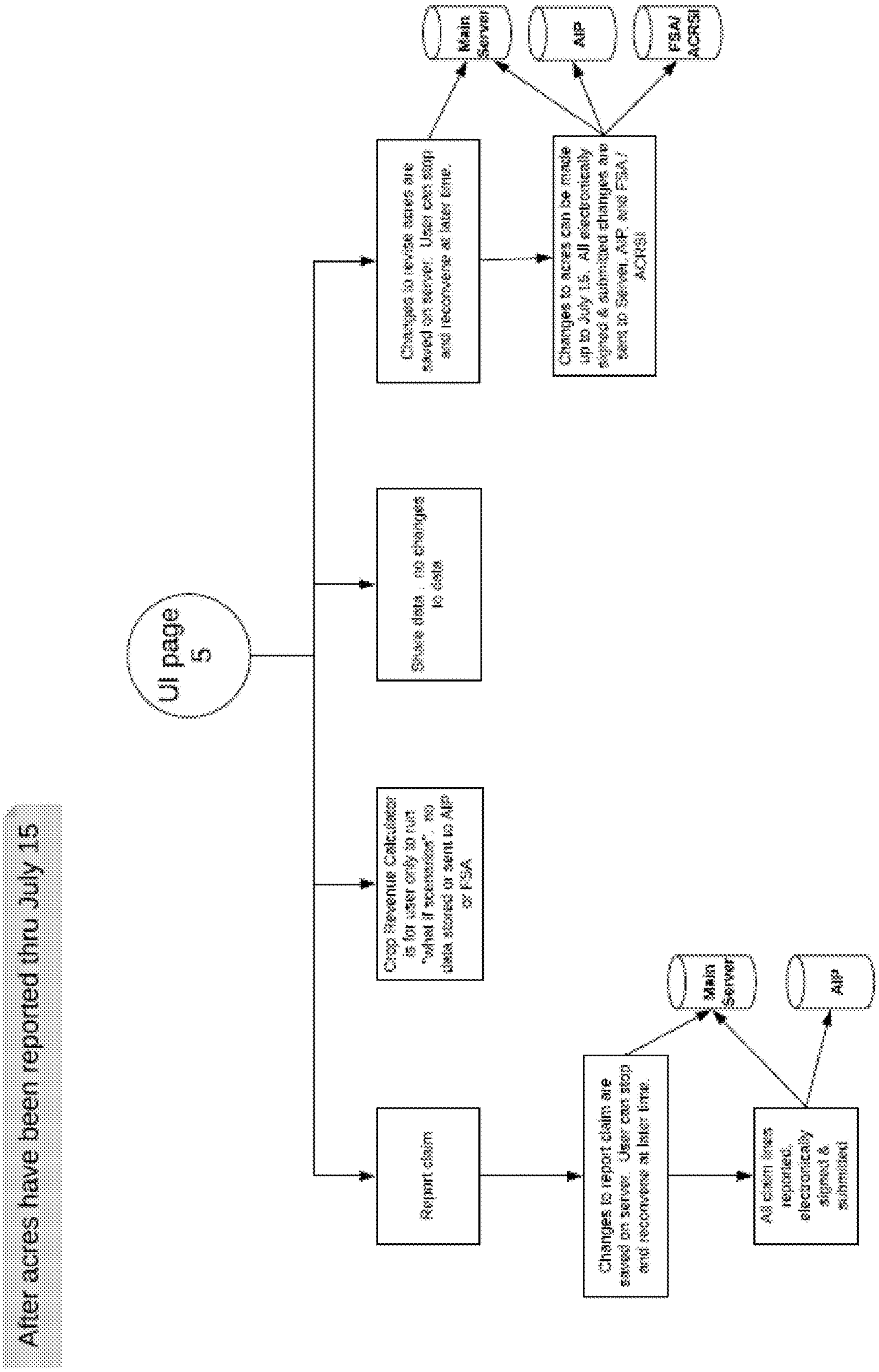
Figure 29:
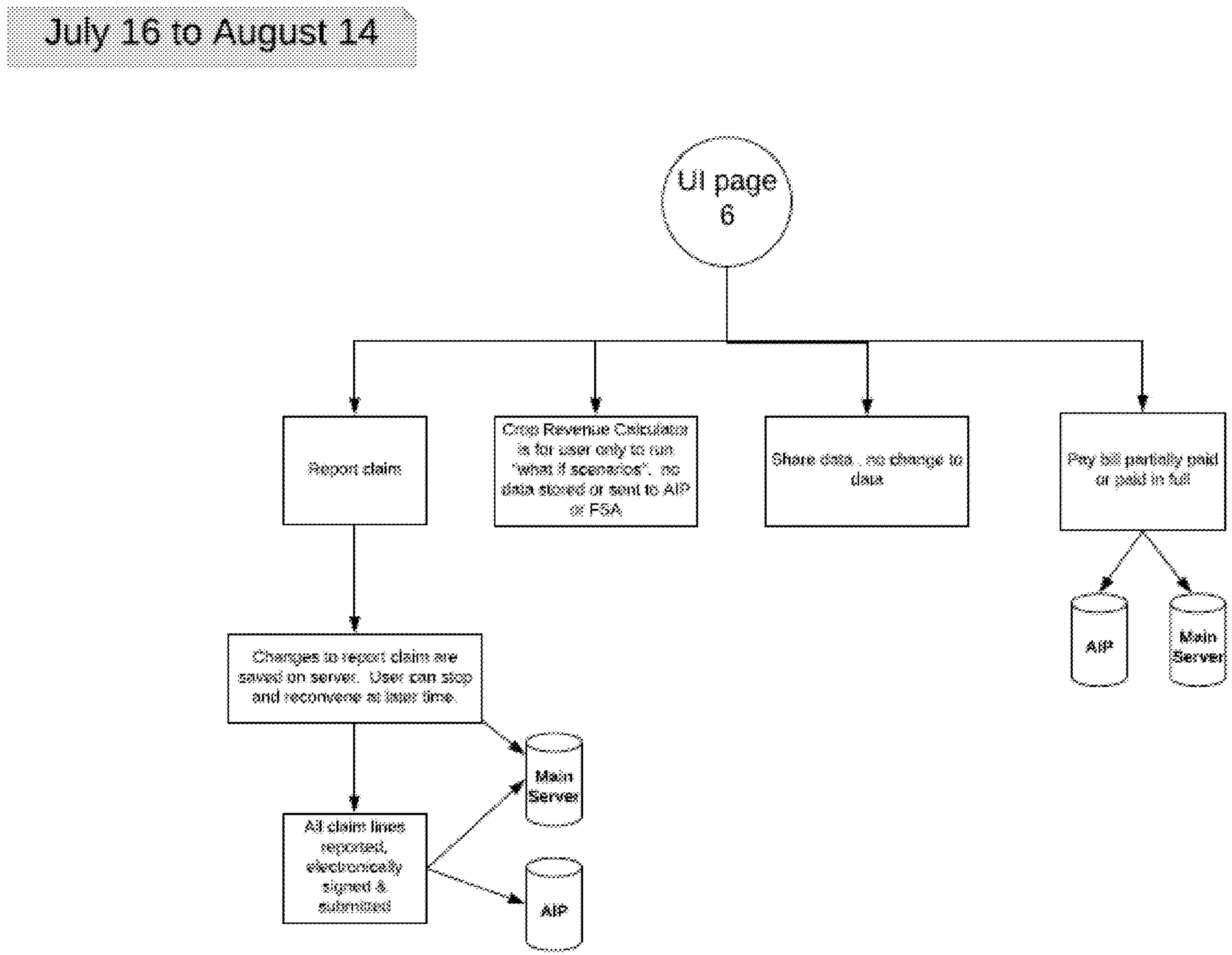
Figure 30:
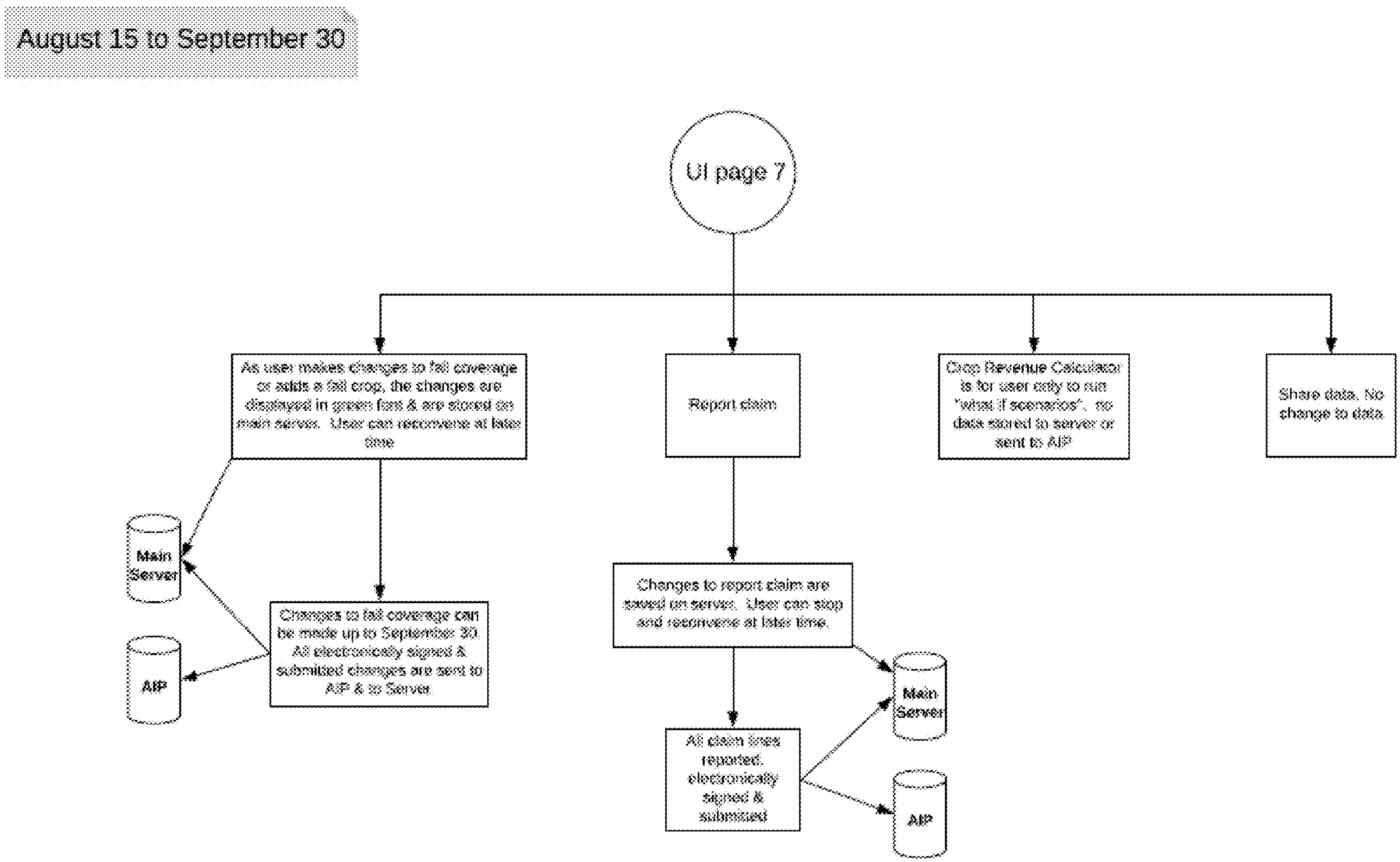
Figure 31:
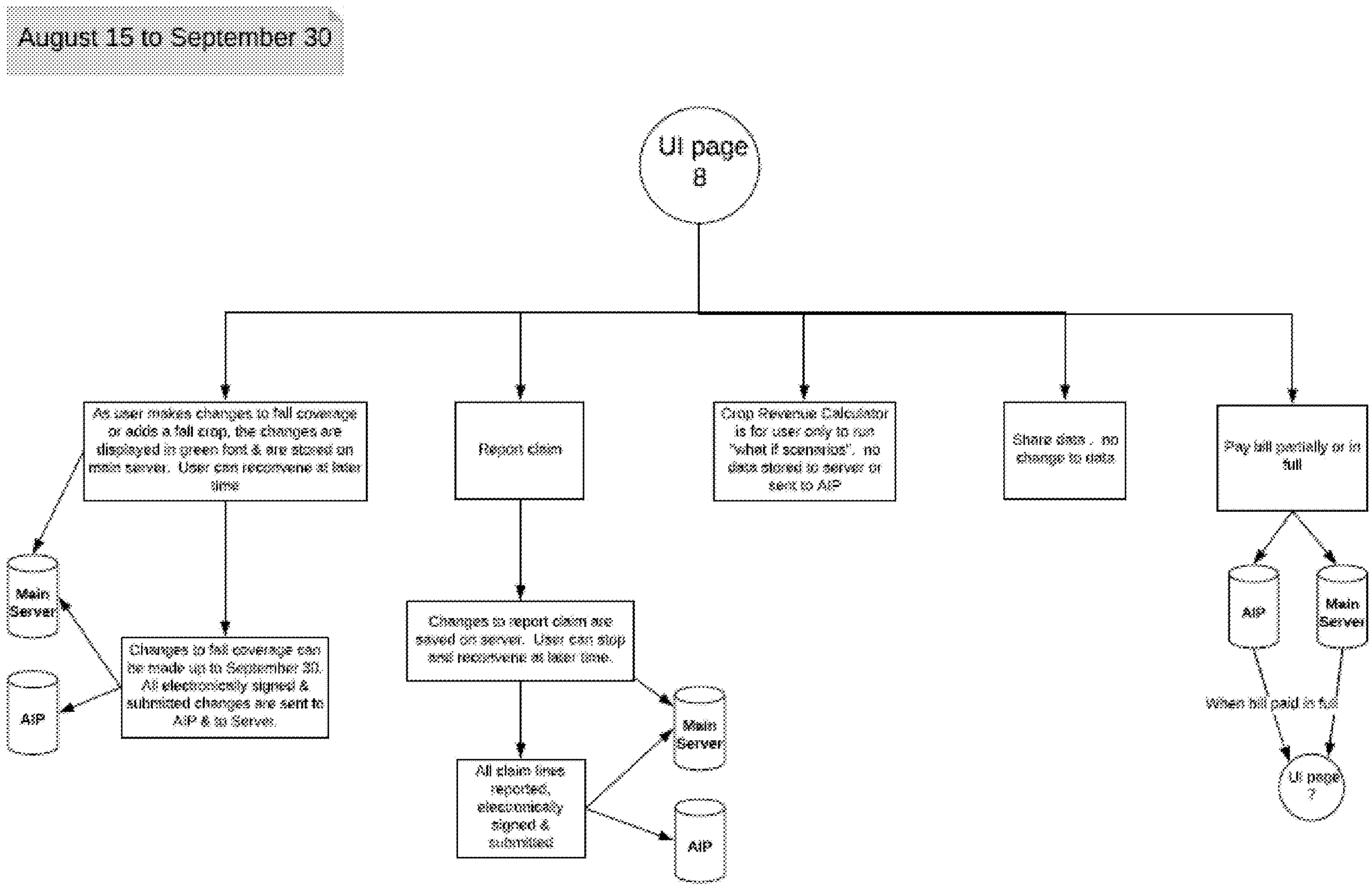
Figure 32:
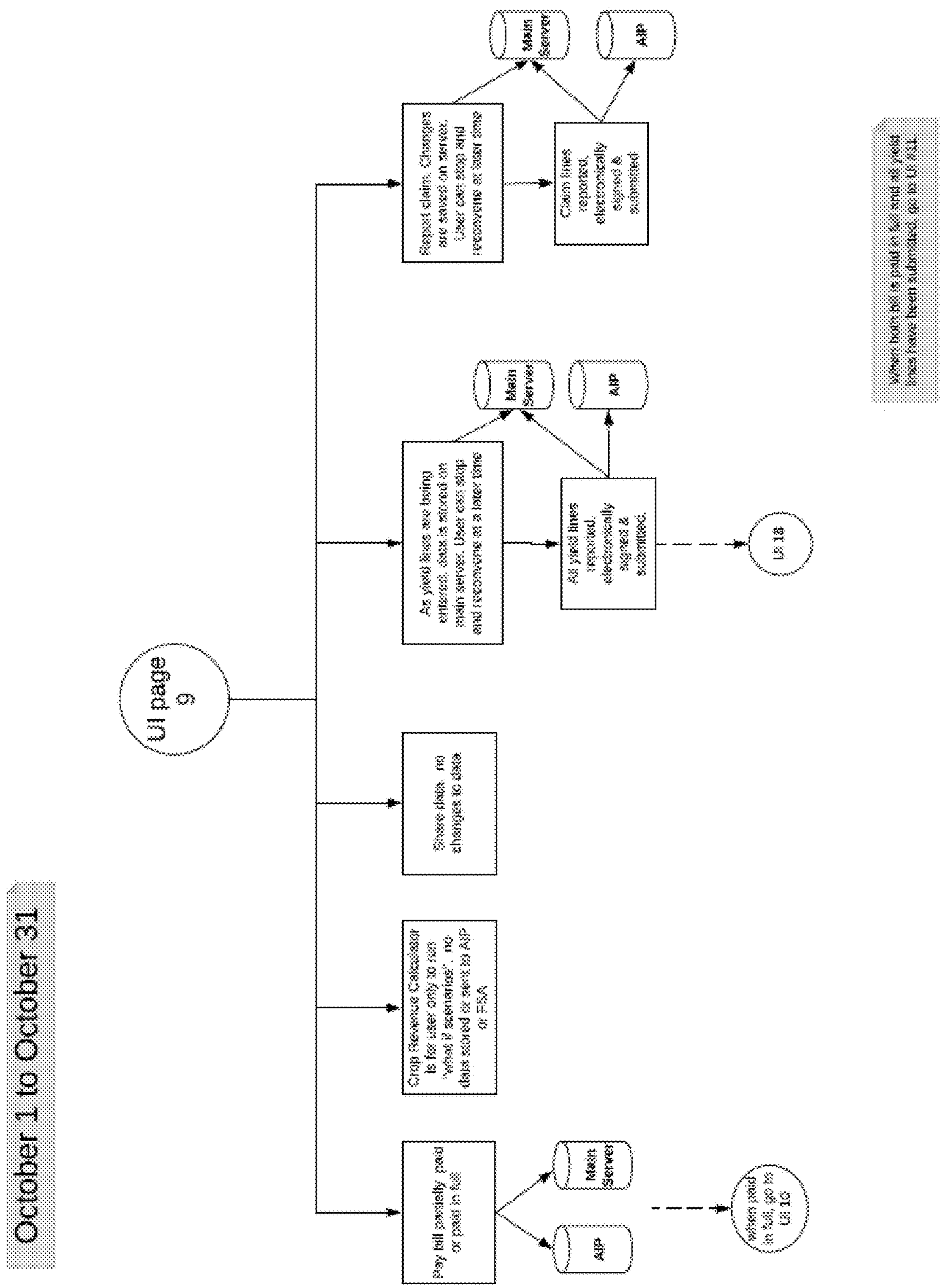
Figure 33:
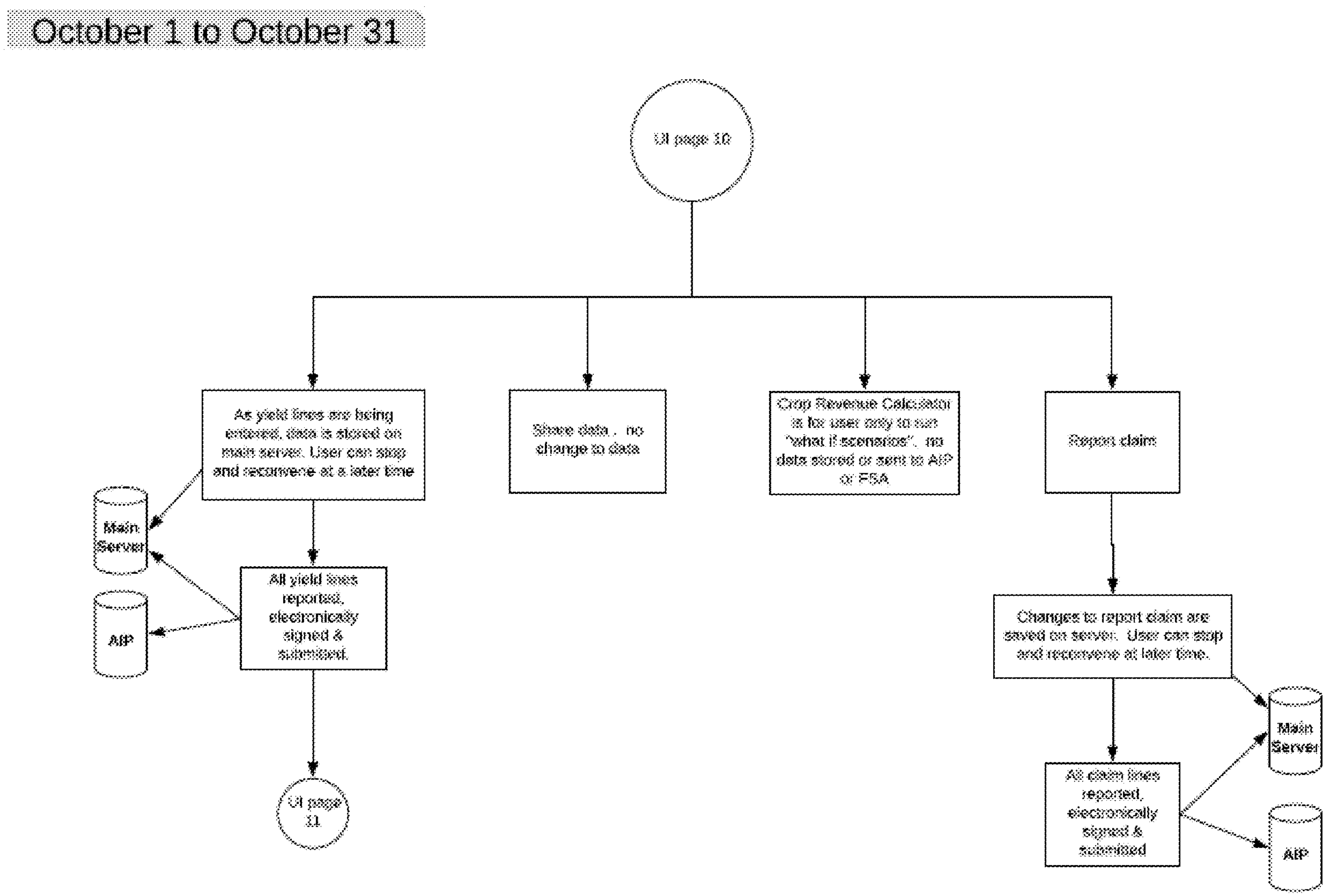
Figure 34:
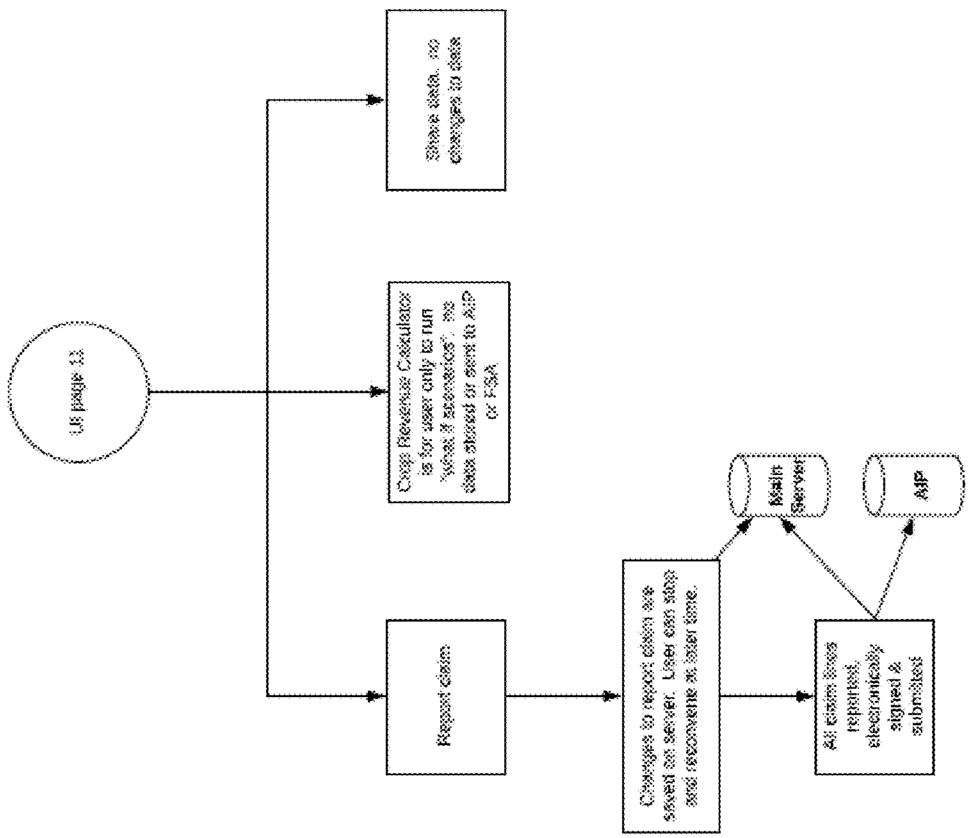
Figure 35:
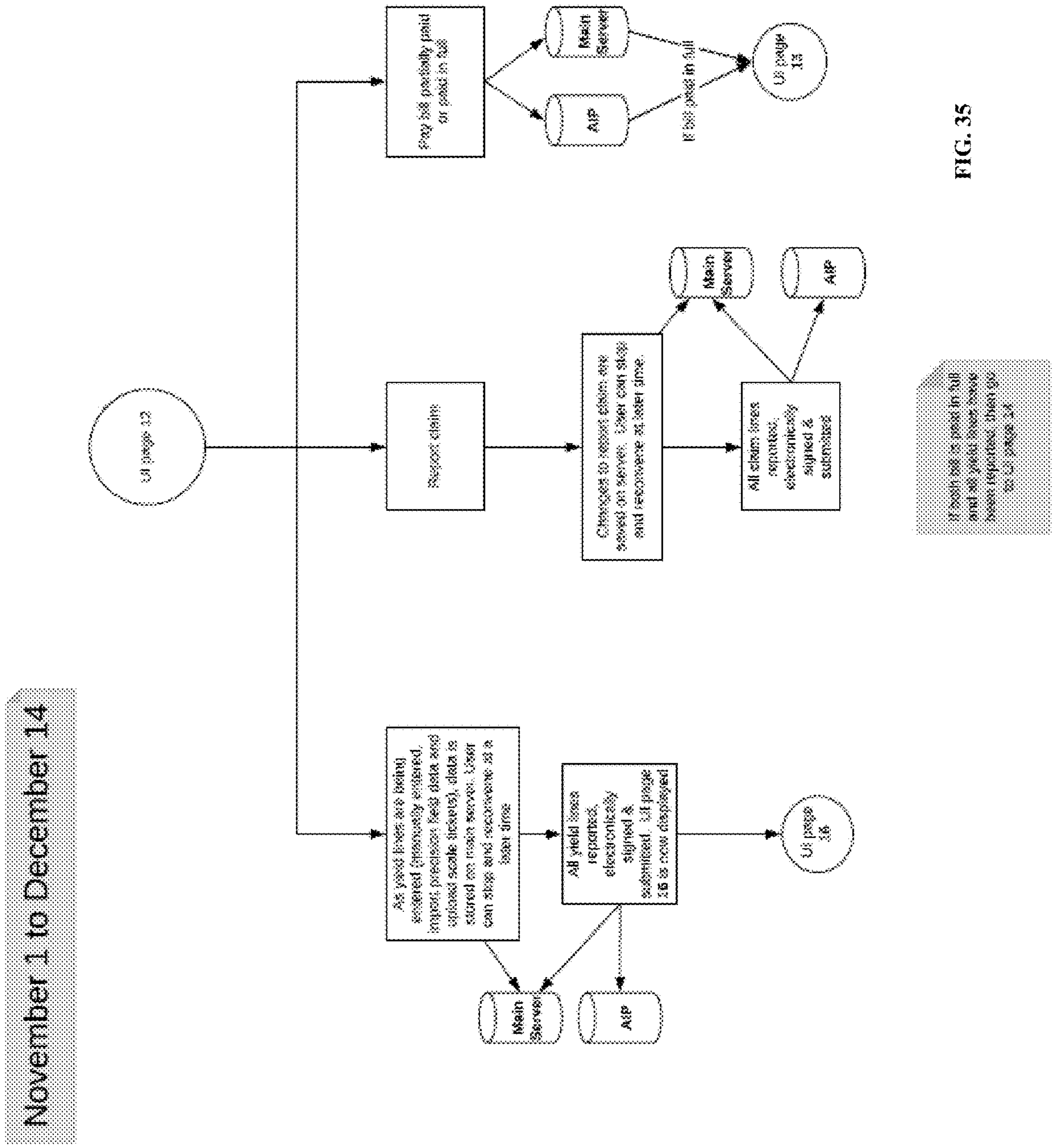
Figure 36:
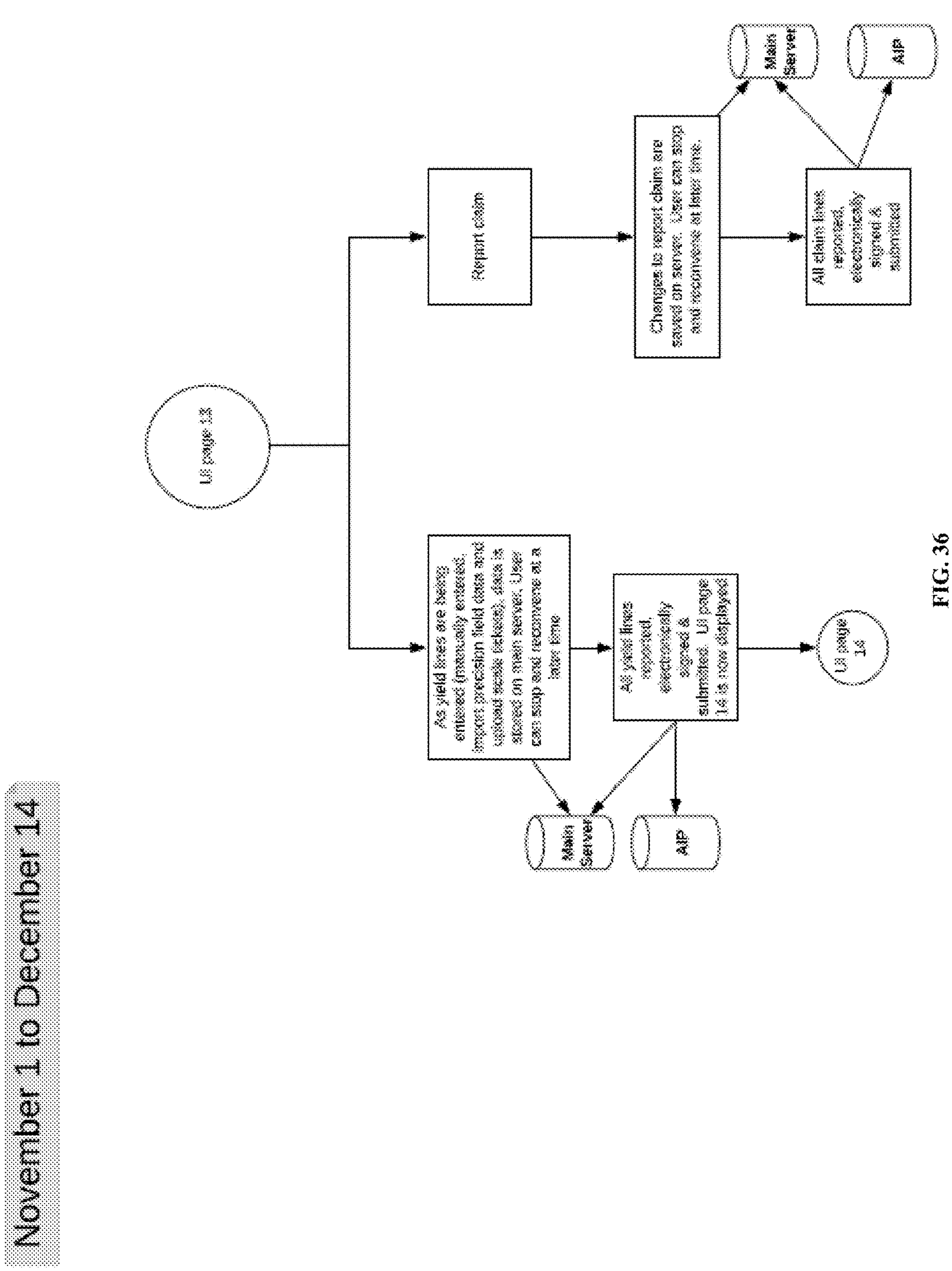
Figure 37:
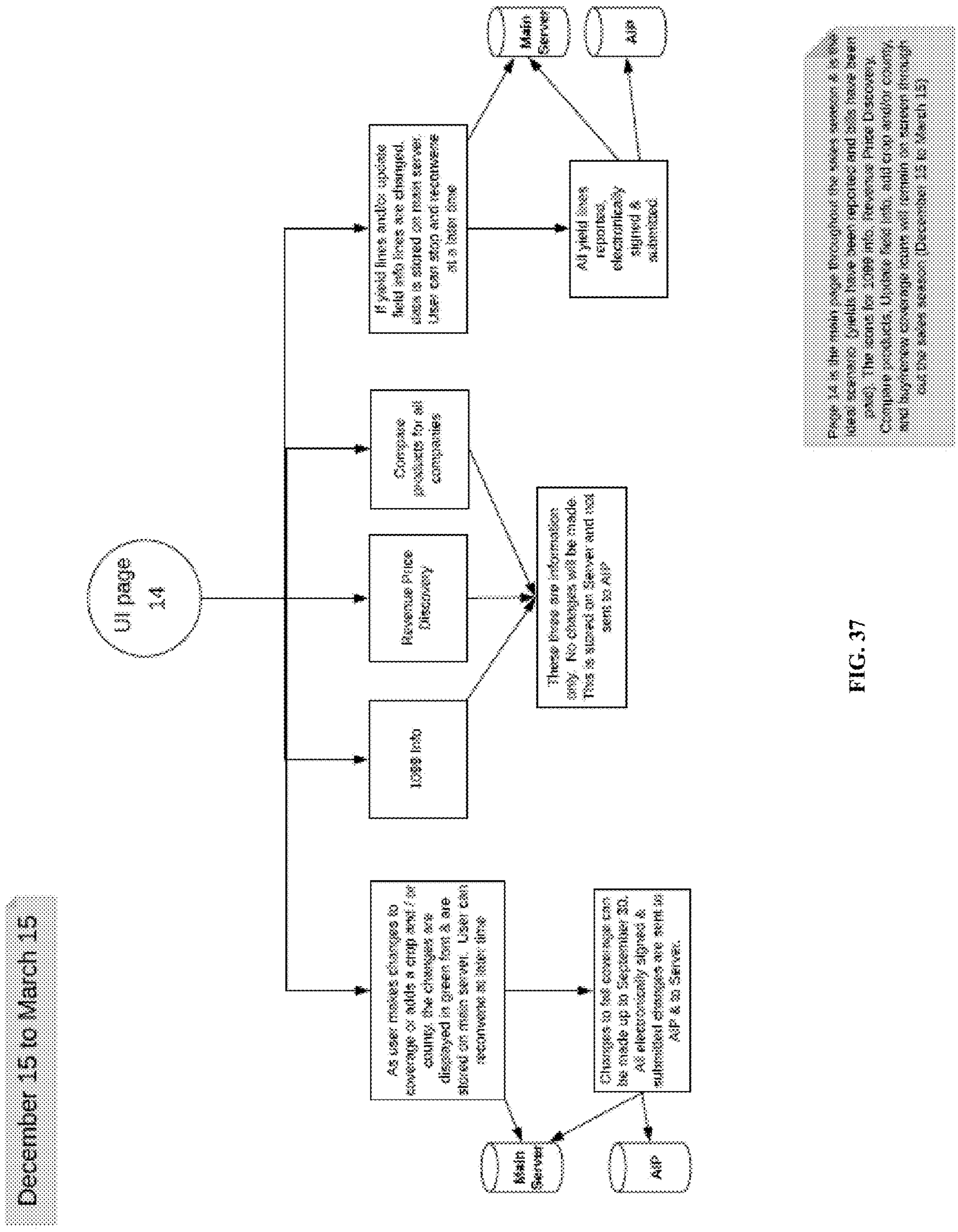
Figure 38:
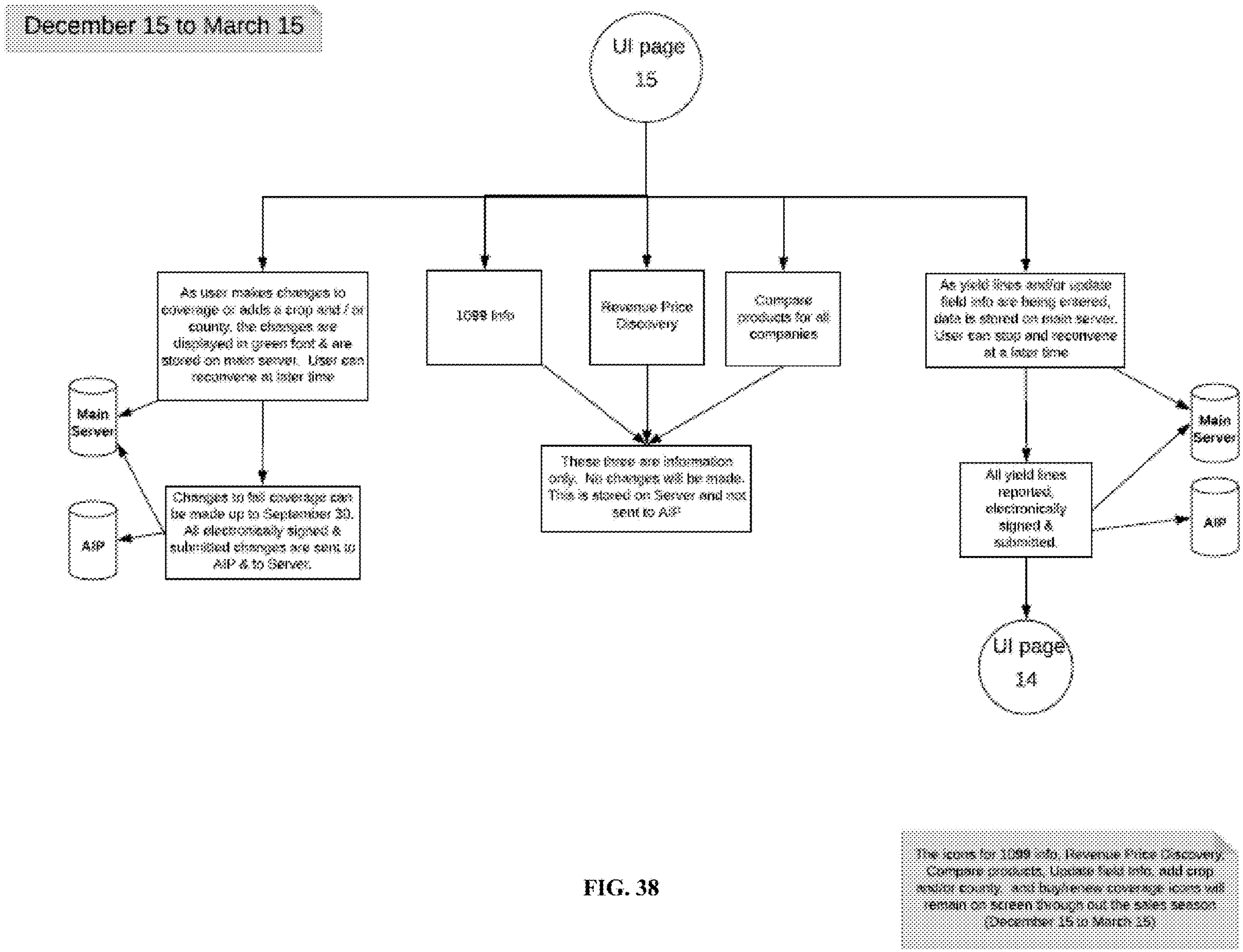
Figure 39:
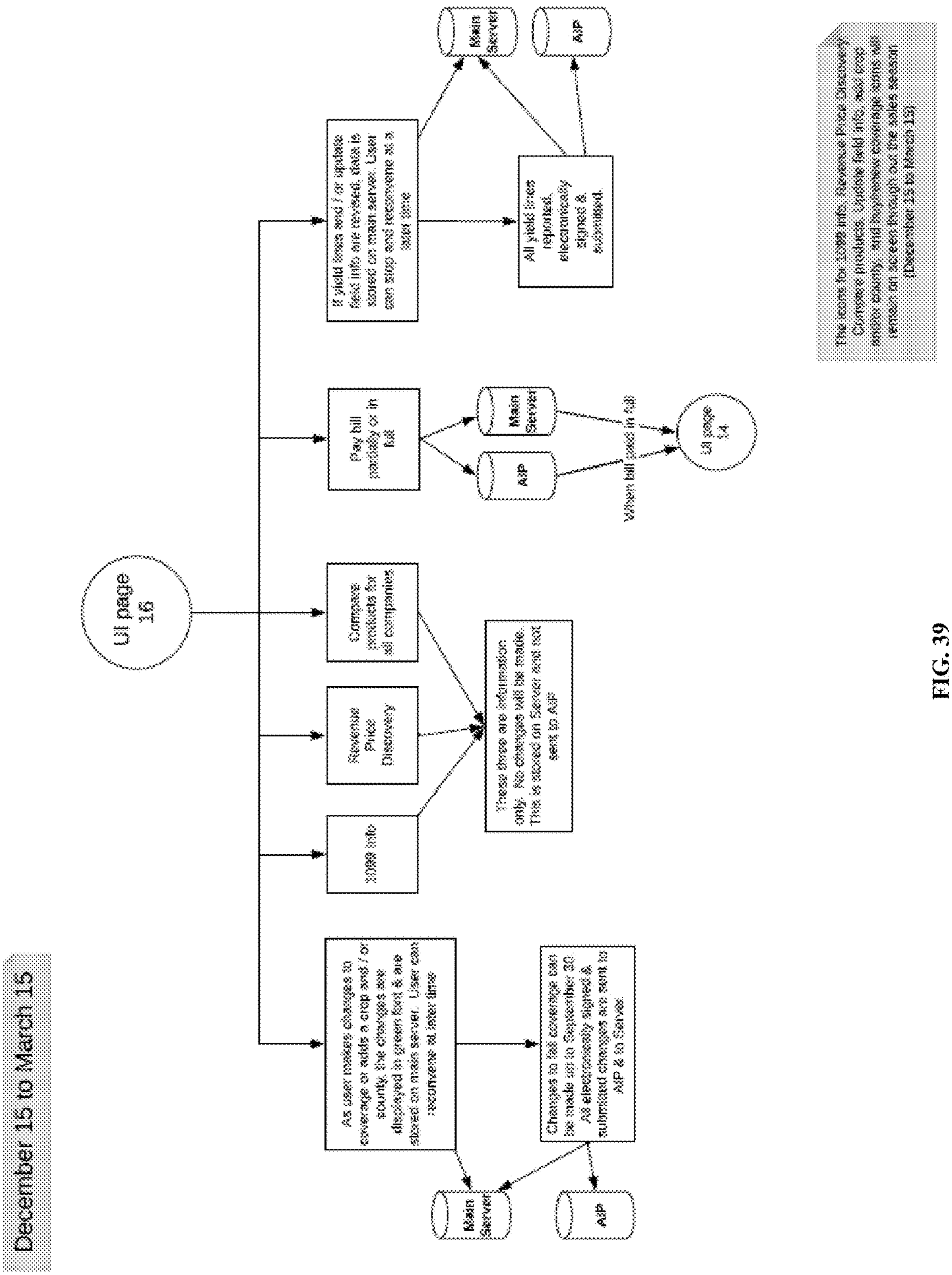
Figure 40:
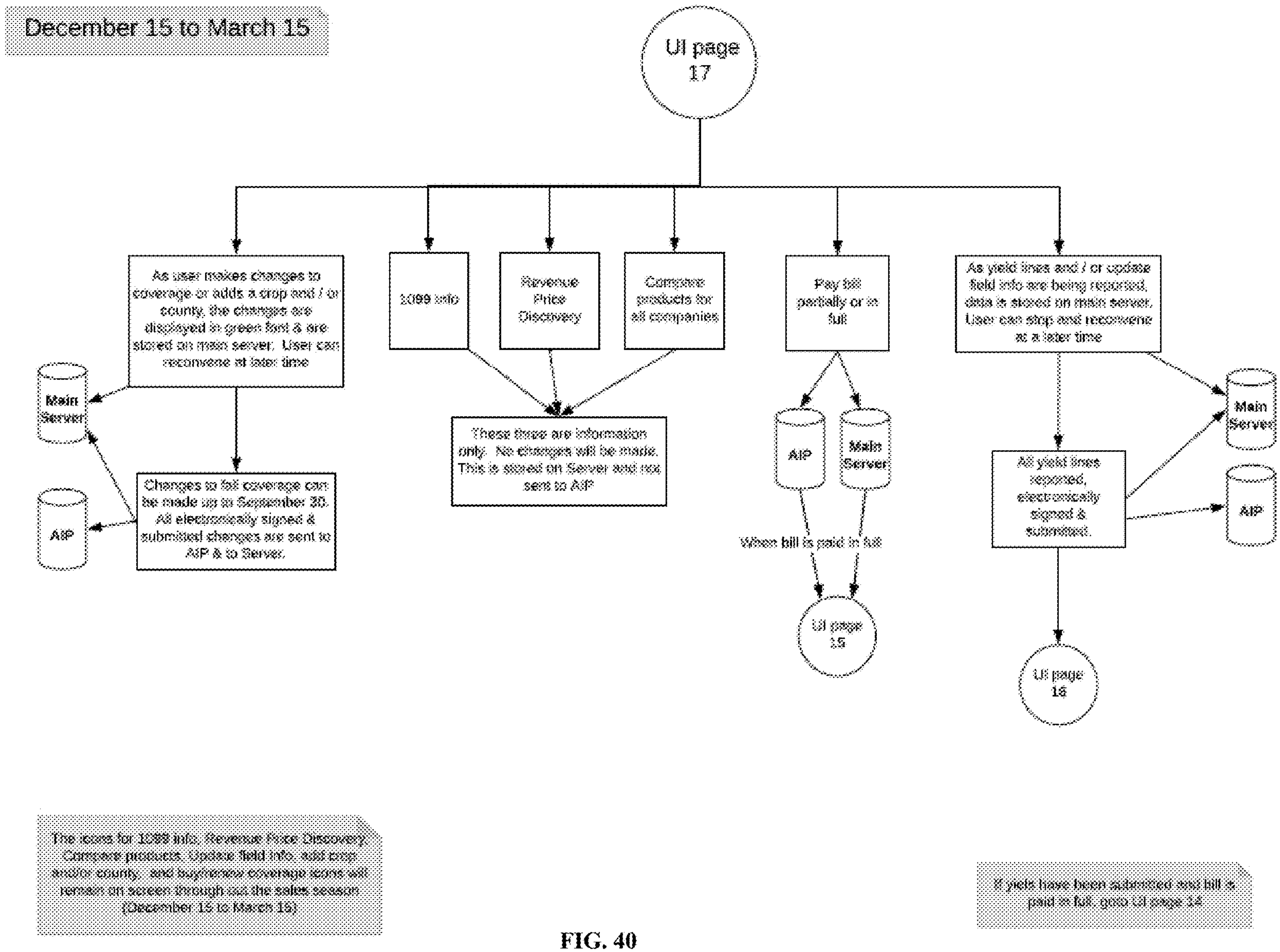
Figure 41:
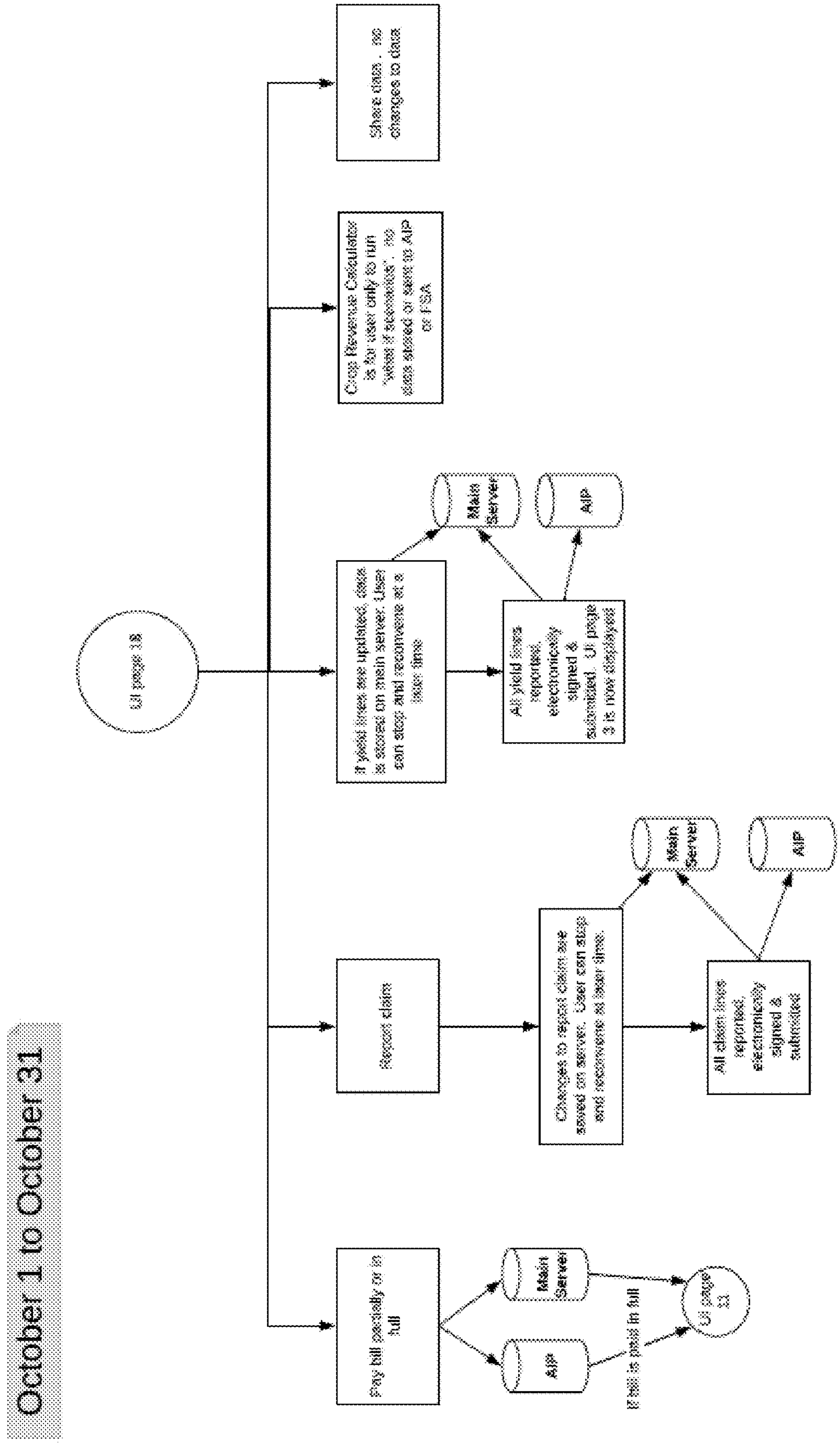
Figure 42:
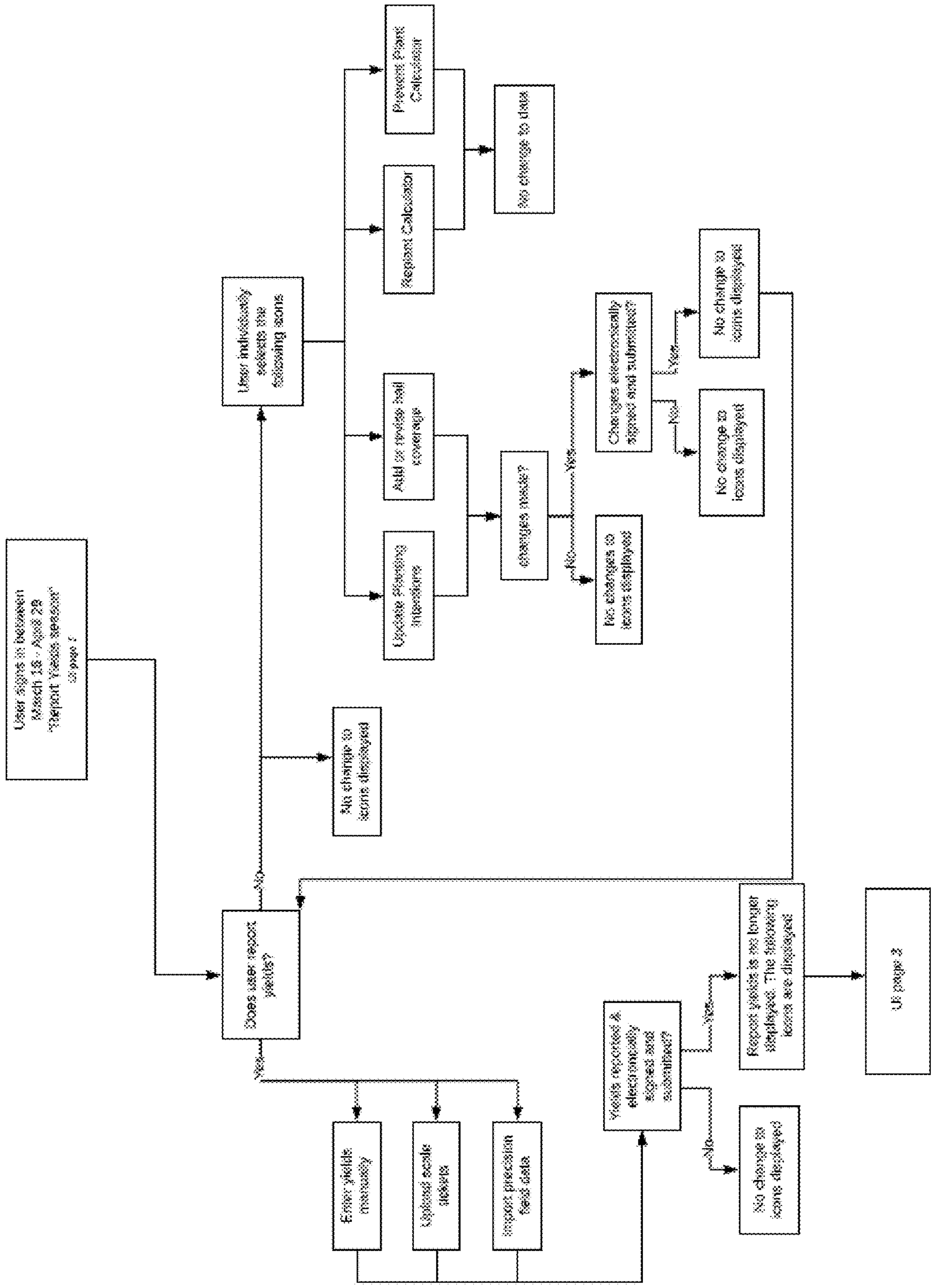
FIGS. 42-59 are flowcharts of algorithms for interface operation of FIGS. 4-24 in dynamically-guided presentation for a system for dynamic agriculture data processing, according to embodiments.
Figure 43:
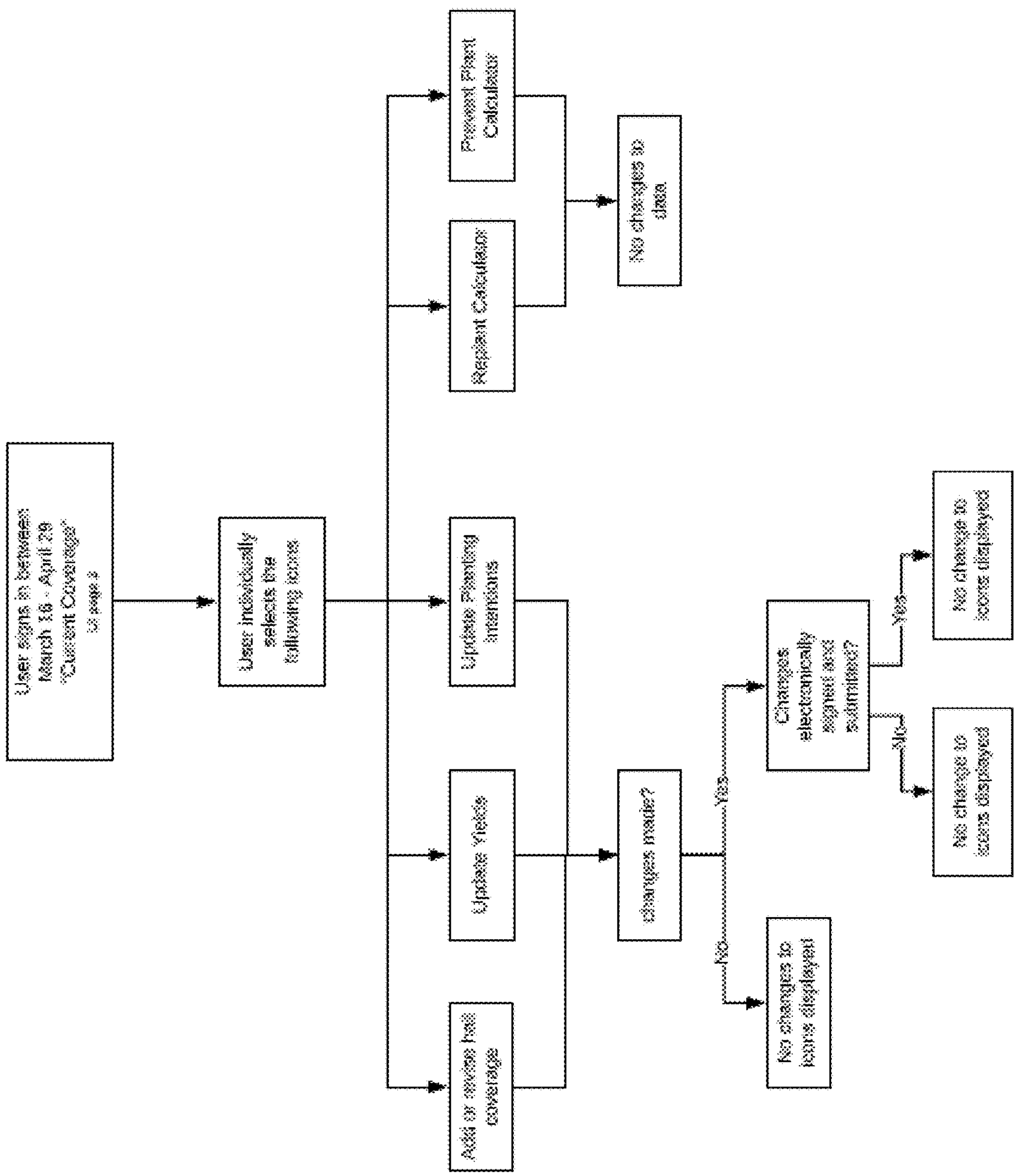
Figure 44:
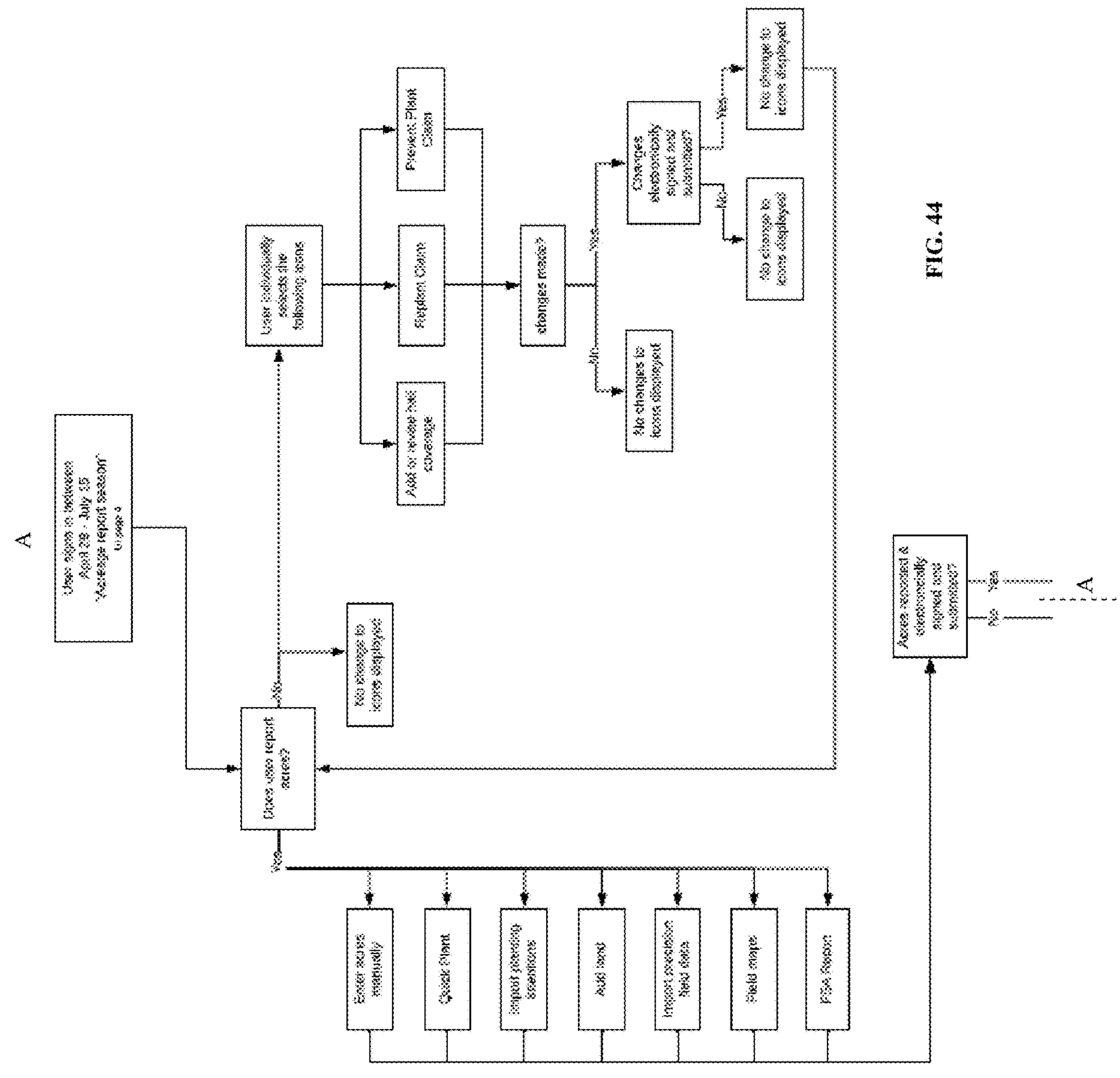
Figure 45:
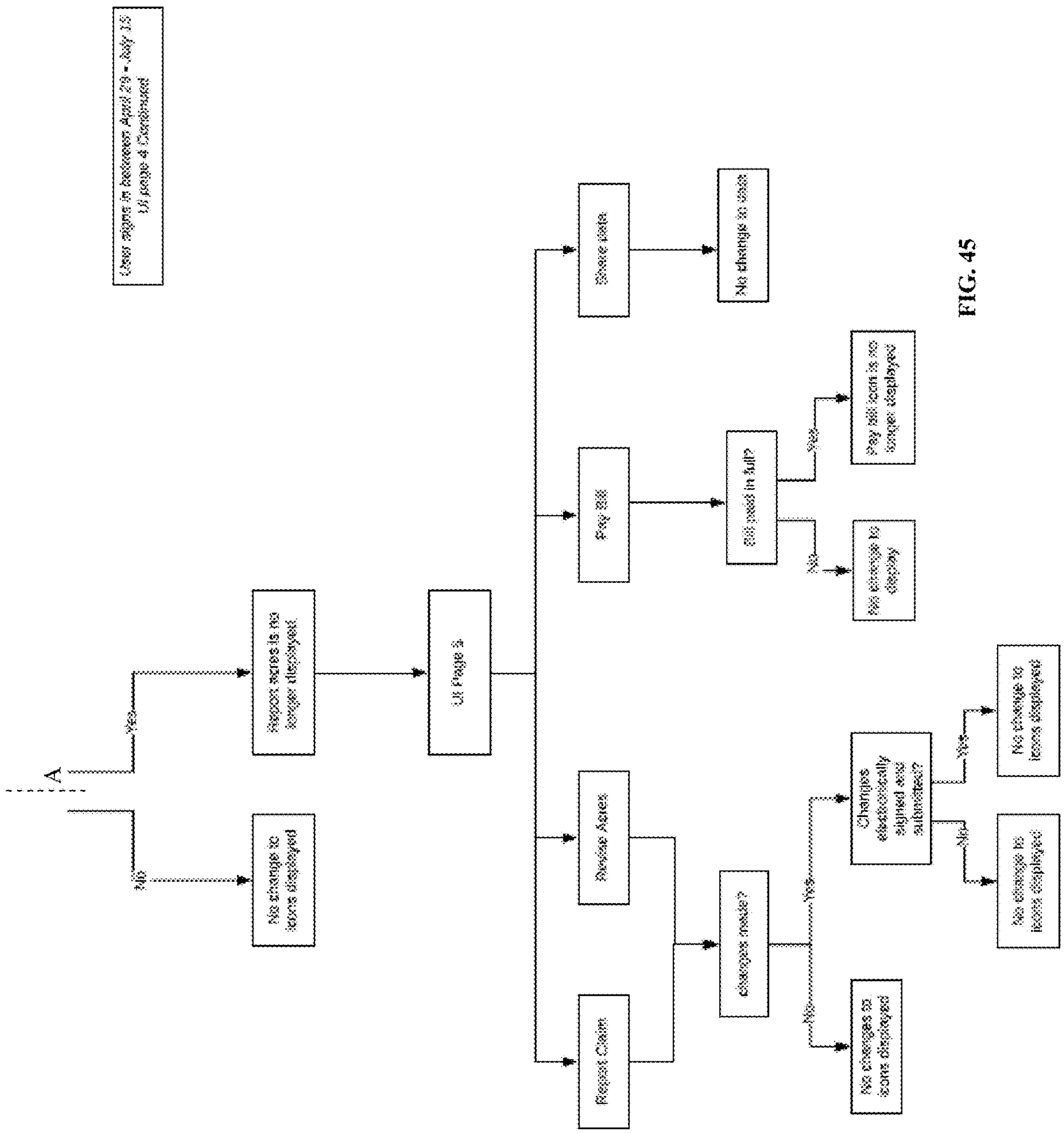
Figure 46:
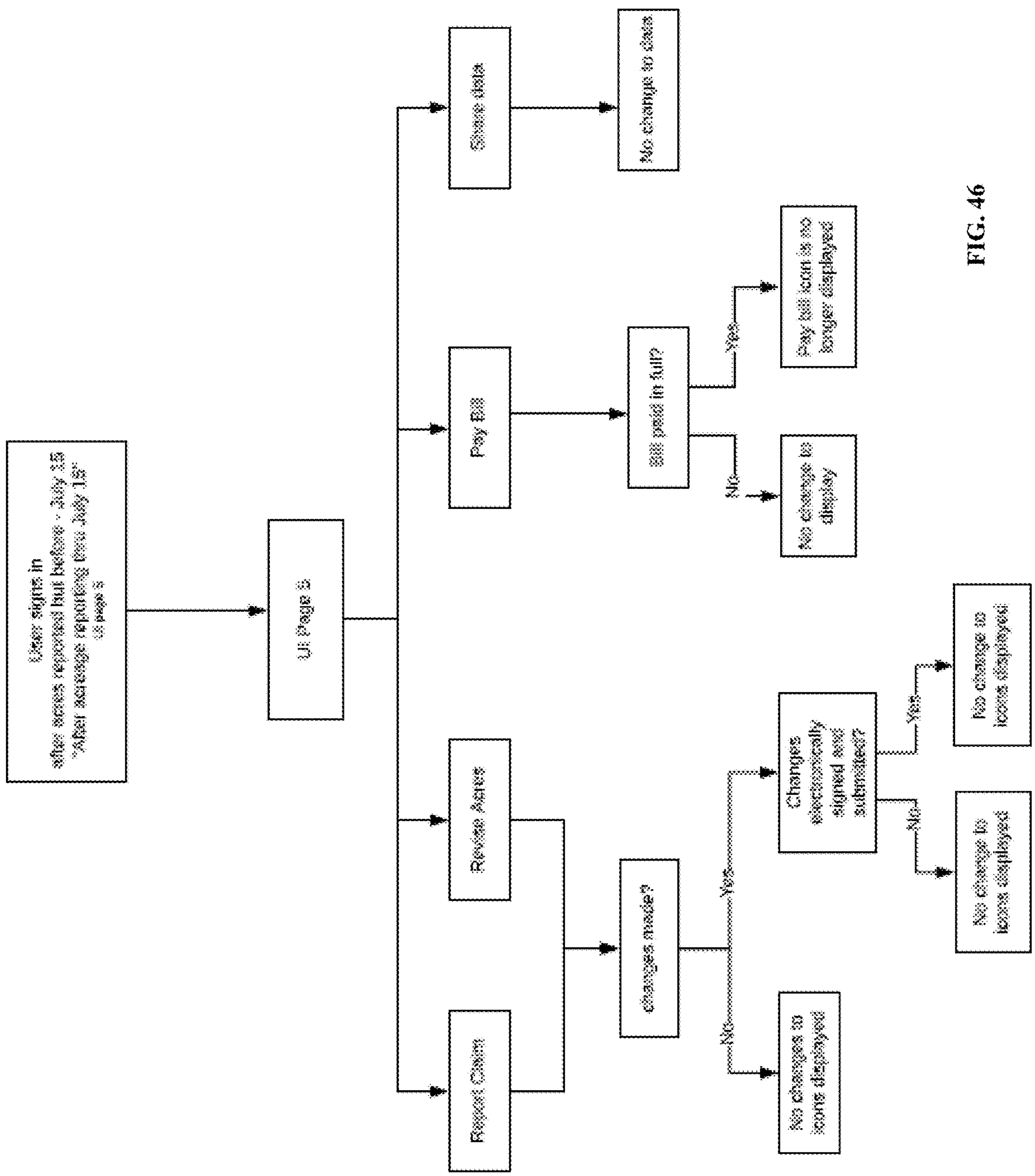
Figure 47:
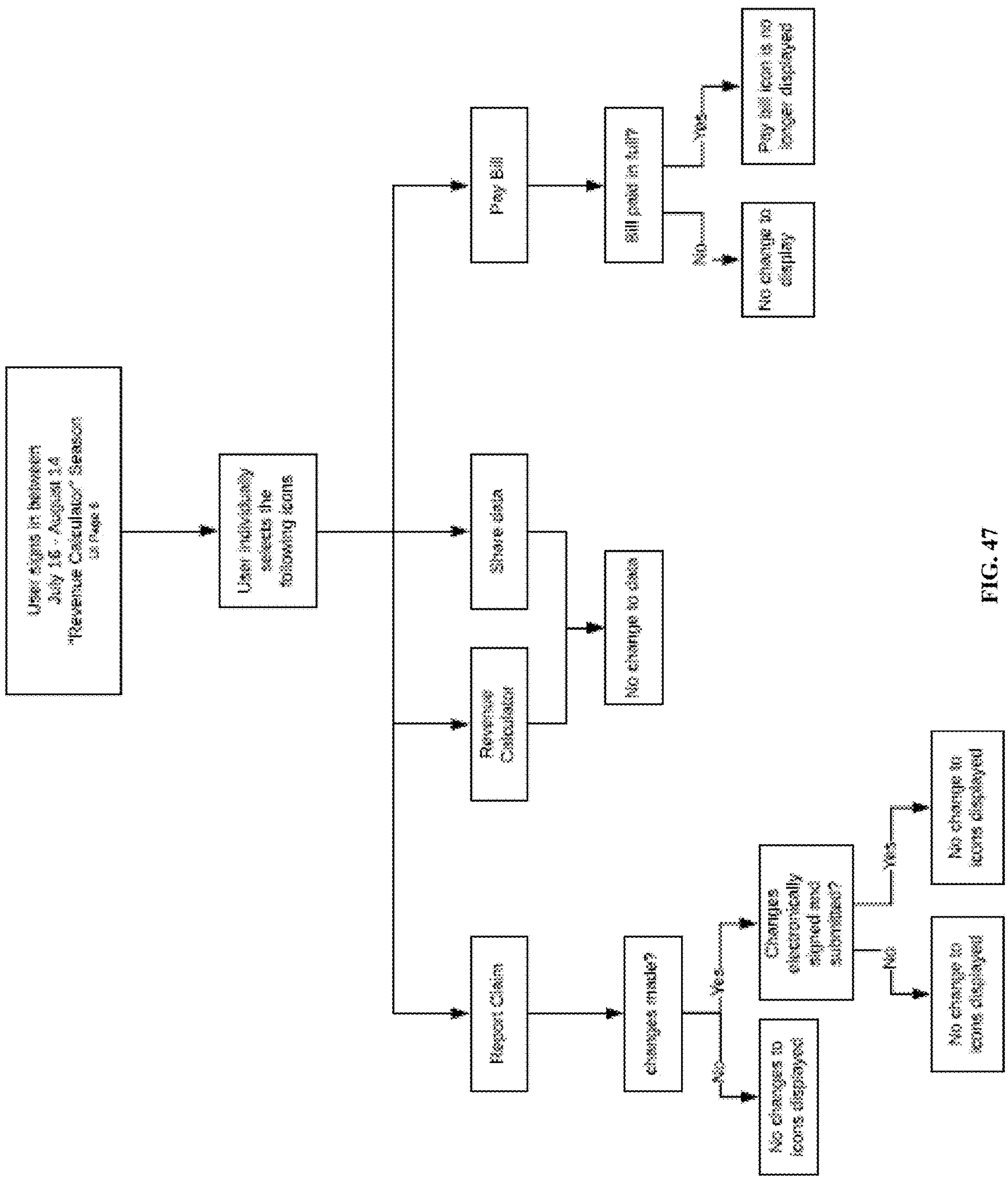
Figure 48:
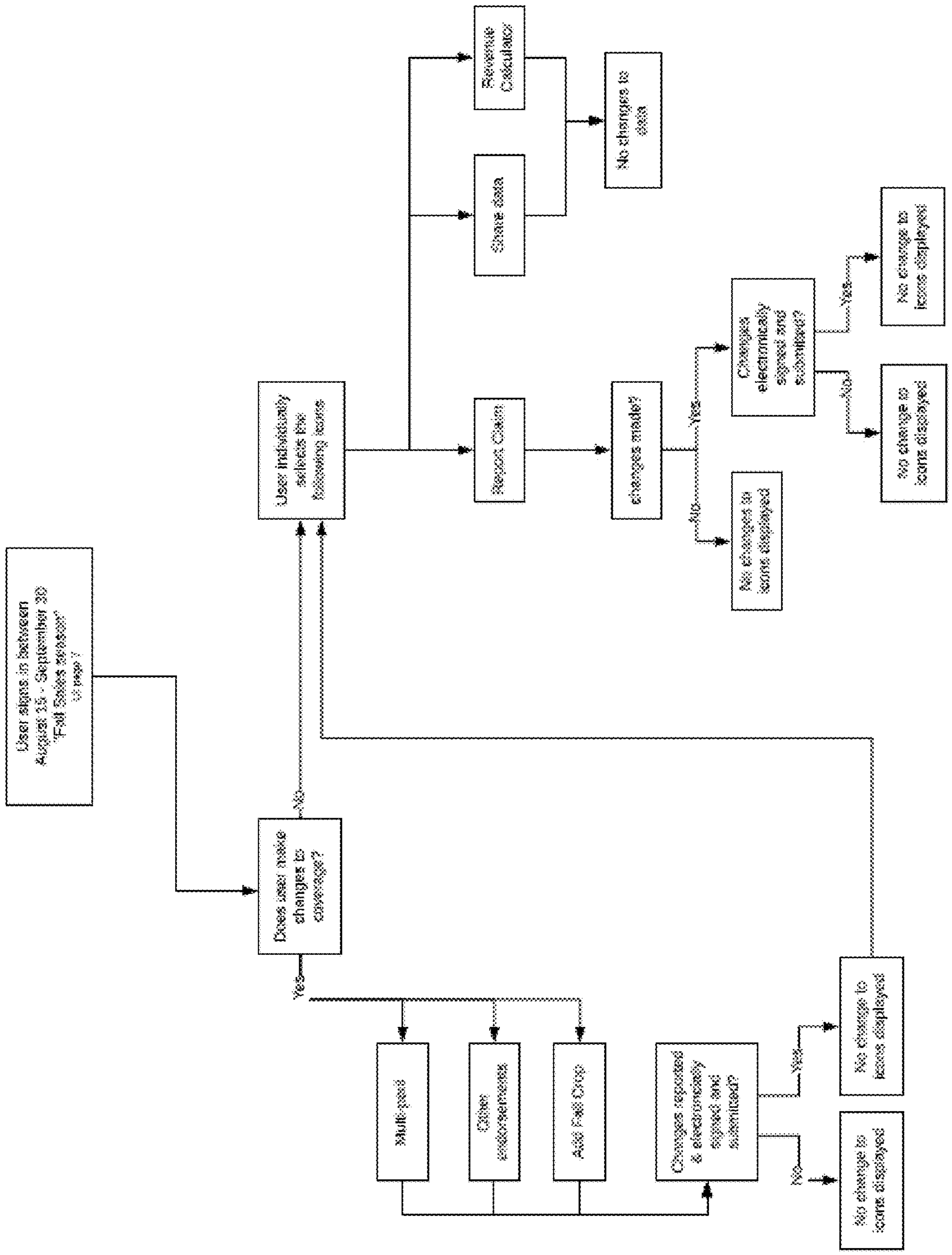
Figure 49:
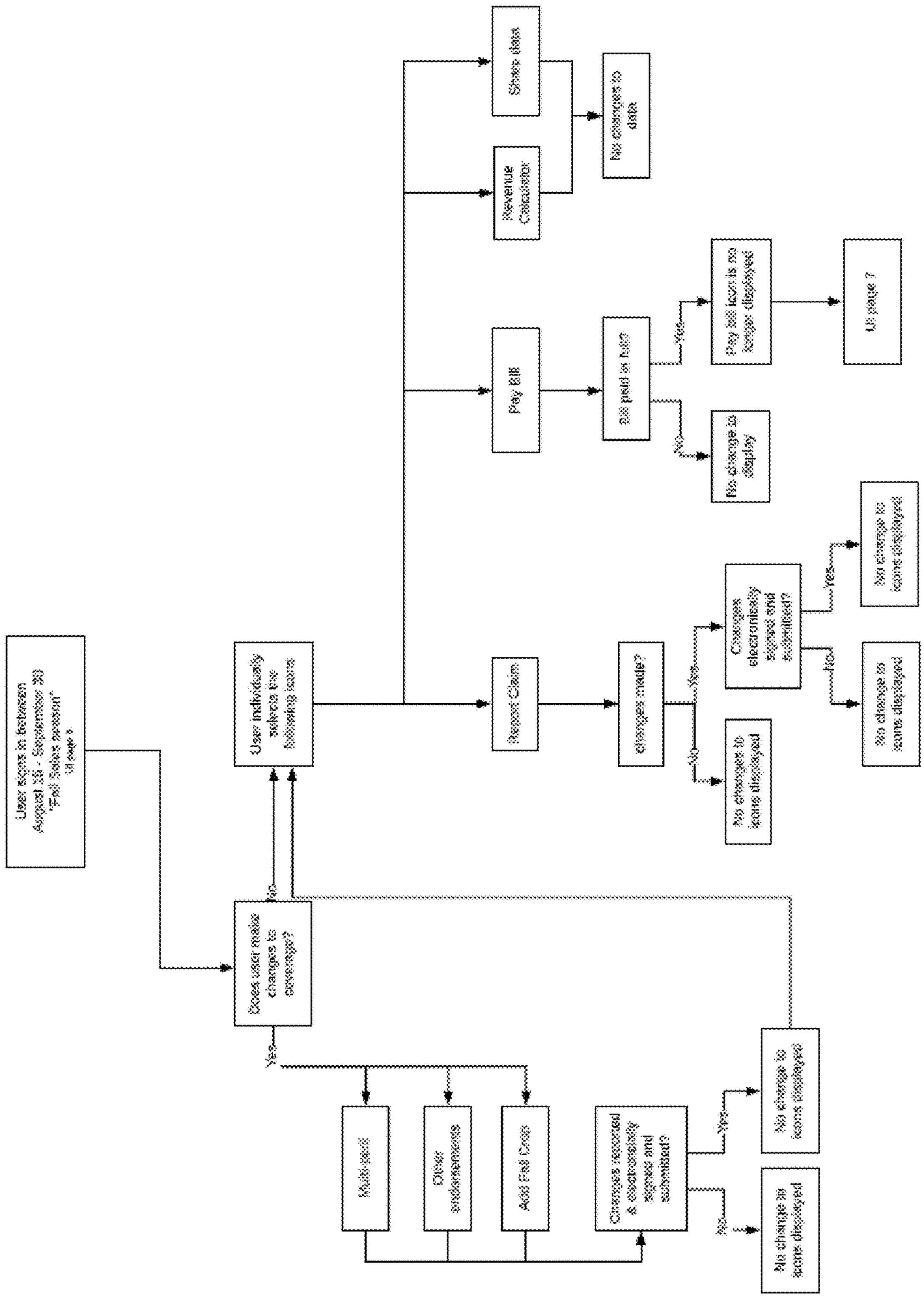
Figure 50:
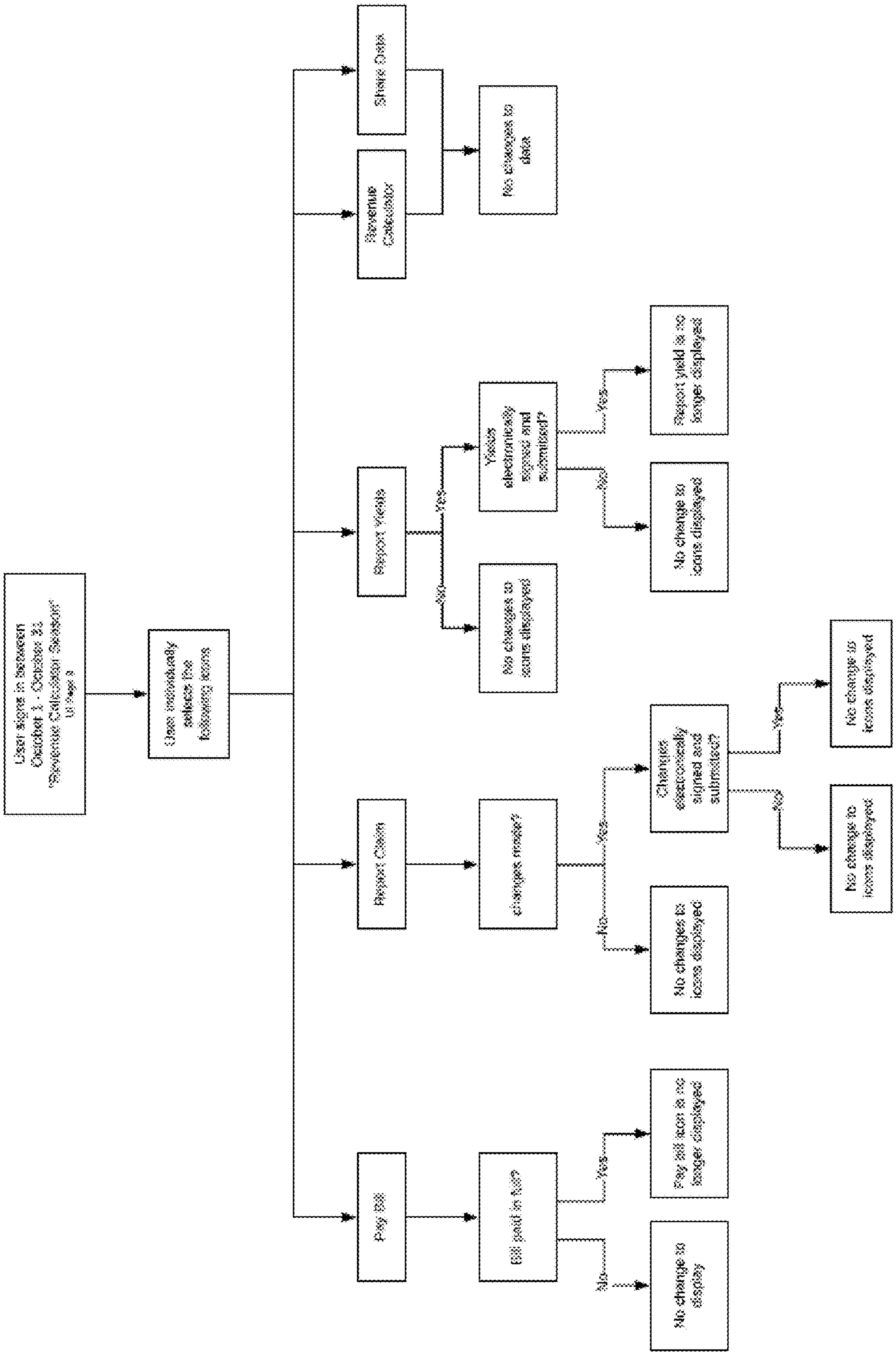
Figure 51:
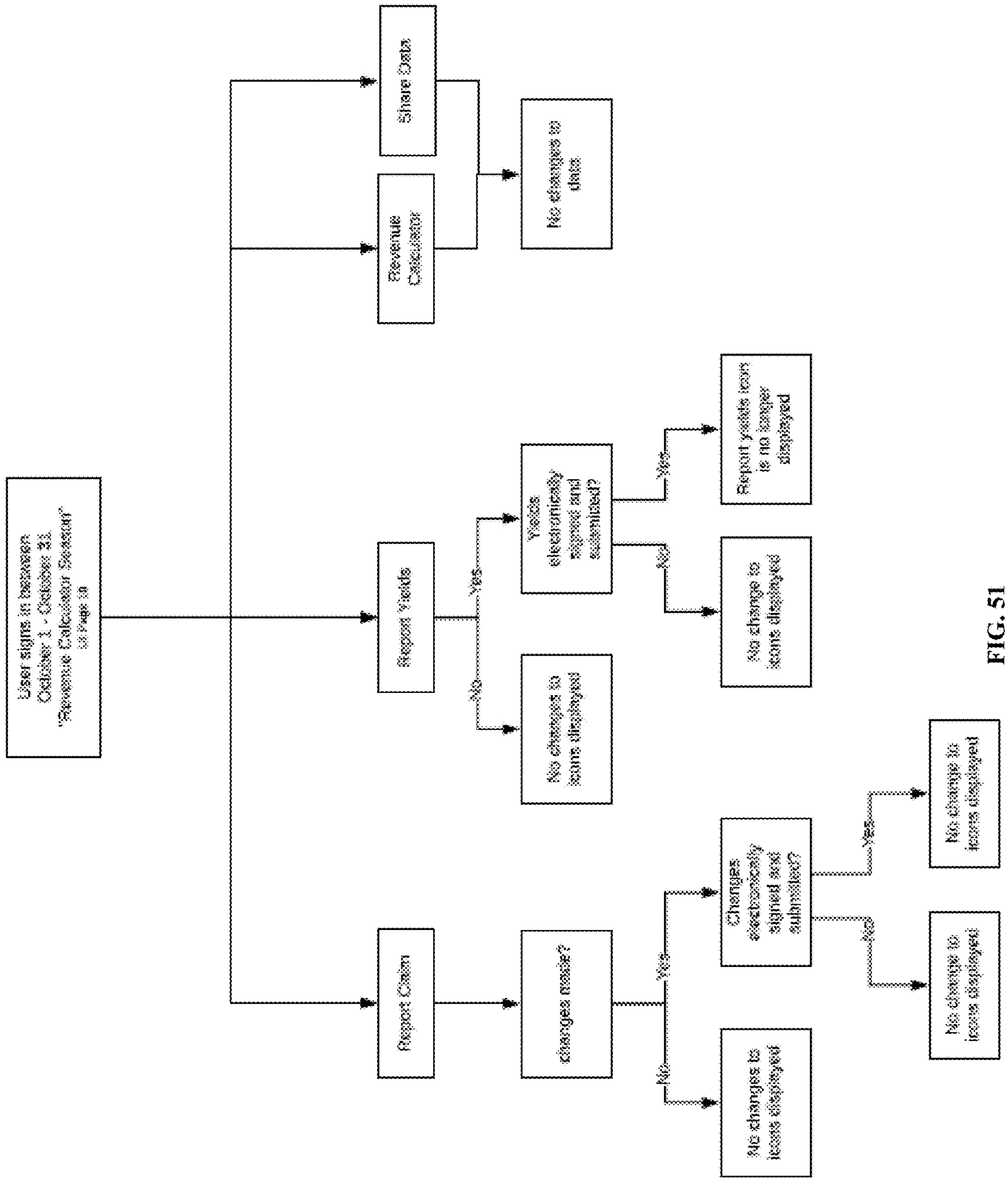
Figure 52:
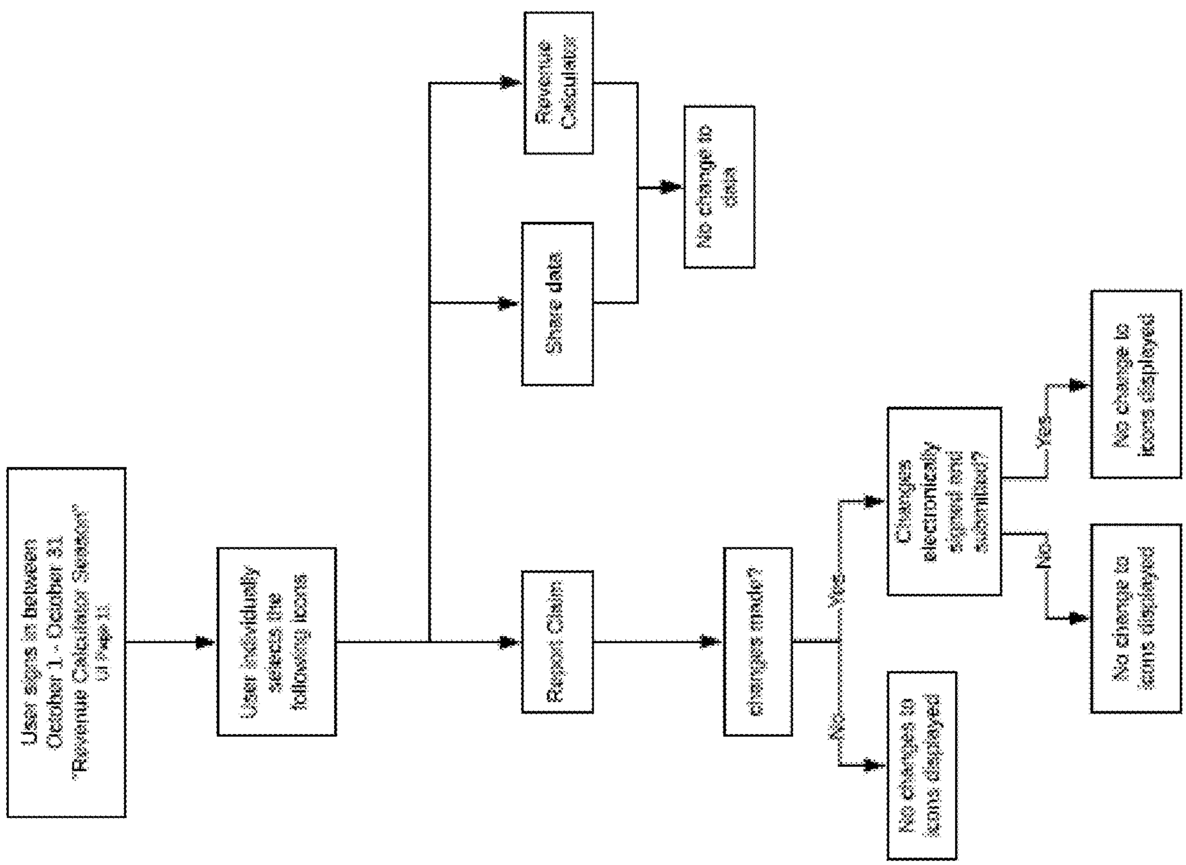
Figure 53:
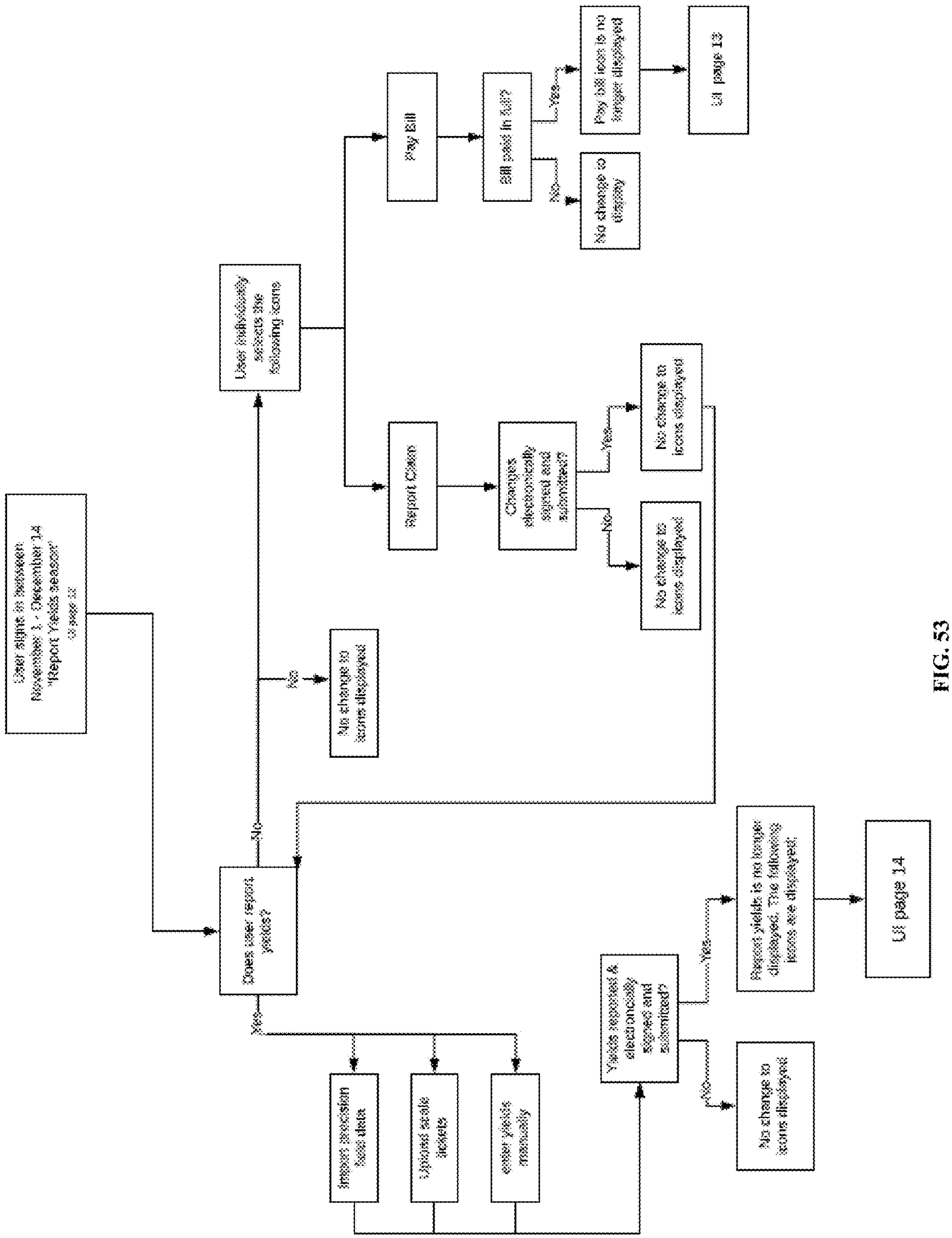
Figure 54:
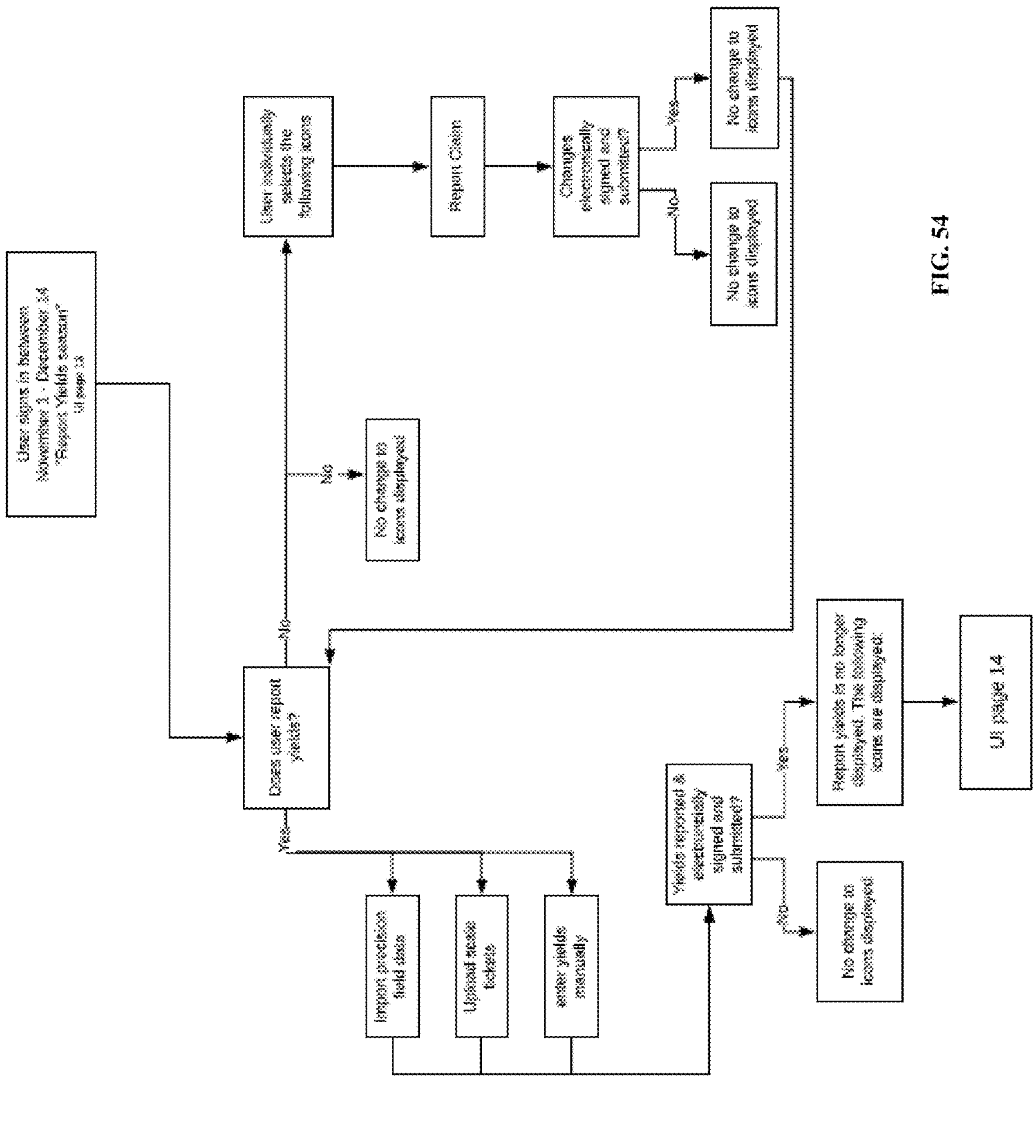
Figure 55:
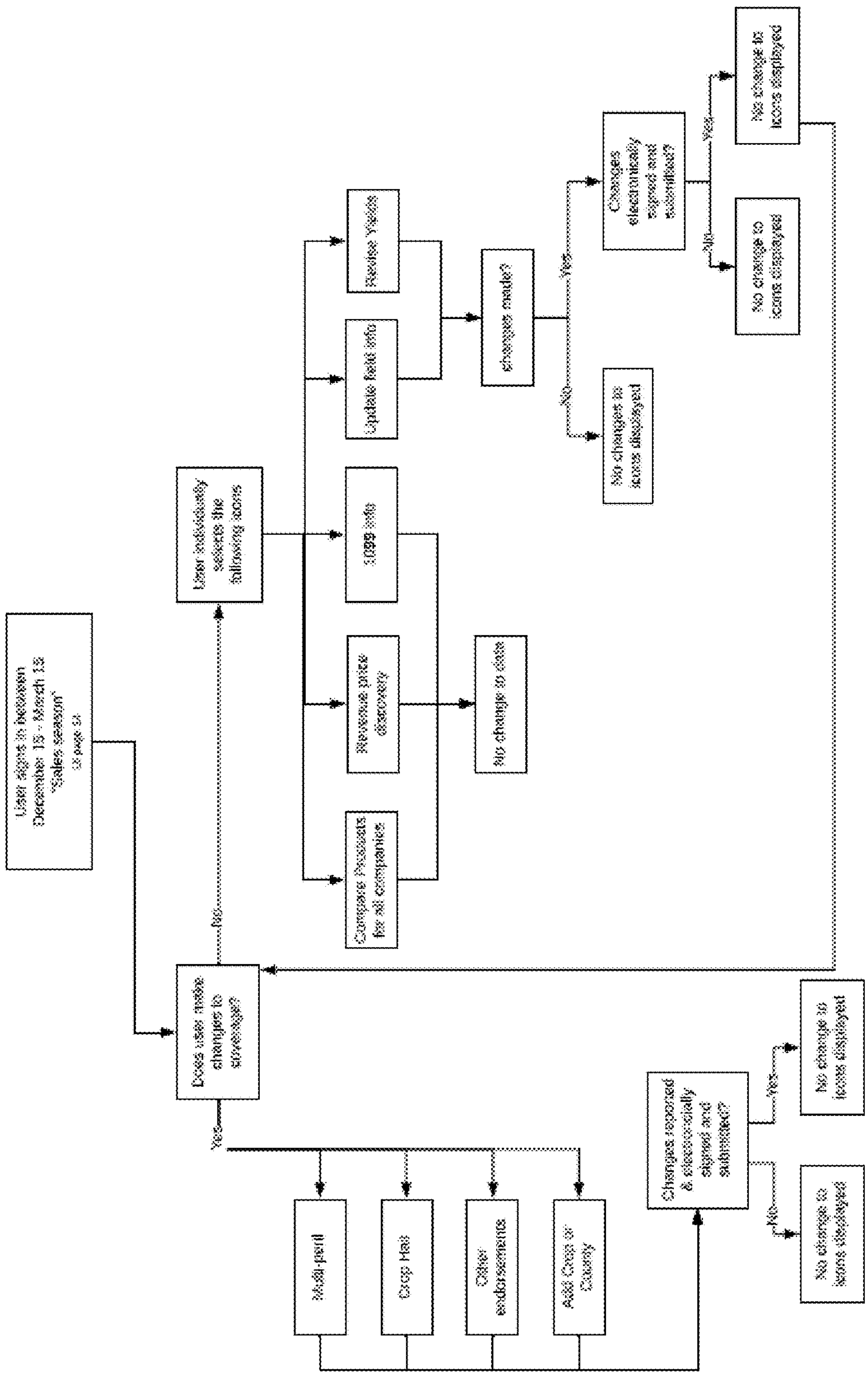
Figure 56:
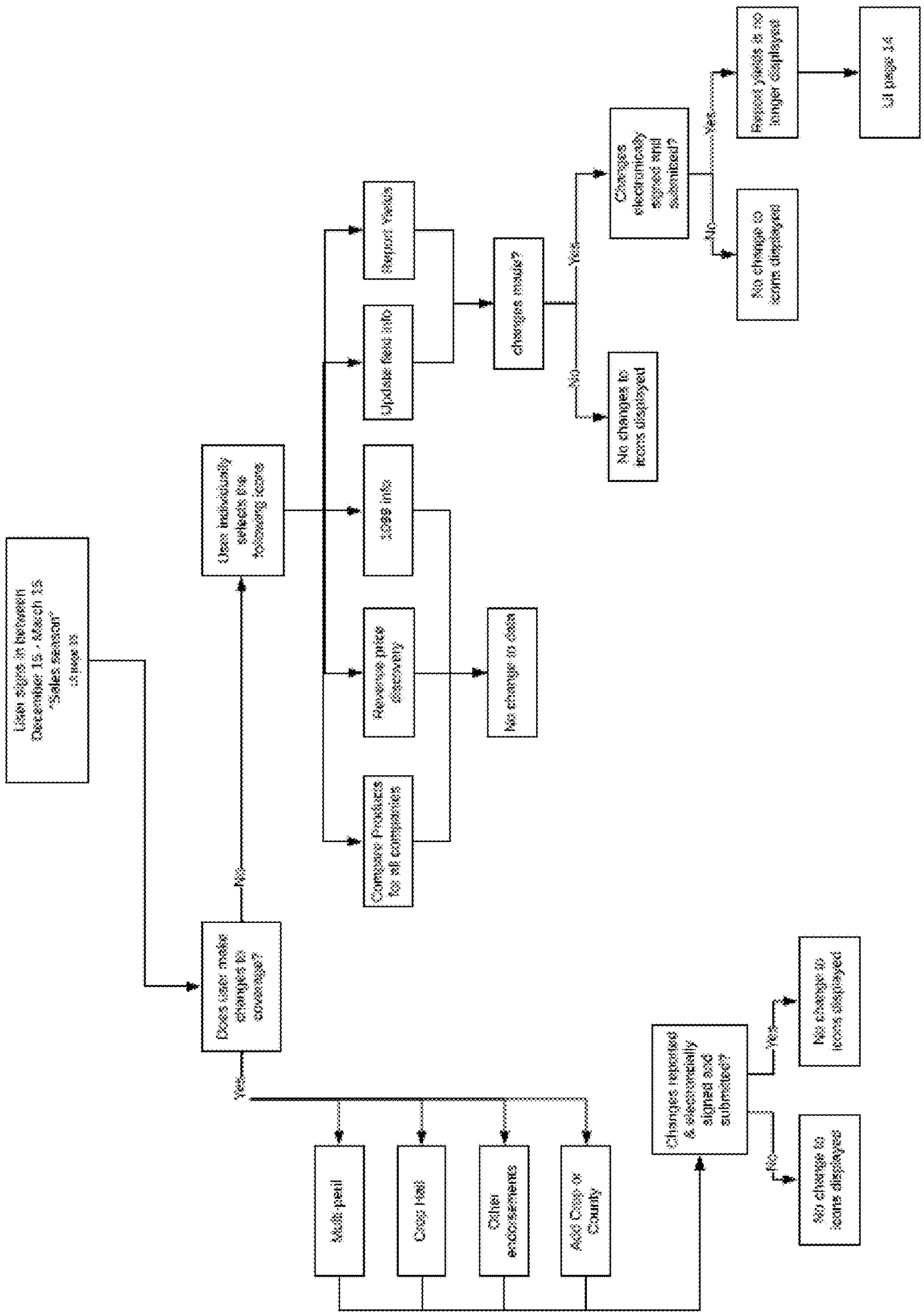
Figure 57:
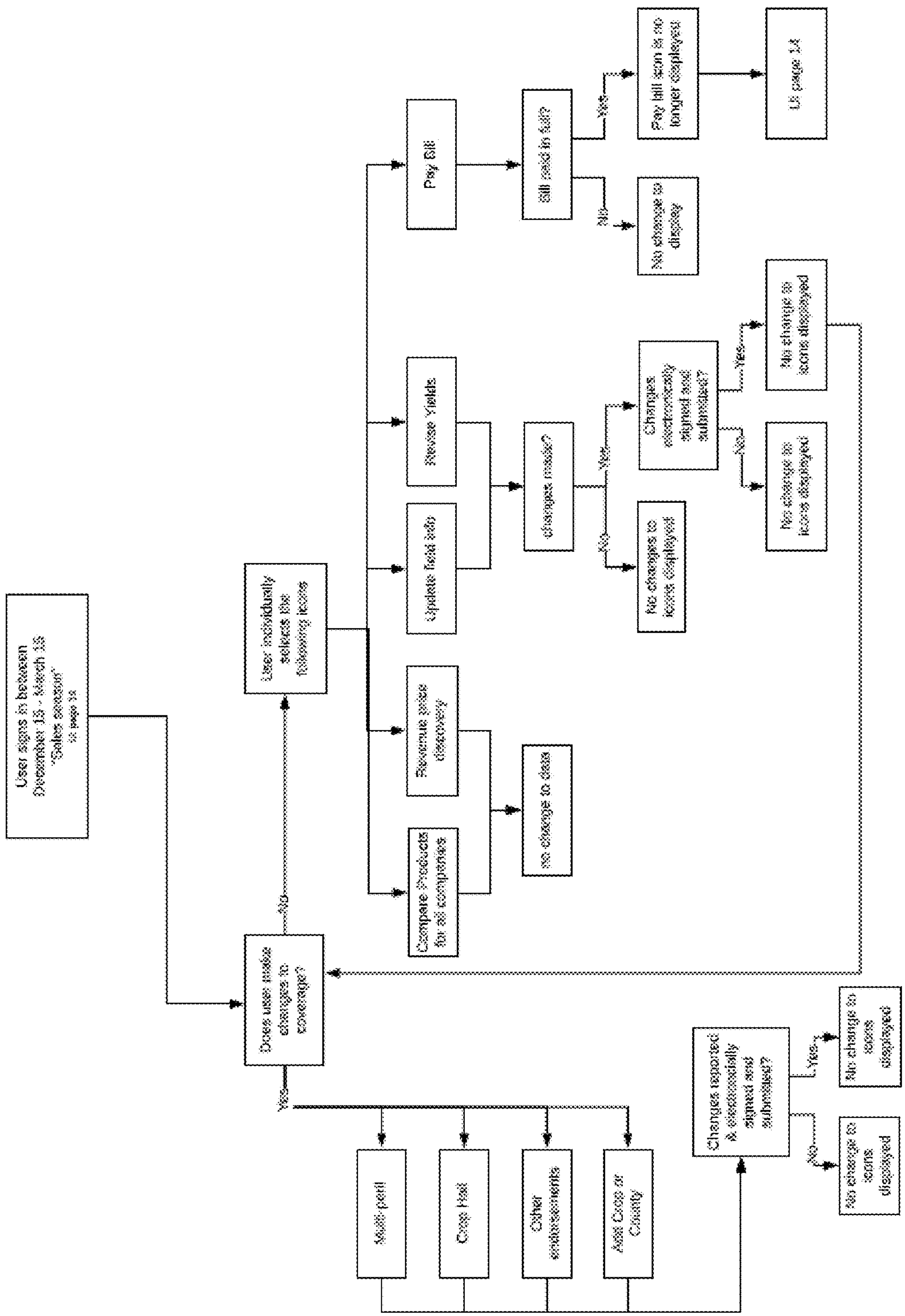
Figure 58:
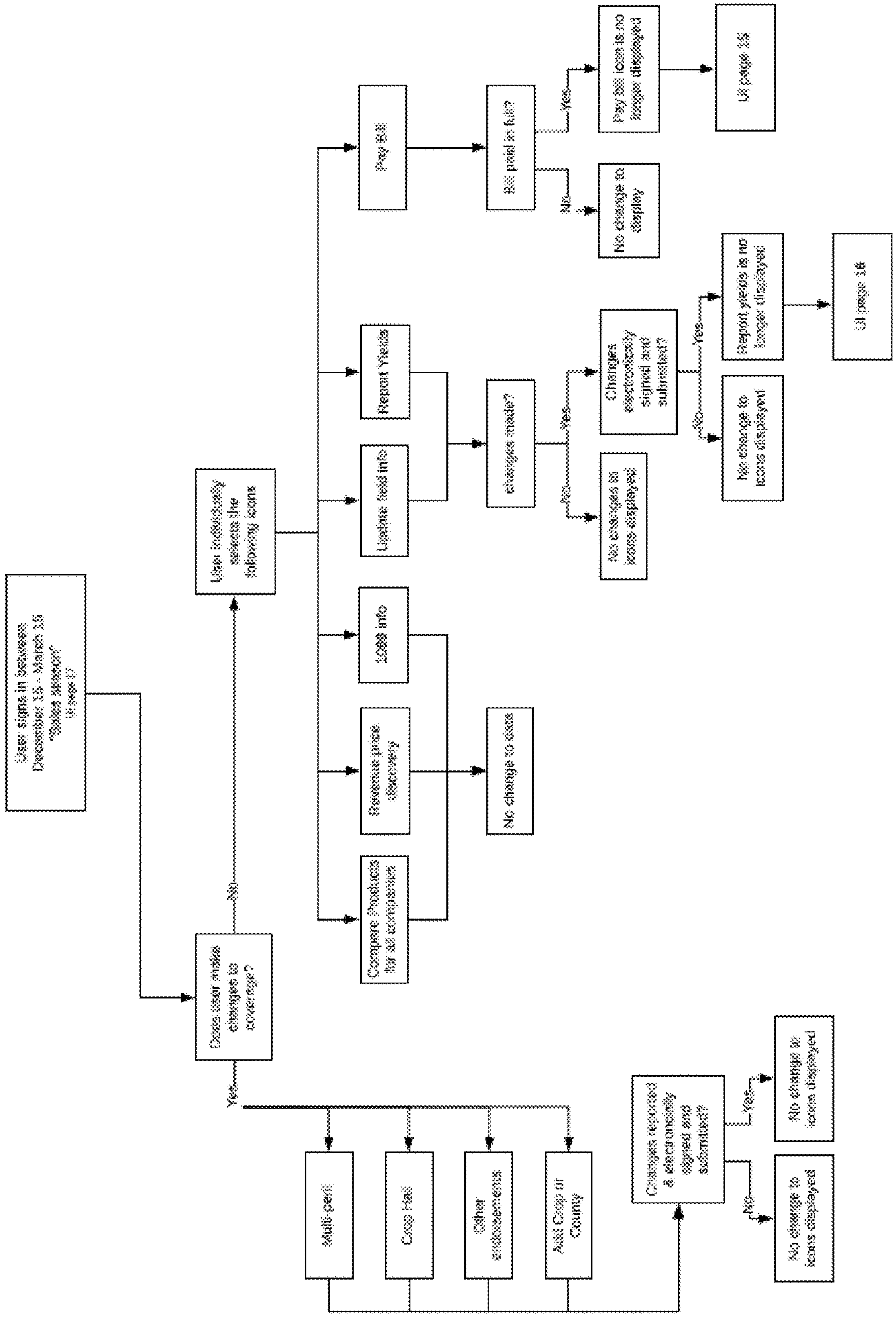
Figure 59:
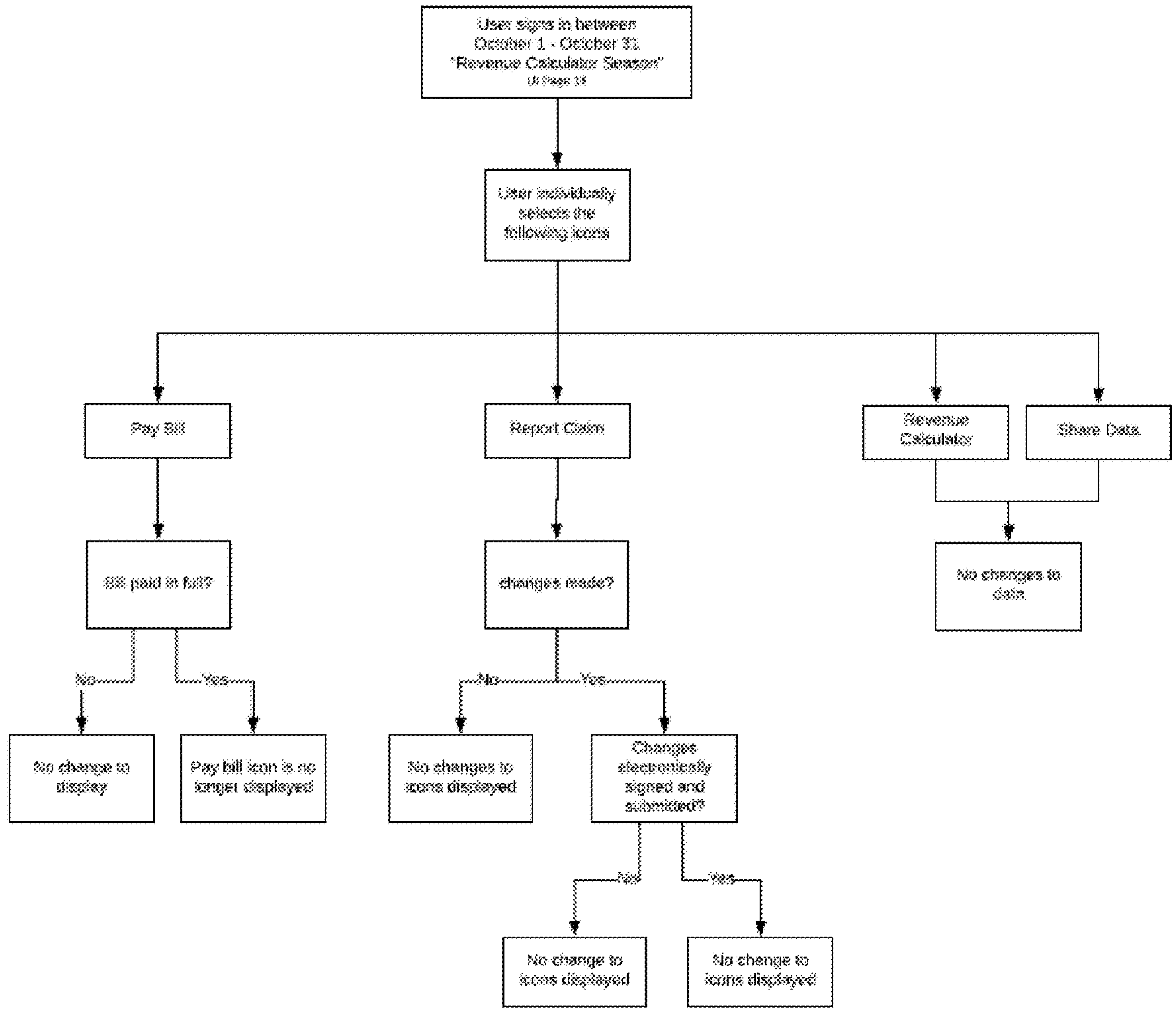

Referring specifically to FIGS. 23-24, embedded windows 330 and 332 are presented. In embodiments, a user can work in either screen without having to close the base transparency layer first. For example, if a user selects report yields icon 332, referring to embedded window 332 is presented within the transparency layer of the original window. The user can then work in the embedded window while simultaneously inputting prices on the revenue calculator.

In various embodiments, based on data from, for example, task engine 202, icons and their associated particular functionality is not displayed when the portion of the task related to that icon or display is not applicable to the timing, location, or has already been completed. In embodiments, "hidden data" can be deleted from memory to create more efficient storage.

Referring to FIGS. 25-41, flowcharts of dynamically-guided presentation corresponding to the user interfaces of FIGS. 4-24 for a system for dynamic agriculture data processing are depicted, according to embodiments. In embodiments, the Main Server database can correspond to local database 106*a* as illustrated in FIG. 2A. In embodiments, the AIP database and FSA/ACRSI databases can correspond to industry databases 106*b* and 106*c* as illustrated in FIG. 2A. Likewise, the operation illustrated in the flowcharts of FIGS. 25-41 can be executed by dynamically-guided presentation subsystem 200, including task engine 202, timing engine 204, location engine 206, data integration engine 208, and/or display engine 210.

Referring to FIGS. 42-59, flowcharts of algorithms for interface operation of FIGS. 4-24 in dynamically-guided presentation for a system for dynamic agriculture data processing are depicted, according to embodiments. In embodiments, the algorithms of FIGS. 42-59 can be executed by dynamically-guided presentation subsystem 200, including task engine 202, timing engine 204, location engine 206, data integration engine 208, and/or display engine 210.

In embodiments, as illustrated, portions of certain tasks can be pre-defined such that they can include P13 data. In embodiments, other tasks are customized to the individual farmer user (and are not addressed in P13). System flow is designed to present specific questions each season, and input from the user based on those questions then determines how the system responds. The way a user answers will determine if there are other questions to present or if the system can move onto the next task. When the questions are sufficiently answered, the user is routed to the next step, which is predefined. Accordingly, embodiments are customized to each user. Put another way, set questions are presented regardless of where the user farms, and other questions are presented based on the farmer user location and how the farmer user answers the previously-presented questions.

Referring to FIGS. 60-76, state machine diagrams for interface operation of FIGS. 4-24 in dynamically-guided presentation for a system for dynamic agriculture data processing are depicted according to embodiments. The state machines read left-to-right. In embodiments, the left-most node is the highest priority for the timeframe for that particular UI page. However, users can complete an action on the right sub-state machine and return to complete the primary node state machine at a later time.

Figure 60:
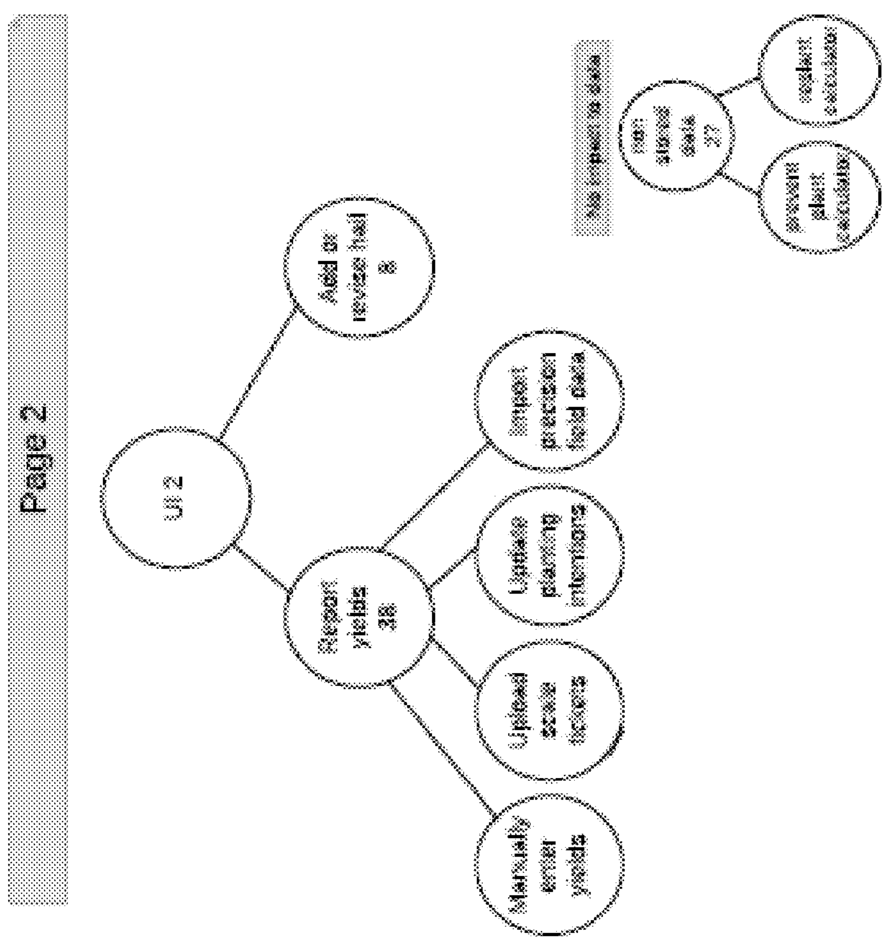
FIGS. 60-76 are state machine diagrams for interface operation of FIGS. 4-24 in dynamically-guided presentation for a system for dynamic agriculture data processing, according to embodiments.

Referring specifically to FIG. 60, an example user sign-in date is determined to be March 17. The state machine operates according to the following pseudo code:

```
IF action 38 is submitted and action 8 is null, action 38 is sent to server and AIP, THEN display UI 3
    ELSE
IF action 38 is null and action 8 is submitted, action 8 is sent to server and AIP, THEN display UI 2
    ELSE
IF actions 38 and 8 are submitted, actions 38 and 8 are sent to server and AIP, THEN display UI 3
    ELSE
IF action 38 is entered but not submitted and action 8 is null, action 38 is sent to server, THEN
Display UI 2
    ELSE
IF action 38 is null and action 8 is entered but not submitted, action 8 is sent to server, THEN
display UI 2
    ELSE
IF actions 38 and 8 are entered but not submitted, actions 38 and 8 are sent to server, THEN display UI 2
    ELSE
IF action 38 is submitted and action 8 is entered but not submitted, action 38 is sent to server and AIP and
action 8 is sent to server, THEN display UI 3
    ELSE
IF action 38 is entered but not submitted and action 8 is submitted, action 38 is sent to server and action
8 is sent to server and AIP, THEN display UI 2
    ELSE
IF actions 38 and 8 are null, THEN display UI 2
END IF
Action 27 has no impact to data being submitted or stored
```

Figure 61:
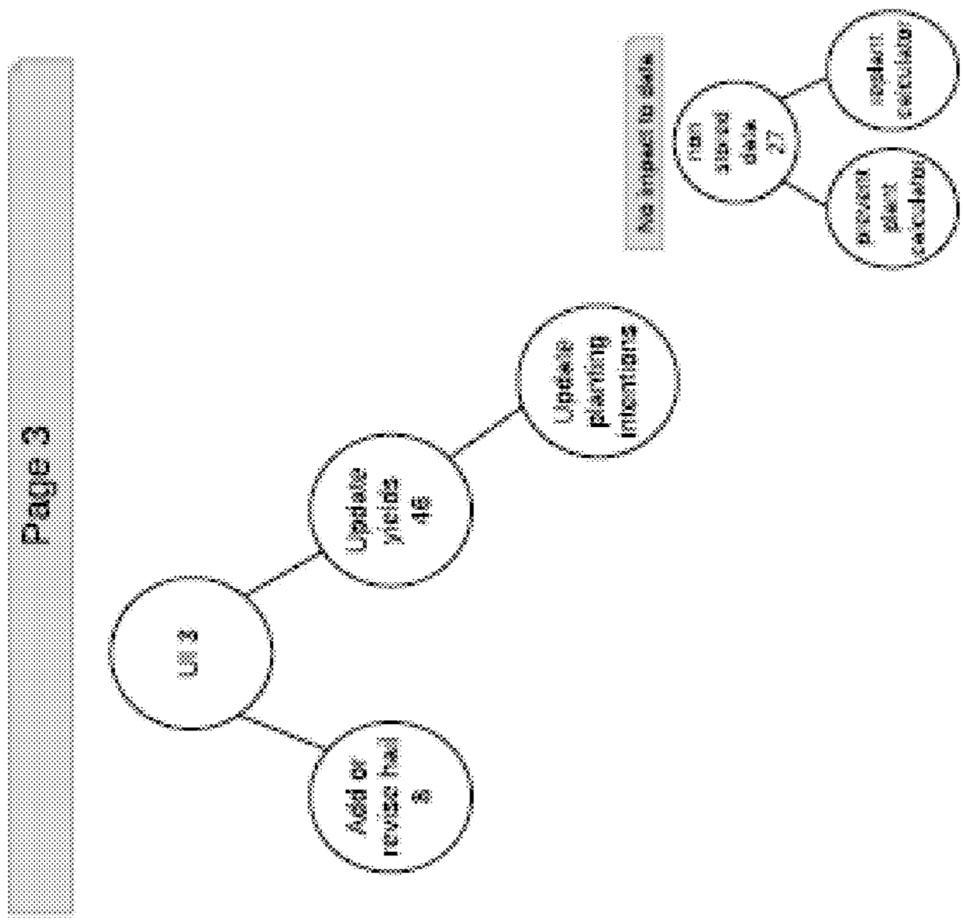

Referring specifically to FIG. 61, an example user sign-in date is determined to be March 17. The state machine operates according to the following pseudo code:

```
IF action 8 is submitted and action 46 is null, action 8 is sent to server and AIP, THEN display UI 3
    ELSE
IF action 8 Is null and action 46 is submitted, action 46 is sent to server and AIP, THEN display UI 3
    ELSE
IF actions 8 and 46 are submitted, actions 8 and 46 are sent to server and AIP, THEN display UI 3
    ELSE
IF action 8 is entered but not submitted and action 46 is null, action 8 is sent to server, THEN Display UI 3
    ELSE
IF action 8 is null and action 46 is entered but not submitted, action 46 is sent to server, THEN display UI 3
    ELSE
IF actions 8 and 46 are entered but not submitted, actions 8 and 46 are sent to server, THEN display UI 3
    ELSE
IF action 8 is submitted and action 46 is entered but not submitted, action 8 is sent to server and AIP and
action 46 is sent to server, THEN display UI 3
    ELSE
IF action 8 is entered but not submitted and action 46 is submitted, action 8 is sent to server and action
46 is sent to server and AIP, THEN display UI 3
    ELSE
IF actions 8 and 46 are null, THEN display UI 3
END IF
Action 27 has no impact to data being submitted or stored
```

Figure 62:
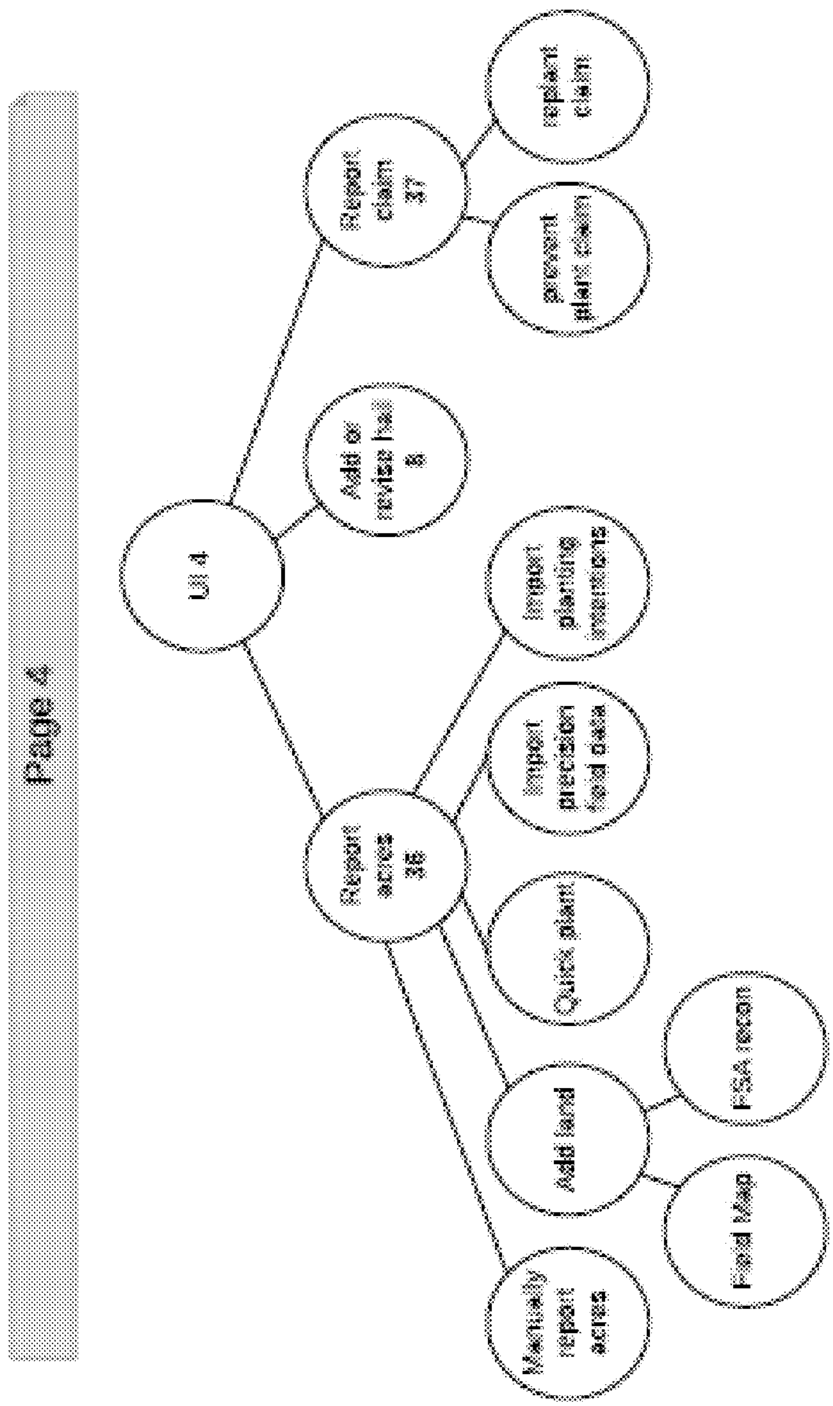

Referring specifically to FIG. 62, an example user sign-in date is determined to be June 12. The state machine operates according to the following pseudo code:

```
IF action 36 is submitted and actions 8 and 37 are null, action 36 is sent to server and AIP, THEN display UI
5
    ELSE
IF actions 36 and 8 are submitted and action 37 is null, actions 36 and 8 are sent to server and AIP, THEN
display UI 5
    ELSE
IF actions 36, 37 and 8 are submitted, actions 36, 8 and 37 are sent to server and AIP, THEN display UI 5
    ELSE
IF actions 36 and 8 are null and action 37 is submitted, action 37 is sent to server and AIP, THEN display UI
4
    ELSE
IF action 36 is null and actions 8 and 37 are submitted, actions 8 and 37 are sent to server and AIP, THEN
display UI 4
    ELSE
IF actions 36 and 37 are null and action 8 is submitted, action 8 is sent to server and AIP, THEN display UI 4
    ELSE
```

-continued

```
IF action 36 is entered but not submitted and actions 37 and 8 are null, action 36 is sent to server, THEN
display UI 4
    ELSE
IF actions 36 and 37 are null and action 8 is entered but not submitted, action 8 is sent to server, THEN
display UI 4
    ELSE
IF actions 36 and 8 are entered but not submitted, and action 37 is null, actions 36 and 8 are sent to
server, THEN display UI 4
    ELSE
IF actions 36 and 37 are entered but not submitted, and action 8 is null, actions 36 and 37 are sent to
server, THEN display UI 4
    ELSE
IF action 36 is submitted and actions 37 and 8 are entered but not submitted, action 36 is sent to server
and AIP and actions 37 and 8 are sent to server, THEN display UI 5
    ELSE
IF action 36 is entered but not submitted and actions 37 and 8 are submitted, action 36 is sent to server
and actions 37 and 8 are sent to server and AIP, THEN display UI 4
    ELSE
IF action 36 is submitted and action 37 has been entered and not submitted and action 8 is null, action 36
is sent to server and AIP and action 37 is sent to server, THEN display UI 5
    ELSE
IF actions 36 and 37 are submitted and action 8 has been entered but not submitted, actions 36 and 37
are sent to server and AIP and action 8 is sent to server, THEN display UI 5
    ELSE
IF actions 36, 37 and 8 are null, THEN display UI 4
END IF
```

Figure 63:
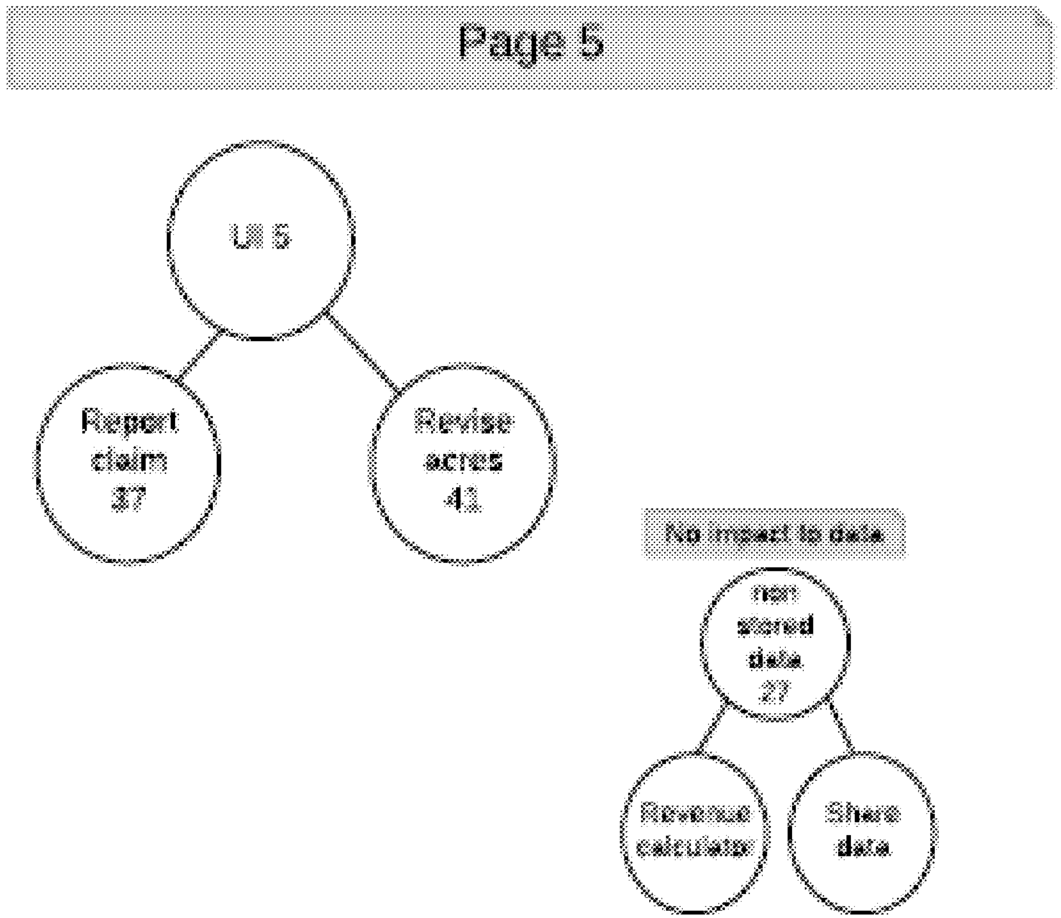

Referring specifically to FIG. 63, an example user sign-in date is determined to be July 1. The state machine operates according to the following pseudo code:

```
IF action 37 is submitted and action 41 is null, action 37 is sent to server and AIP, THEN display UI 5
    ELSE
IF action 37 is null and action 41 is submitted, action 41 is sent to server and AIP, THEN display UI 5
    ELSE
IF actions 37 and 41 are submitted, actions 37 and 41 are sent to server and AIP, THEN display UI 5
    ELSE
IF action 37 is entered but not submitted and action 41 is null, action 37 is sent to server, THEN display UI
5
    ELSE
IF action 37 is null and action 41 is entered but not submitted, action 41 is sent to server, THEN display UI
5
    ELSE
IF actions 37 and 41 are entered but not submitted, actions 37 and 41 are sent to server, THEN display UI
5
    ELSE
IF action 37 is submitted and action 41 is entered but not submitted, action 37 is sent to server and AIP
and action 41 is sent to server, THEN display UI 5
    ELSE
IF action 37 is entered but not submitted and action 41 is submitted, action 37 is sent to server and action
41 is sent to server and AIP, THEN display UI 5
    ELSE
IF actions 37 and 41 are null, THEN display UI 5
END IF
Action 27 has no impact to data being submitted or stored
```

Figure 64:
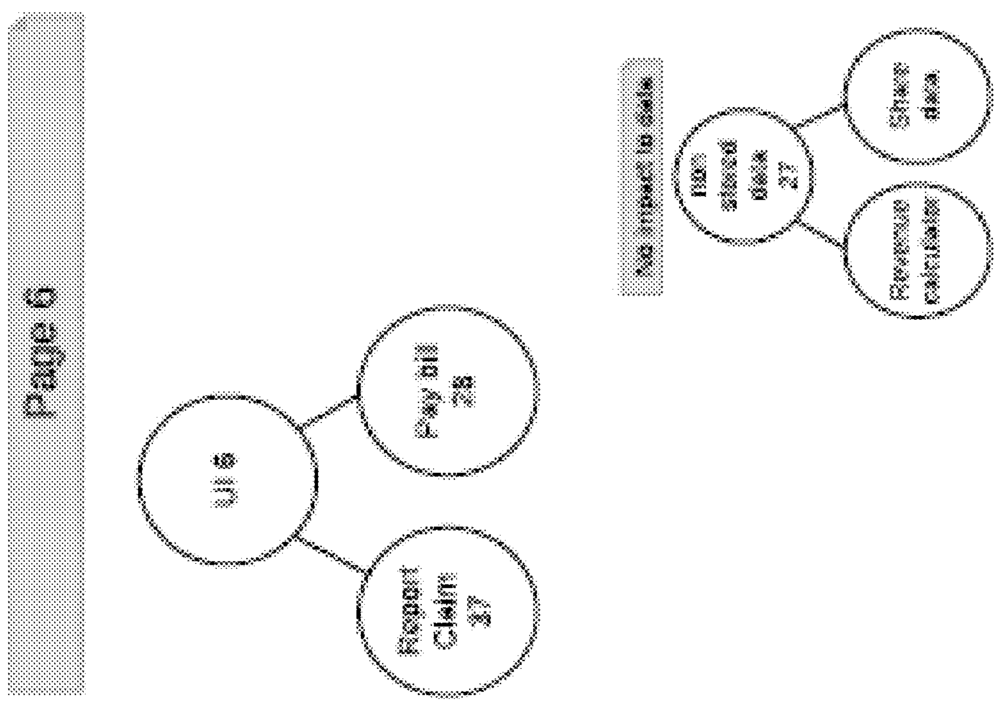

Referring specifically to FIG. 64, an example user sign-in date is determined to be August 1. The state machine operates according to the following pseudo code:

```
IF action 37 is submitted and action 28 is null, action 37 is sent to server and AIP, THEN display UI 6
    ELSE
IF action 37 is null and action 28 is submitted, action 28 is sent to server and AIP, THEN display UI 18
    ELSE
IF actions 37 and 28 are submitted, actions 37 and 28 are sent to server and AIP, THEN display UI 18
    ELSE
IF action 37 is entered but not submitted and action 28 is null, action 37 is sent to server, THEN display UI
6
    ELSE
IF actions 37 and 28 are null, THEN display UI 6
END IF
Action 27 has no impact to data being submitted or stored
```

Figure 65:
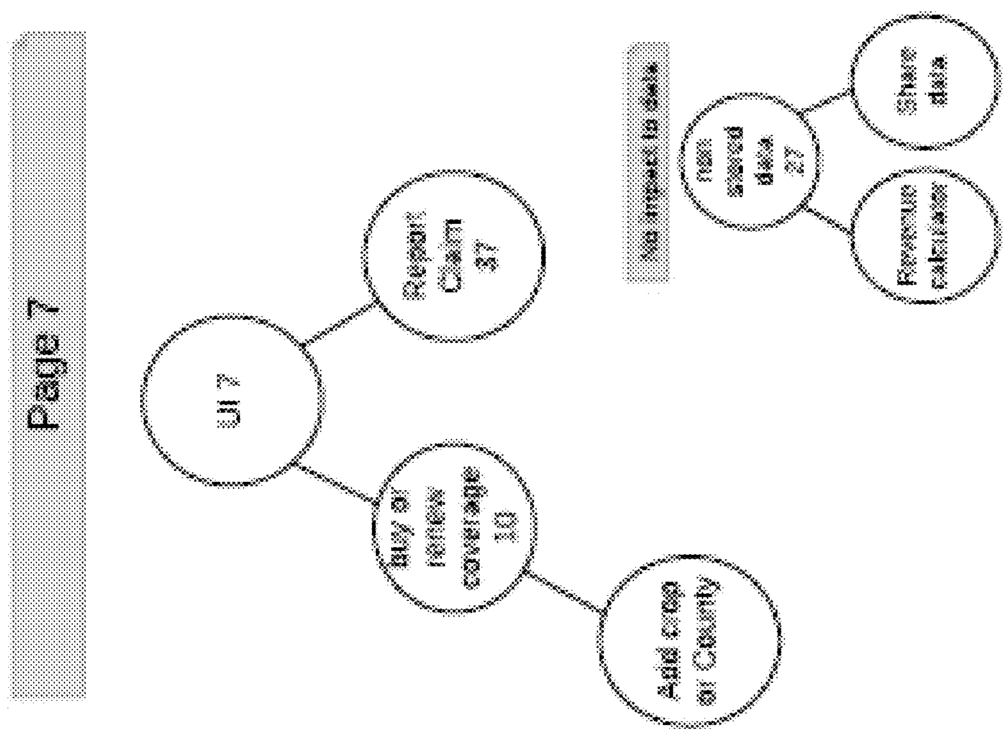

Referring specifically to FIG. 65, an example user sign-in date is determined to be August 20. The state machine operates according to the following pseudo code:

```
IF action 10 is submitted and action 37 is null, action 10 is sent to server and AIP, THEN display UI 7
    ELSE
IF action 10 is null and action 37 is submitted, action 37 is sent to server and AIP, THEN display UI 7
    ELSE
IF actions 10 and 37 are submitted, actions 10 and 37 are sent to server and AIP, THEN display UI 7
    ELSE
IF action 10 is entered but not submitted and action 37 is null, action 10 is sent to server, THEN display UI
7
    ELSE
IF action 10 is null and action 37 is entered but not submitted, action 37 is sent to server, THEN display UI
7
    ELSE
IF actions 10 and 37 are entered but not submitted, actions 10 and 37 are sent to server, THEN display UI
    ELSE
IF action 10 is submitted and action 37 is entered but not submitted, action 10 is sent to server and AIP
and action 37 is sent to server, THEN display UI 7
    ELSE
IF action 10 is entered but not submitted and action 37 is submitted, action 10 is sent to server and action
37 is sent to server and AIP, THEN display UI 7
    ELSE
IF actions 10 and 37 are null, THEN display UI 7
END IF
Action 27 has no impact to data being submitted or stored
```

Figure 66:
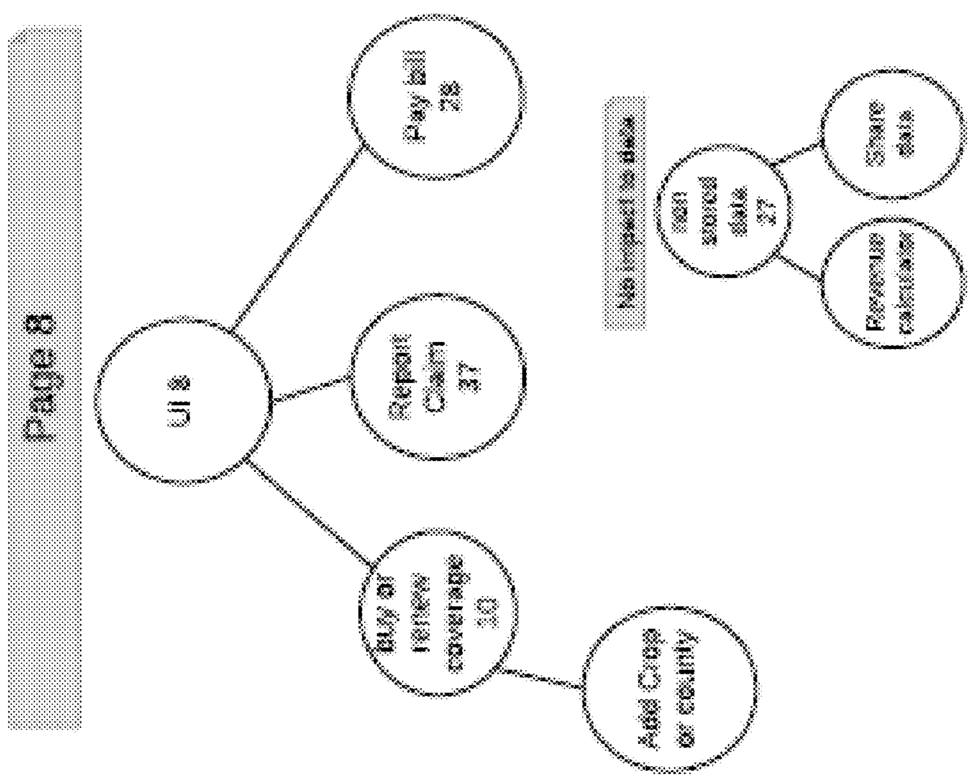

Referring specifically to FIG. 66, an example user sign-in date is determined to be August 20. The state machine operates according to the following pseudo code:

```
IF action 10 is submitted and actions 37 and 28 are null, action 10 is sent to server and AIP, THEN display
UI 8
    ELSE
IF actions 10 and 37 are submitted and action 28 is null, actions 10 and 37 are sent to server and AIP,
THEN display UI 8
    ELSE
IF actions 10, 37 and 28 are submitted, actions 10, 37 and 28 are sent to server and AIP, THEN display UI 7
    ELSE
IF actions 10 and 28 are null and action 37 is submitted, action 37 is sent to server and AIP, THEN display
UI 8
    ELSE
IF action 10 is null and action 37 is entered but not submitted, action 37 is sent to server, THEN display UI
8
    ELSE
IF actions 10 and 37 are entered but not submitted, actions 10 and 37 are sent to server, THEN display UI
8
    ELSE
IF actions 10, 37 and 28 are null, THEN display UI 8
    ELSE
IF action 10 is submitted and action 37 is entered but not submitted, action 10 is sent to server and AIP
and action 37 is sent to server, THEN display UI 8
    ELSE
IF action 10 is entered but not submitted and actions 37 and 28 are submitted, action 10 is sent to server
and actions 37 and 28 are sent to server and AIP, THEN display UI 7
    ELSE
IF actions 10 and 37 are null and 28 is submitted, THEN display UI 7
END IF
Action 27 has no impact to data being submitted or stored
```

Figure 67:
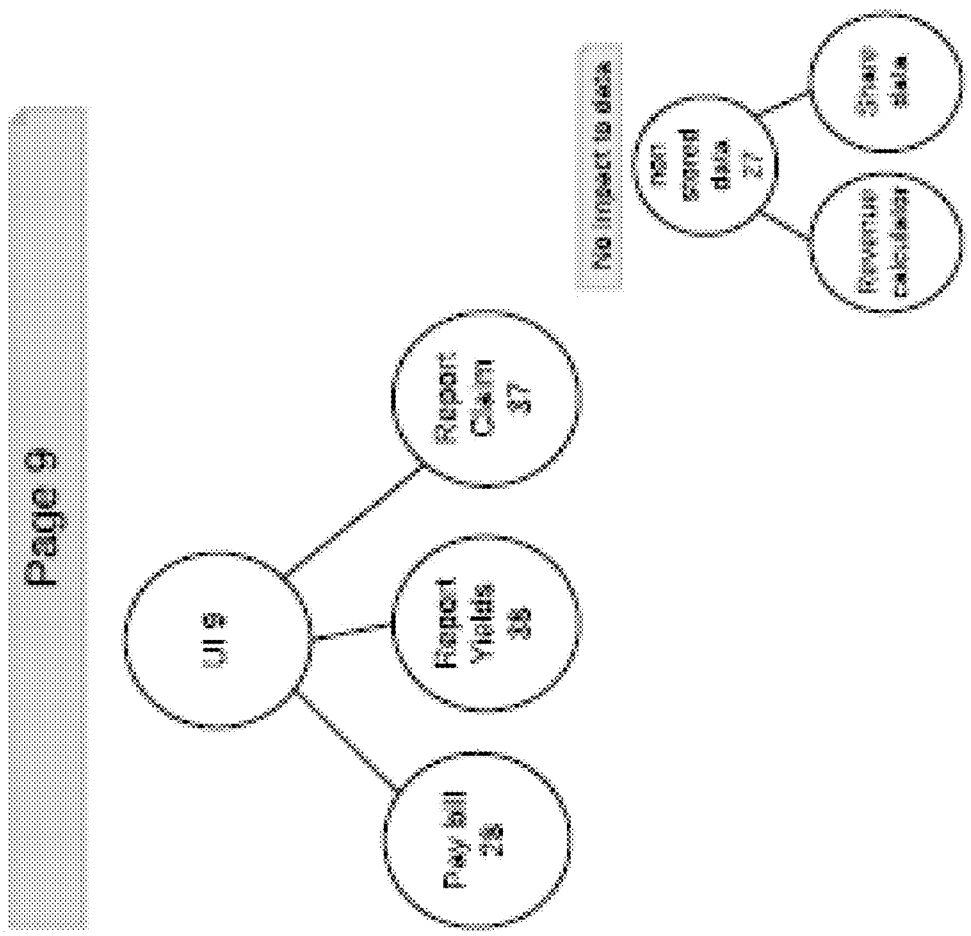

Referring specifically to FIG. 67, an example user sign-in date is determined to be October 15. The state machine operates according to the following pseudo code:

```
IF action 28 is submitted and actions 37 and 38 are null, action 28 is sent to server and AIP, THEN
display UI 10
    ELSE
IF actions 28 and 37 are submitted and action 38 is null, actions 28 and 37 are sent to server and AIP,
THEN display UI 10
IF actions 28, 37 and 38 have been submitted, actions 28, 37and 38 are sent to server and AIP, THEN
display UI 11
    ELSE
```

-continued

```
IF action 28 is null and actions 37 and 38 are submitted, action 37 and 38 are sent to server and AIP,
THEN display UI 18
    ELSE
IF actions 28 and 37 are null and action 38 is submitted, action 38 is sent to server and AIP,
THEN display UI 18
    ELSE
IF action 38 entered but not submitted and actions 28 and 37 are null, action 38 is sent to server, THEN
display UI 9
    ELSE
IF action 28 is null and actions 37 and 38 are entered but not submitted, action 37 and 38 are sent to
server, THEN display UI 9
    ELSE
IF action 28 is submitted and actions 37 and 38 are entered but not submitted, action 28 is sent to server
and AIP and actions 37 and 38 are sent to server, THEN display UI 10
    ELSE
IF action 28 is null and action 37 is entered but not submitted and action 38 is submitted, action 37 is
sent to server and action 38 is sent to server and AIP, THEN display UI 18
    ELSE
IF actions 28, 37 and 38 are null, THEN display UI 9
    END IF
Action 27 has no impact to data being submitted or stored
```

Figure 68:
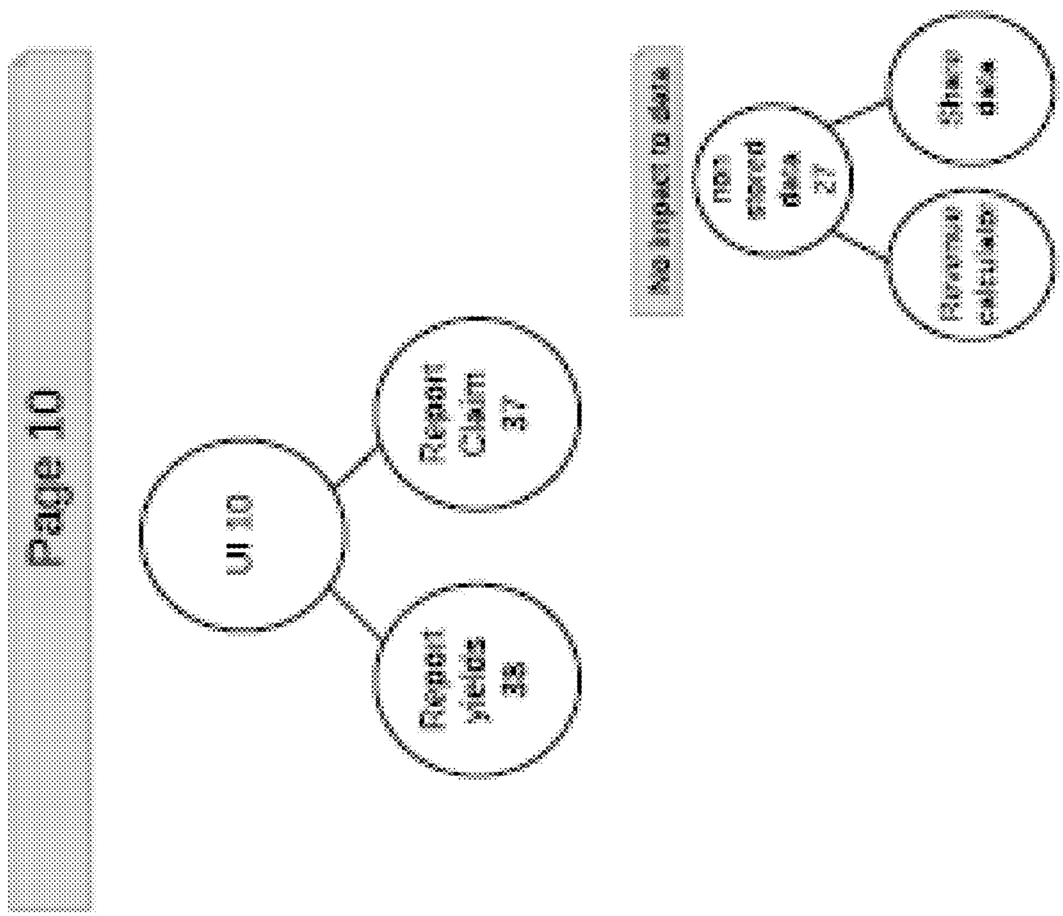

Referring specifically to FIG. 68, an example user sign-in date is determined to be October 15. The state machine operates according to the following pseudo code:

```
IF action 38 is submitted and action 37 is null, action 38 is sent to server and AIP, THEN display UI 11
    ELSE
IF action 38 is null and action 37is submitted, action 37is sent to server and AIP, THEN display UI 10
    ELSE
IF actions 38 and 37 are submitted, actions 37 and 38 are sent to server and AIP, THEN display UI 11
    ELSE
IF action 38 is entered but not submitted and action 37 is null, action 38 is sent to server, THEN display UI
10
    ELSE
IF action 38 is null and action 37 is entered but not submitted, action 37 is sent to server, THEN display UI
10
    ELSE
IF actions 38 and 37 are entered but not submitted, actions 38 and 37 are sent to server, THEN display UI
10
    ELSE
IF action 38 is submitted and action 37 is entered but not submitted, action 38 is sent to server and AIP
and action 37 is sent to server, THEN display UI 11
    ELSE
IF action 38 is entered but not submitted and actions 37 is submitted, action 38 is sent to server and
action 37 is sent to server and AIP, THEN display UI 10
    ELSE
IF actions 38 and 37 are null, THEN display UI 10
END IF
Action 27 has no impact to data being submitted or stored
```

Figure 69:
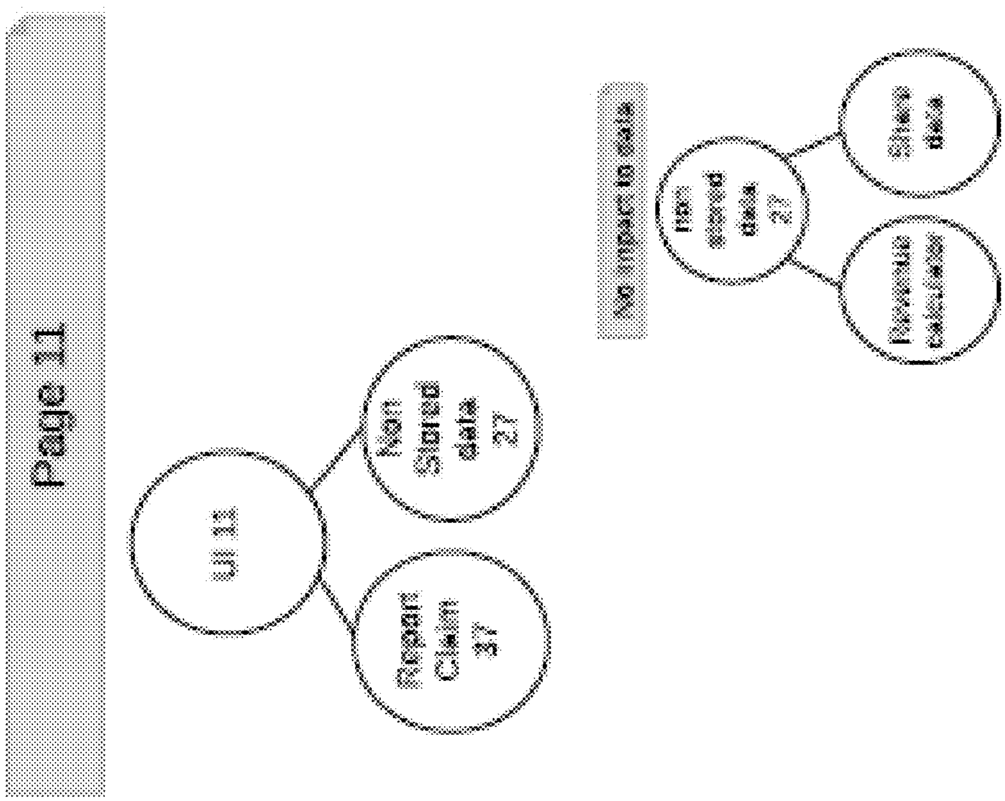

Referring specifically to FIG. 69, an example user sign-in date is determined to be October 15. The state machine operates according to the following pseudo code:

```
IF action 37 is submitted, action 37 is sent to server and AIP, THEN display UI 11
    ELSE
IF action 37 is entered but not submitted, action 37 is sent to server, THEN display
UI 11
    ELSE
IF actions 37 is null, THEN display UI 11
END IF
Action 27 has no impact to data being submitted or stored
```

Figure 70:
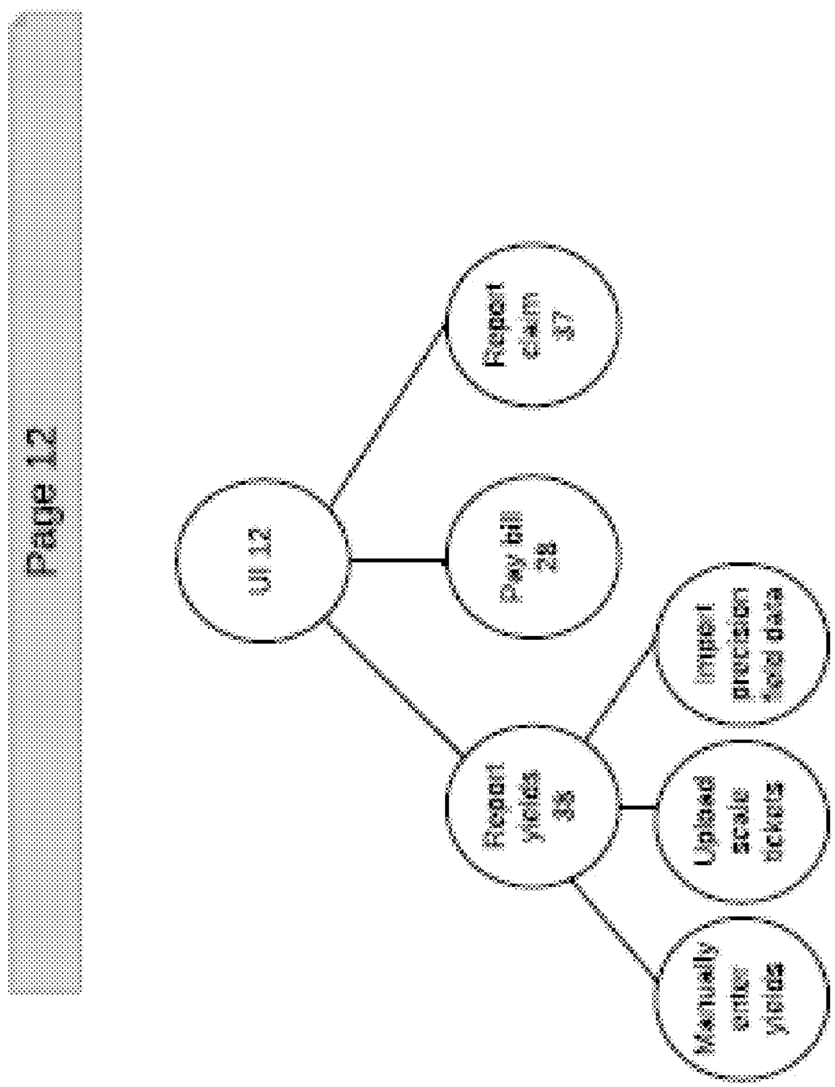

Referring specifically to FIG. 70, an example user sign-in date is determined to be November 2. The state machine operates according to the following pseudo code:

```
IF action 38 is submitted and actions 28 and 37 are null, action 38 is sent to server and AIP, THEN display
UI 16
    ELSE
IF actions 38 and 37 are submitted and action 28 is null, actions 38 and 37 are sent to server and AIP,
THEN display UI 16
    ELSE
IF actions 38, 28 and 37 are submitted, actions 38, 28 and 37 are sent to server and AIP, THEN display UI
14
    ELSE
IF actions 38 and 28 are null and action 37 is submitted, action 37 is sent to server and AIP, THEN display
UI 12
    ELSE
IF action 38 is null and action 37 is entered but not submitted, action 37 is sent to server, THEN display UI
12
    ELSE
IF actions 38 and 37 are entered but not submitted, actions 38 and 37 are sent to server, THEN display UI
12
    ELSE
IF actions 38, 28 and 37 are null, THEN display UI 12
    ELSE
IF action 38 is submitted and action 37 is entered but not submitted, action 38 is sent to server and AIP
and action 37 is sent to server, THEN display UI 16
    ELSE
IF action 38 is entered but not submitted and actions 28 and 37 are submitted, action 38 is sent to server
and actions 28 and 37 are sent to server and AIP, THEN display UI 12
    ELSE
IF actions 38 and 37 are null and 28 is submitted, THEN display UI 12
END IF
```

Figure 71:
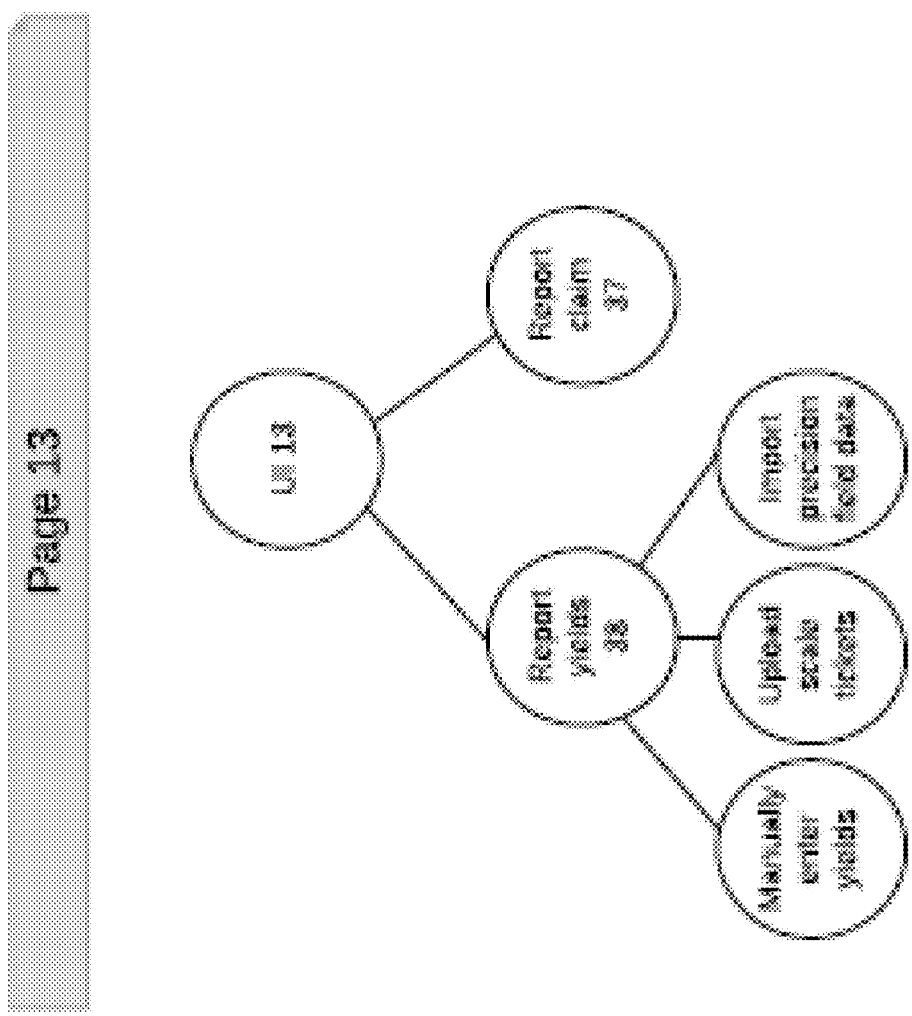

Referring specifically to FIG. 71, an example user sign-in date is determined to be November 2. The state machine operates according to the following pseudo code:

```
IF action 38 is submitted and action 37 is null, action 38 is sent to server and AIP, THEN display UI 14
    ELSE
IF action 38 is null and action 37 is submitted, action 37 is sent to server and AIP, THEN display UI 13
    ELSE
IF actions 38 and 37 is submitted, actions 38 and 37 are sent to server and AIP, THEN display UI 14
    ELSE
IF action 38 is entered but not submitted and action 37 is null, action 38 is sent to server, THEN display UI
13
    ELSE
IF action 38 is null and action 37 is entered but not submitted, action 37 is sent to server, THEN display UI
13
    ELSE
IF actions 38 and 37 have been entered but not submitted, actions 38 and 37 are sent to server, THEN
display UI 13
    ELSE
IF actions 38 and 37 are null, THEN display UI 13
END IF
```

Figure 72:
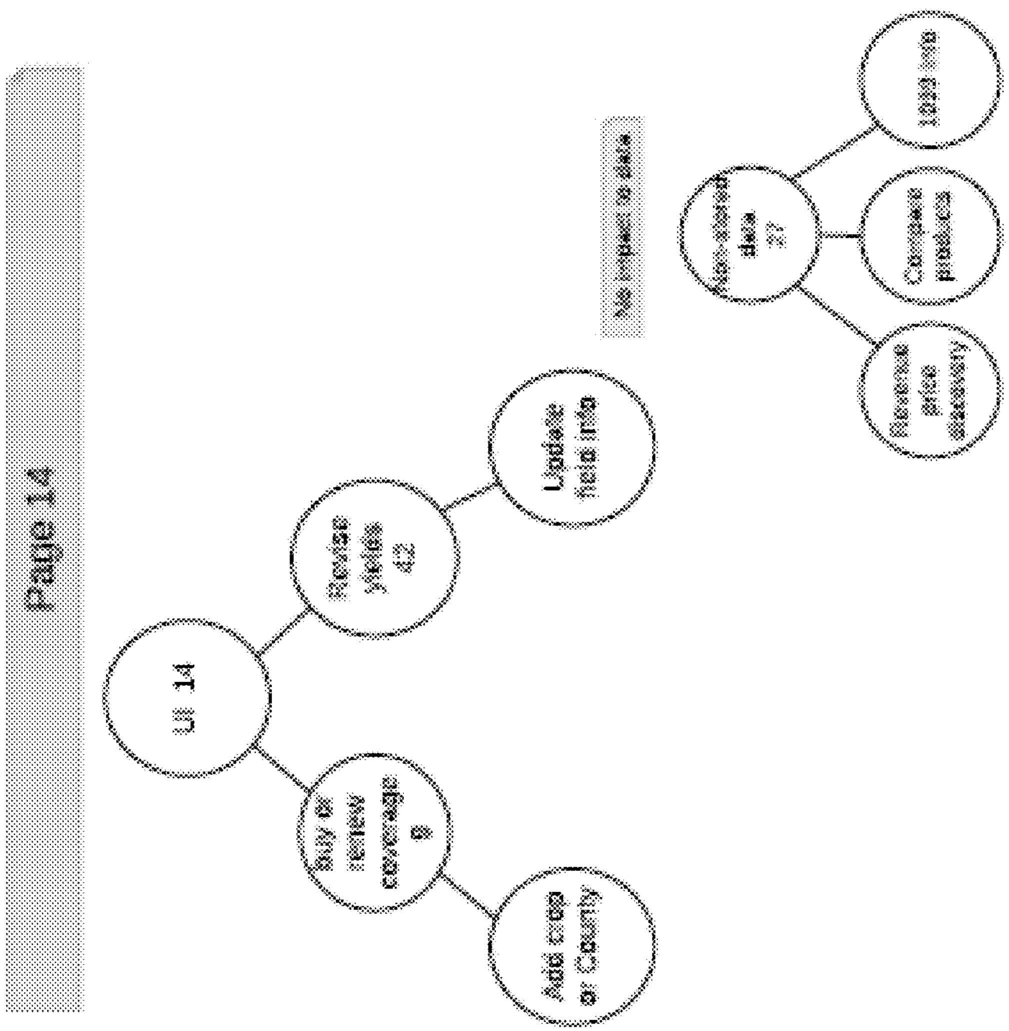

Referring specifically to FIG. 72, an example user sign-in date is determined to be December 17. The state machine operates according to the following pseudo code:

```
IF action 9 is submitted and action 42 is null, action 9 is sent to server and AIP, THEN display UI 14
    ELSE
IF action 9 is null and action 42 is submitted, action 42 is sent to server and AIP, THEN display UI 14
    ELSE
IF actions 9 and 42 are submitted, actions 9 and 42 are sent to server and AIP, THEN display UI 14
    ELSE
IF action 9 is entered but not submitted, and action 42 is null, action 9 is sent to server, THEN display UI
14
    ELSE
IF action 9 is null and action 42 has been entered but not submitted, action 42 is sent to server, THEN
display UI 14
    ELSE
```

-continued

```
IF actions 9 and 42 are entered but not submitted, actions 9 and 42 are sent to server, THEN display
UI 14
    ELSE
IF actions 9 and 42 are null, THEN display UI 14
END IF
Action 27 has no impact to data being submitted or stored
```

Figure 73:
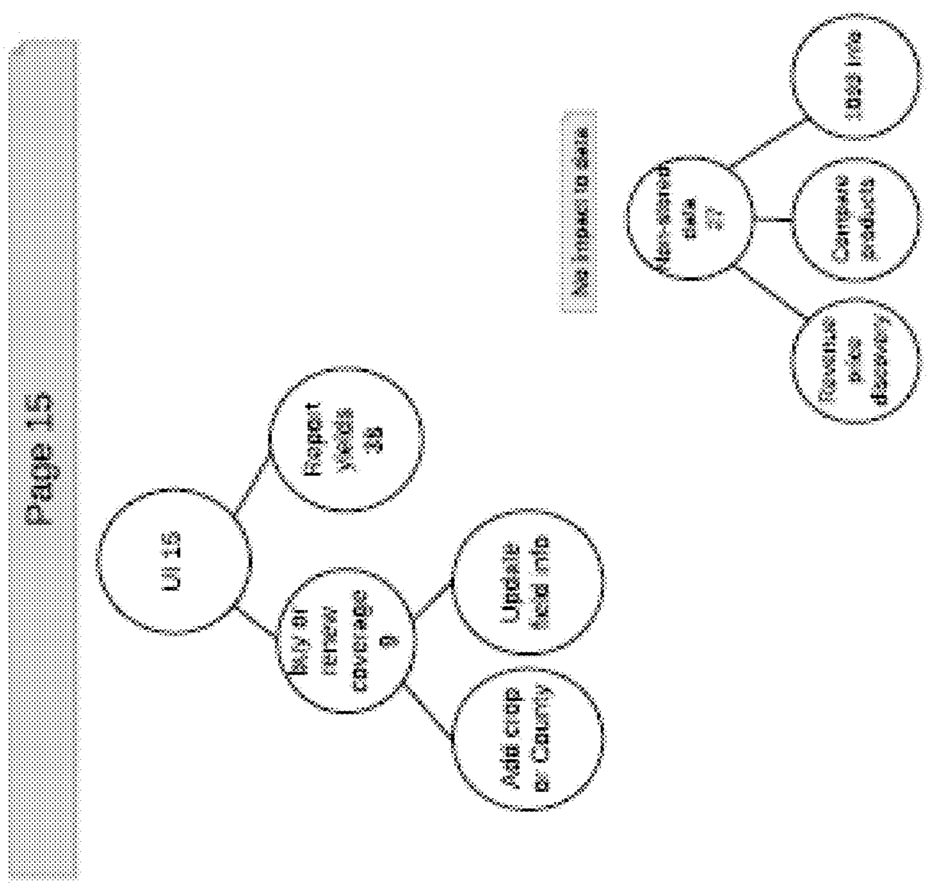

Referring specifically to FIG. 73, an example user sign-in date is determined to be December 17. The state machine operates according to the following pseudo code:

```
IF action 9 is submitted and action 38 is null, action 9 is sent to server and AIP, THEN display UI 15
    ELSE
IF action 9 is null and action 38 is submitted, action 38 is sent to server and AIP, THEN display UI
14
    ELSE
IF actions 9 and 38 are submitted, actions 9 and 38 are sent to server and AIP, THEN display UI 14
    ELSE
IF action 9 is entered but not submitted and action 38 is null, action 9 is sent to server, THEN
display UI 15
    ELSE
IF action 9 is null and action 38 is entered but not submitted, action 38 is sent to server, THEN
display UI 15
    ELSE
IF actions 9 and 38 are entered but not submitted, actions 9 and 38 are sent to server, THEN display
UI 15
    ELSE
IF actions 9 and 38 are null, THEN display UI 15
END IF
Action 27 has no impact to data being submitted or stored
```

Figure 74:
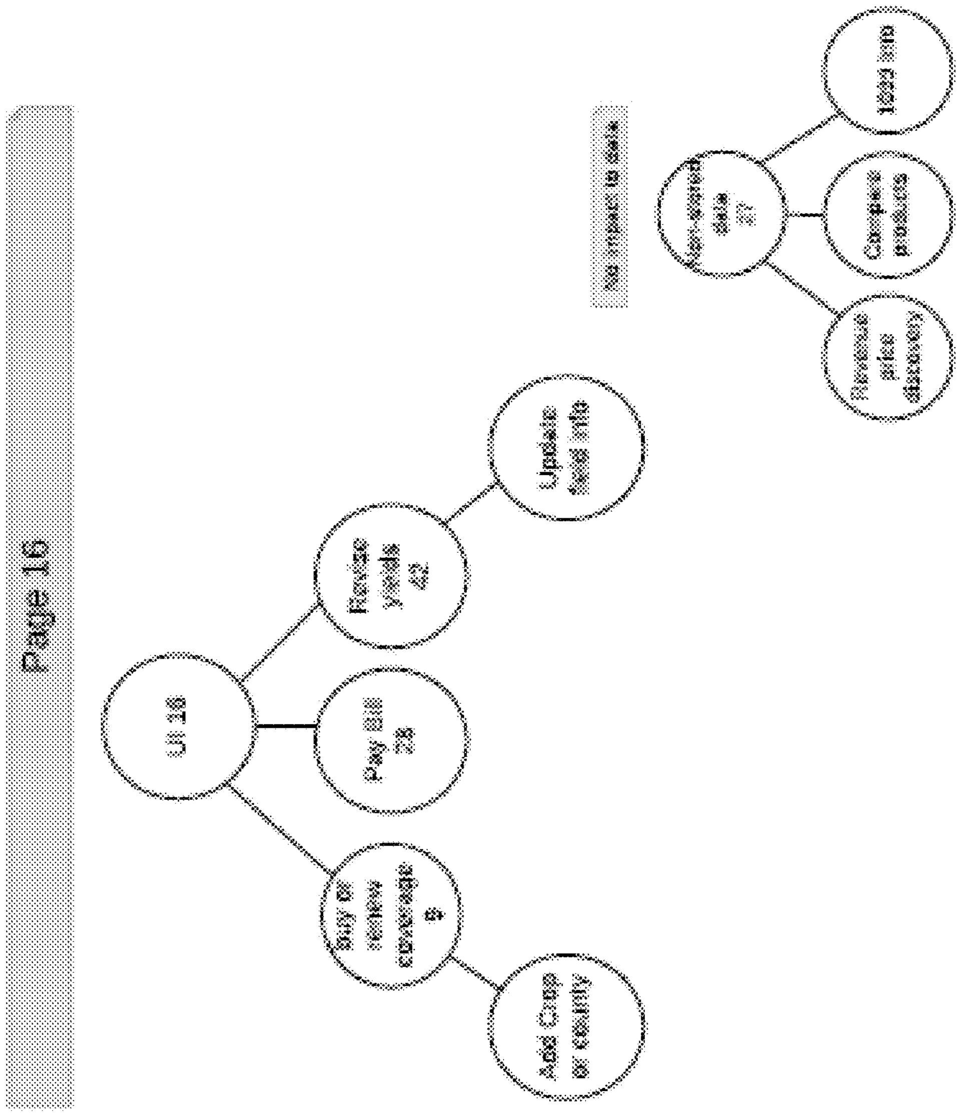

Referring specifically to FIG. 74, an example user sign-in date is determined to be December 17. The state machine operates according to the following pseudo code:

```
IF action 9 is submitted and actions 28 and 42 are null, action 9 is sent to server and AIP, THEN display
UI 16
    ELSE
IF actions 9 and 28 are submitted and action 42 is null, actions 9 and 28 are sent to server and AIP,
THEN display UI 14
    ELSE
IF actions 9, 28 and 42 are submitted, actions 9, 28 and 42 are sent to server and AIP, THEN display
UI 14
    ELSE
IF actions 9 and 28 are null and action 42 is submitted, action 42 is sent to server and AIP, THEN display
UI 16
    ELSE
IF action 9 is null and action 42 is entered but not submitted, action 42 is sent to server, THEN display
UI 16
    ELSE
IF actions 9 and 42 are entered but not submitted, actions 9 and 42 are sent to server, THEN display
UI 16
    ELSE
IF actions 9, 28 and 42 are null, THEN display UI 16
    ELSE
IF action 9 is submitted and action 42 is entered but not submitted, action 9 is sent to server and AIP and
action 42 is sent to server, THEN display UI 16
    ELSE
IF action 9 is entered but not submitted and actions 28 and 42 are submitted, action 9 is sent to server
and actions 28 and 42 are sent to server and AIP, THEN display UI 14
    ELSE
IF actions 9 and 42 are null and 28 is submitted, THEN display UI 14
END IF
Action 27 has no impact to data being submitted or stored
```

Figure 75:
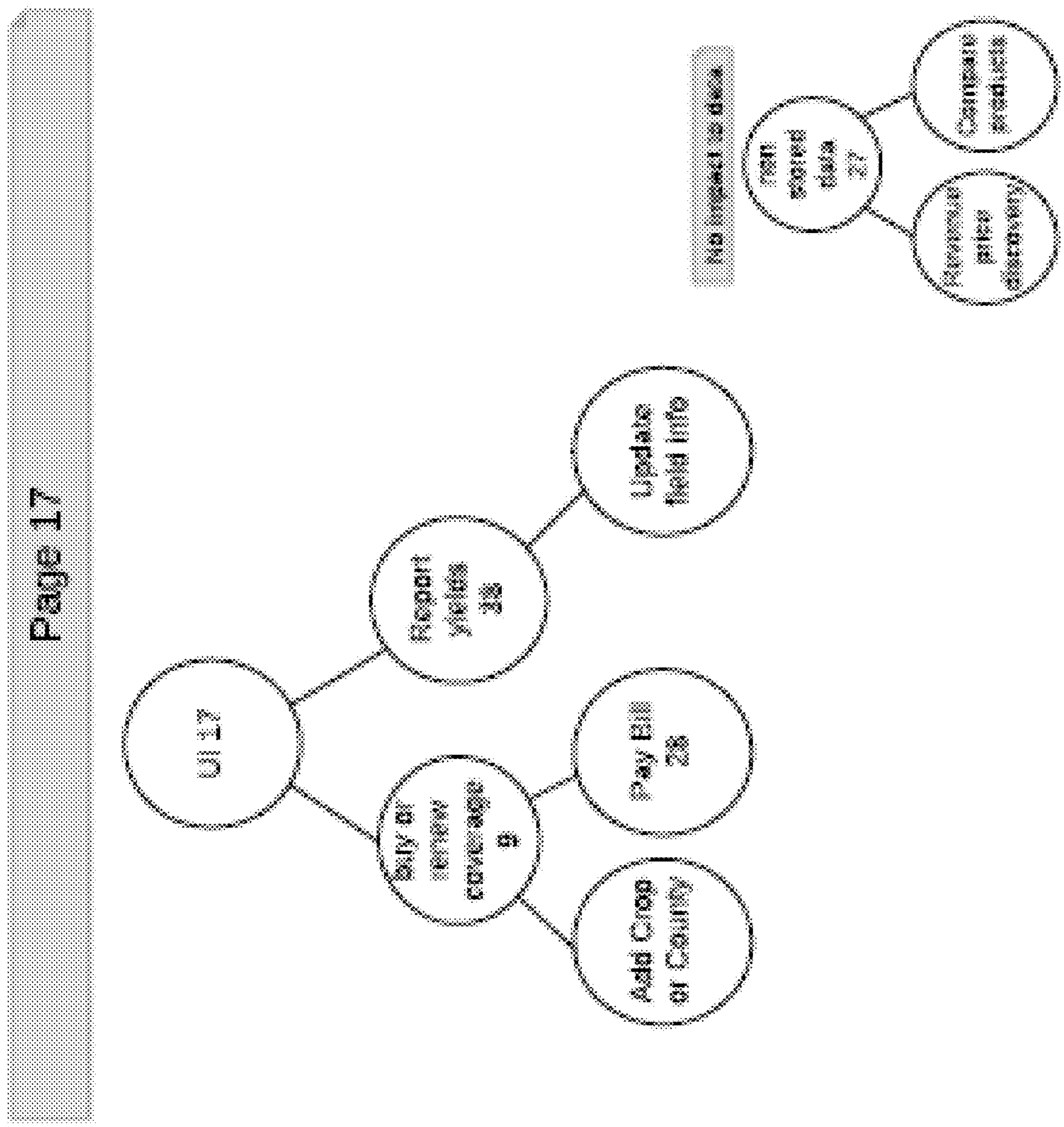

Referring specifically to FIG. 75, an example user sign-in date is determined to be December 17. The state machine operates according to the following pseudo code:

```
IF action 9 is submitted and actions 28 and 38 are null, action 9 is sent to server and AIP, THEN display UI
17
    ELSE
IF actions 9 and 28 are submitted and action 38 is null, actions 9 and 28 are sent to server and AIP, THEN
display UI 17
    ELSE
IF actions 9, 28 and 38 are submitted, actions 9, 28 and 38 are sent to server and AIP, THEN display UI 14
    ELSE
IF actions 9 and 28 are null and action 38 is submitted, action 38 is sent to server and AIP, THEN display
UI 16
    ELSE
IF action 9 is null and action 38 is entered but not submitted, action 38 is sent to server, THEN display UI
17
    ELSE
IF actions 9 and 38 are entered but not submitted, actions 9 and 38 are sent to server, THEN display UI 17
    ELSE
IF actions 9, 28 and 38 are null, THEN display UI 17
    ELSE
IF action 9 is submitted and action 38 is entered but not submitted, action 9 is sent to server and AIP and
action 38 is sent to server, THEN display UI 17
    ELSE
IF action 9 is entered but not submitted and action 38 is submitted, action 9 is sent to server and actions
38 is sent to server and AIP, THEN display UI 16
    ELSE
IF action 9 is entered but not submitted and actions 28 and 38 are submitted, action 9 is sent to server
and actions 28 and 38 are sent to server and AIP, THEN display UI 14
    ELSE
IF actions 9 and 38 are null and 28 is submitted, THEN display UI 15
END IF
Action 27 has no impact to data being submitted or stored
```

Figure 76:
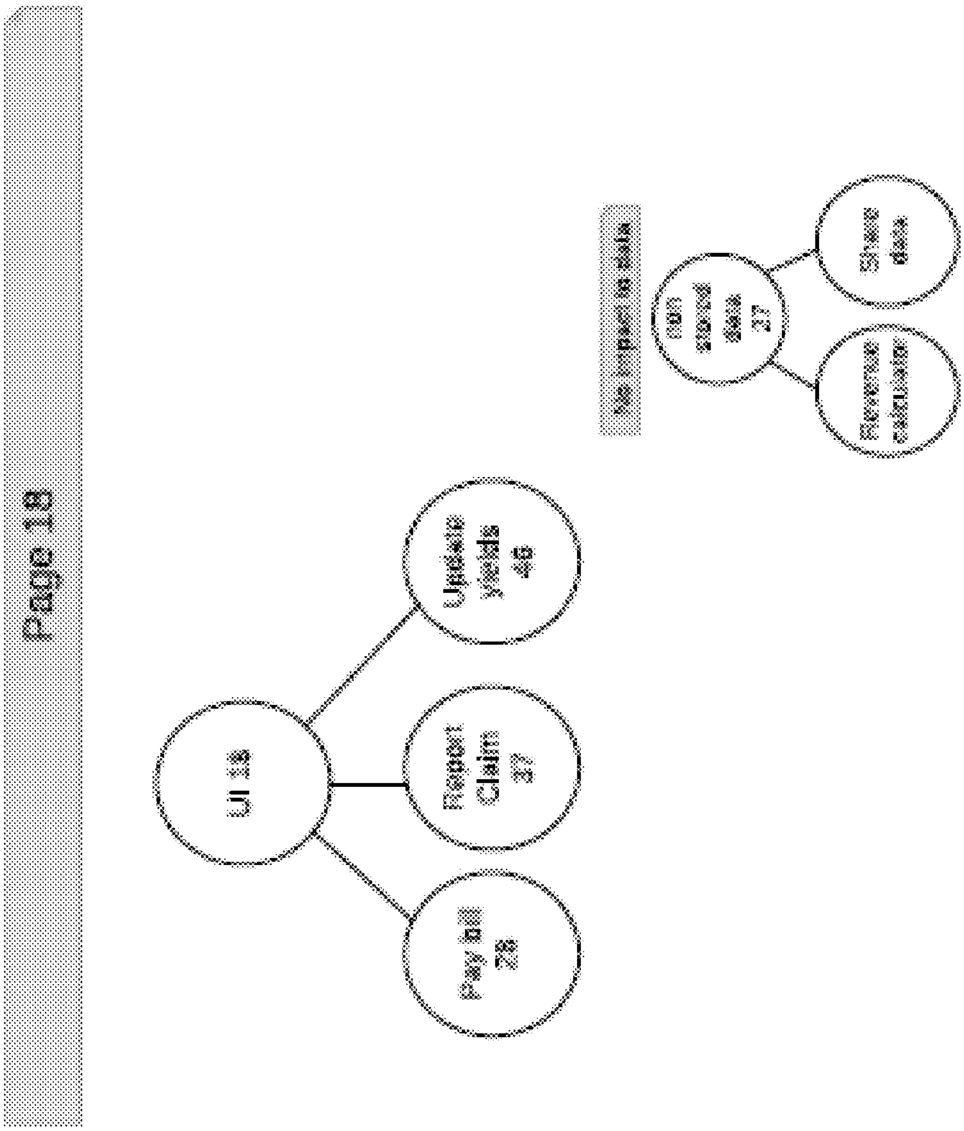

Referring specifically to FIG. 76, an example user sign-in date is determined to be October 15. The state machine operates according to the following pseudo code:

```
IF action 28 is submitted and actions 37 and 46 are null, action 28 is sent to server and AIP, THEN
display UI 11
    ELSE
IF actions 28 and 37 are submitted and action 46 is null, actions 28 and 37 are sent to server and AIP,
THEN display UI 11
    ELSE
IF actions 28 , 37 and 46 have been submitted, actions 28 , 37 and 46 are sent to server and AIP,
THEN display UI 11
    ELSE
IF action 28 is null and actions 37 and 46 are submitted, action 37 and 46 are sent to server and AIP,
THEN display UI 18
    ELSE
IF actions 28 and 37 are null and action 46 is submitted, action 46 is sent to server and AIP, THEN
display UI 18
    ELSE
IF action 28 is null and actions 37 and 46 are entered but not submitted, action 37 and 46 are sent to
server, THEN display UI 18
    ELSE
IF action 28 is submitted and actions 37 and 46 are entered but not submitted, action 28 is sent to
server
and AIP and actions 37 and 46 are sent to server, THEN display UI 11
    ELSE
IF action 28 is null and action 37 is entered but not submitted and action 46 is submitted, action 37 is
sent to server and action 46 is sent to server and AIP, THEN display UI 18
    ELSE
IF actions 28 , 37 and 46 are null, THEN display UI 18
END IF
Action 27 has no impact to data being submitted or stored
```

Accordingly, time-based displays are achieved. In an embodiment, during the time period of March 16-April 29, if yields aren't reported, the home screen displays lines to report yields. Yields can be reported by importing precision field data, uploading scale tickets, or manual entry. Further, the following options are also visible on the primary screen: view current coverage, update planting intentions, replant calculator, prevent plant calculator, and add or revise hail coverage. In an embodiment, once yields are reported, the following disappear: yield lines, import precision field data icon, and upload scale tickets icon. In an embodiment, if yields are reported, the home screen displays: current crop coverage and add or revise hail coverage. Icons are also displayed to update planting intentions, replant calculator, prevent plant calculator, and update/revise previously reported yields In an embodiment, during the time period of April 30-June 15, crop lines are displayed, making it easy to report acres. The following options also appear: quick plant, add or revise hail, import precision field data, FSA recon, import planting intentions, replant claim prevent plant calculator, add land, and field maps. In an embodiment, once acres have been reported, crop lines are replaced with a summary of planted acres by crop. The following icons (options) are then available: revise acres (available up to July 15), add or revise hail coverage, field maps, schedule of insurance, and APH.

In an embodiment, during the time period of June 15-July 15, crop lines are displayed, making it easy to report acres. The following options also appear: quick plant, add or revise hail, import precision field data, import FSA acres, report acres to FSA, import planting intentions, replant claim, prevent plant calculator, and field maps. The following icons (options) are also available: revise acres (available up to July 15), add or revise hail coverage, field maps, schedule of insurance, and APH.

In an embodiment, during the time period of July 15-August 15, a revenue calculator is displayed with the following options: pay bill, report claim, share data, and report yields.

In an embodiment, during the time period of August 15-September 30, fall renewal and a revenue calculator are displayed with the following options: report claim, share data, pay bill, and add fall crop.

In an embodiment, during the time period of October 1-October 31, a revenue calculator is displayed with the following options: report claim, share data, pay bill (if bill is paid in full, the pay bill icon is not displayed), and report yields (if yields are reported for all crops, the report yields icon is not displayed).

In an embodiment, during the time period of November 1-December 14, if yields have not been reported, the home screen displays a report yields icon. A user can report yields by importing precision field data, uploading scale tickets, or manual entry. In an embodiment, the following options are also visible: report claim, pay bill (once bill has been paid in full, this icon disappears). In an embodiment, once yields have been reported, the yield lines disappear and are replaced with options to renew coverage (sales season).

In an embodiment, during the time period of December 15-March 15, the home screen displays current coverage and sales renewal options with quotes. The following icons are also displayed: compare products for all companies, update planting intentions, update field info, pay bill (if not already paid in full), report yields (if not already reported), revise yields (if yields have been reported but need to be revised), add crop or county, 1099 info, revenue price discovery.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for selective and real-time data display, the system comprising:

- a computing platform including computing hardware of at least one processor, a memory operably coupled to the at least one processor, and configured to store instructions invoked by the at least one processor;
- instructions that, when executed on the computing platform, cause the computing platform to implement:
  - a graphical user interface configured to display, in real-time, data to a user; and
  - a dynamically-guided subsystem including:
    - a task engine configured to manage task data related to the user, the task data comprising a plurality of tasks, wherein the plurality of tasks includes at least one predefined task defined by selectively stripping a data source,
    - a timing engine configured to determine timing data related to each of the plurality of tasks, the timing data being specific to the user,
    - a location engine configured to determine location data related to each task, the location data being specific to the user,
    - a data integration engine configured to integrate selected task data, from at least one database, and based on a set of decision criteria related to a given task and based on at least the timing data and the location data, wherein the selected task data is integrated including for the at least one predefined task, and
    - a display engine configured to populate the selected task data to the graphical user interface, and receive actual user-inputted crop data based on and in response to the selected task data from the graphical user interface, wherein when the actual user-inputted crop data sufficiently responds to the selected task data, a subsequent task is added to the plurality of tasks for subsequent integration by the data integration engine and population by the display engine.

2. The system of claim 1, further comprising instructions that, when executed on the computing platform, cause the computing platform to implement:

an analysis sub-system including:

an input/output engine configured to receive the user-inputted crop data from the display engine, and an analysis engine configured to analyze the user-inputted crop data, wherein the input/output engine is further configured to upload the analyzed user-inputted crop data in real time to a plurality of industry databases.

3. The system of claim 2, wherein the plurality of industry databases includes a Risk Management Agency (RMA) database, a Farm Service Agency (FSA) database, and an Approved Insurance Provider (AIP) database.

4. The system of claim 2, wherein the user-inputted crop data is uploaded by bypassing a user of the RMA database, the FSA database, or the AIP database.

5. The system of claim 2, wherein the display engine is further configured to receive an indication from the user of an electronic location for which the user-inputted crop data is to be uploaded, and wherein the input/output engine is further configured to upload the user-inputted crop data to the electronic location.

6. The system of claim 3, wherein the timing data is a time of year and the selected task data corresponds to farming tasks related to the time of year.

7. The system of claim 6, wherein the user is a farmer and the user-inputted crop data is farming data specific to the farmer.

8. The system of claim 1, wherein the display engine is configured to populate the selected task data to the graphical user interface by selectively presenting all products the user has purchased on a single screen.

9. The system of claim 1, wherein each of the plurality of tasks includes a set of icons associated with the task, wherein the display engine is further configured to delete the sets of icons for all completed tasks in the memory.

10. The system of claim 1, wherein the display engine is further configured to populate a primary screen and a task-based screen, wherein upon log-out and re-log-in, the display engine is further configured to immediately populate the task-based screen.

11. The system of claim 1, wherein the display engine is further configured to automatically present a subsequent task in the plurality of tasks once a previous task in the plurality of tasks is completed.

12. A method for selective and real-time data display, the method comprising:

providing a computing platform including computing hardware of at least one processor, a memory operably coupled to the at least one processor, and configured to store instructions invoked by the at least one processor, the computing platform having a graphical user interface configured to display, in real-time, crop data to a user;

managing task data related to the user, the task data comprising a plurality of tasks, wherein the plurality of tasks includes at least one predefined task defined by selectively stripping a data source;

determining timing data related to each of the plurality of tasks, the timing data being specific to the user;

determining location data related to each task, the location data being specific to the user;

integrating selected task data, from at least one database, and based on a set of decision criteria related to a given task and based on at least the timing data and the location data, wherein the selected task data is integrated including for the at least one predefined task;

populating the selected task data to the graphical user interface;

receiving actual user-inputted crop data based on and in response to the selected task data from the graphical user interface; and when the actual user-inputted crop data sufficiently responds to the selected task data, adding a subsequent task to the plurality of tasks for subsequent integrating and populating.

13. The method of claim 12, further comprising:

analyzing the user-inputted crop data; and uploading the analyzed user-inputted crop data in real time to a plurality of industry databases.

14. The method of claim 13, wherein the plurality of industry databases includes a Risk Management Agency (RMA) database, a Farm Service Agency (FSA) database, and an Approved Insurance Provider (AIP) database.

15. The method of claim 14, wherein the user-inputted crop data is uploaded by bypassing a user of the RMA database, the FSA database, or the AIP database.

16. The method of claim 12, further comprising:

populating the selected task data to the graphical user interface by selectively presenting all products the user has purchased on a single screen.

17. The method of claim 12, wherein each of the plurality of tasks includes a set of icons associated with the task, the method further comprising:

deleting the sets of icons for all completed tasks in the memory.

18. The method of claim 12, further comprising:

populating a primary screen and a task-based screen, wherein upon log-out and re-log-in, the display engine is further configured to immediately populate the task-based screen.

19. The method of claim 12, further comprising:

automatically presenting a subsequent task in the plurality of tasks once a previous task in the plurality of tasks is completed.

20. A system for selective and real-time data display, the system comprising:

means for presenting a graphical user interface configured to display, in real-time, crop data to a user;

means for managing task data related to the user, the task data comprising a plurality of tasks, wherein the plurality of tasks includes at least one predefined task defined by selectively stripping a data source;

means for determining timing data related to each of the plurality of tasks, the timing data being specific to the user;

means for determining location data related to each task, the location data being specific to the user;

means for integrating selected task data, from at least one database, and based on a set of decision criteria related to a given task and based on at least the timing data and the location data, wherein the selected task data is integrated including for the at least one predefined task;

means for populating the selected task data to the graphical user interface;

means for receiving actual user-inputted crop data based on and in response to the selected task data from the graphical user interface; and means for adding, when the actual user-inputted crop data sufficiently responds to the selected task data, a subsequent task to the plurality of tasks for subsequent integrating and populating.

* * * * *